United States Patent
Kim et al.

(10) Patent No.: US 11,257,452 B2
(45) Date of Patent: Feb. 22, 2022

(54) TOUCH DISPLAY DEVICE, TOUCH SENSING CIRCUIT, AND DRIVING METHOD

(71) Applicant: LG Display Co., Ltd., Seoul (KR)

(72) Inventors: SungChul Kim, Gyeonggo-do (KR); CheolSe Kim, Daegu (KR); HoonBae Kim, Seoul (KR); SunYeop Kim, Seoul (KR); Seongkyu Kang, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 258 days.

(21) Appl. No.: 16/440,187

(22) Filed: Jun. 13, 2019

(65) Prior Publication Data
US 2019/0385551 A1    Dec. 19, 2019

(30) Foreign Application Priority Data
Jun. 14, 2018 (KR) .................. 10-2018-0068330

(51) Int. Cl.
G09G 3/36 (2006.01)
G02F 1/1333 (2006.01)
G06F 3/041 (2006.01)

(52) U.S. Cl.
CPC ....... *G09G 3/3659* (2013.01); *G02F 1/13338* (2013.01); *G06F 3/041* (2013.01); *G09G 2300/0426* (2013.01); *G09G 2300/0439* (2013.01)

(58) Field of Classification Search
CPC ...... G09G 3/3659; G09G 3/3688; G09G 3/20; G02F 1/13338; G06F 3/041; G06F 3/0412; G06F 3/04166; G06F 3/04152; G06F 3/041661
See application file for complete search history.

(56) References Cited

U.S. PATENT DOCUMENTS

| | | | |
|---|---|---|---|
| 10,275,079 B2 * | 4/2019 | Agematsu | G06F 3/04166 |
| 2011/0084923 A1 | 4/2011 | Chang et al. | |
| 2011/0193820 A1 * | 8/2011 | Chen | G06F 3/041661 345/174 |
| 2011/0216039 A1 * | 9/2011 | Chen | G06F 3/04166 345/174 |
| 2013/0043942 A1 | 2/2013 | Konoshita et al. | |
| 2017/0344179 A1 * | 11/2017 | Kim | G09G 3/3688 |
| 2018/0004343 A1 * | 1/2018 | Shin | G02F 1/13338 |

(Continued)

FOREIGN PATENT DOCUMENTS

| | | |
|---|---|---|
| EP | 2642374 A2 | 9/2013 |
| WO | 2017/078379 A1 | 5/2017 |

OTHER PUBLICATIONS

Office Action issued in corresponding EP Patent Application No. 19179967.5 dated Nov. 17, 2020.

*Primary Examiner* — Fred Tzeng
(74) *Attorney, Agent, or Firm* — Morgan, Lewis & Bockius LLP

(57) ABSTRACT

The present disclosure relates to a touch display device, a touch sensing circuit, and a driving method. Further, the present disclosure relates to a touch display device, a touch sensing circuit, and a driving method, in which multiple touch electrodes are grouped into multiple touch electrode groups, and sensing is concurrently performed for each of the multiple touch electrode groups, so that excellent touch sensitivity and a fast touch sensing speed are allowed.

20 Claims, 35 Drawing Sheets

(56) References Cited

U.S. PATENT DOCUMENTS

| | | | |
|---|---|---|---|
| 2018/0033391 A1* | 2/2018 | So | G09G 3/20 |
| 2018/0059832 A1 | 3/2018 | Cho et al. | |
| 2018/0136778 A1 | 5/2018 | Choi et al. | |
| 2018/0307337 A1 | 10/2018 | Ahn | |
| 2018/0329570 A1* | 11/2018 | Chan | G06F 3/04184 |
| 2019/0102010 A1* | 4/2019 | Knabenshue | G06F 3/04162 |
| 2019/0187852 A1* | 6/2019 | Jin | G06F 3/0412 |
| 2020/0278782 A1* | 9/2020 | Chan | G06F 3/0412 |

* cited by examiner

FIG.8
TDS
(Case 1)  TDS1  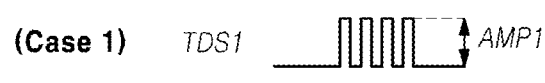
(Case 2)  TDS2  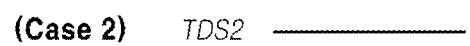
(Case 3)  TDS3  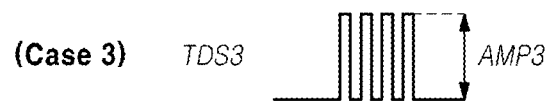

TOUCH DISPLAY DEVICE, TOUCH SENSING CIRCUIT, AND DRIVING METHOD

CROSS REFERENCE TO RELATED APPLICATION

This application claims priority from Korean Patent Application No. 10-2018-0068330, filed on Jun. 14, 2018, which is hereby incorporated by reference for all purposes as if fully set forth herein.

BACKGROUND

1. Technical Field

The present disclosure relates to a touch display device, a touch sensing circuit, and a driving method.

2. Description of the Related Art

With the development of the information society, various demands for touch display devices to display images have increased. Recently, various display devices, such as liquid crystal display devices, plasma display devices, organic light emitting display devices, or the like are being utilized.

Among the display devices, there is a touch display device which provides a touch-based input scheme such that a user can easily and intuitively input information or commands beyond a typical input scheme, such as using a button, a keyboard, a mouse, or the like.

In related art display devices, a large number of touch electrodes that perform touch sensing are disposed, and the large number of touch electrodes are sensed to determine touch coordinates or the presence or absence of touch by a user.

Therefore, there is a problem in that all the large number of touch electrodes are required to be sensed to determine touch coordinates or the presence or absence of touch in all areas, and it takes a long time for the same.

SUMMARY

Accordingly, embodiments of the present disclosure are directed to a touch display device, a touch sensing circuit, and a driving method that substantially obviate one or more of the problems due to limitations and disadvantages of the related art.

An aspect of the present disclosure is to provide a touch display device, a touch sensing circuit, and a driving method, by which a touch sensing time can be significantly reduced.

Another aspect of the present disclosure is to provide the touch display device, the touch sensing circuit, and the driving method, by which excellent touch sensitivity and a fast touch sensing speed are allowed.

Still another aspect of the present disclosure is to provide the touch display device, the touch sensing circuit, and the driving method, by which influence between display driving and touch driving can be reduced.

Still another aspect of the present disclosure is to provide the touch display device, the touch sensing circuit, and the driving method, by which, even though display and touch sensing are concurrently performed, touch sensing is prevented from being influenced by display driving, so that touch sensitivity can be improved.

Still another aspect of the present disclosure is to provide the touch display device, the touch sensing circuit, and the driving method, by which, when display and touch sensing are concurrently performed, undesired voltage fluctuation in touch electrodes due to voltage fluctuation of a display driving electrode, such as a data line, is prevented from occurring, so that touch sensitivity can be improved.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

In an aspect, embodiments of the present disclosure may provide a touch display device including multiple touch electrodes and a touch sensing circuit configured to sense the multiple touch electrodes.

The touch sensing circuit may group the multiple touch electrodes into multiple touch electrode groups, and concurrently sense each of the multiple touch electrode groups.

The touch sensing circuit may perform group differential sensing for the multiple touch electrode groups.

The multiple touch electrodes may be arranged in a matrix type.

Touch electrodes arranged in each touch electrode column may include g number of touch electrode groups, each of which includes k number of touch electrodes. Here, k and g may be natural numbers of 2 or more.

During a j-th frame for displaying an image, the touch sensing circuit may: select, as sensing touch electrodes, the k number of touch electrodes included in a first touch electrode group from among the g number of touch electrode groups; select, as reference touch electrodes, the k number of touch electrodes included in a second touch electrode group that is different from the first touch electrode group from among the g number of touch electrode groups; and match the k number of the touch electrodes included in the first touch electrode group, which are selected as a sensing touch electrode group, and the k number of touch electrodes included in the second touch electrode group, which are selected as a reference touch electrode group, so as to perform group differential sensing.

The touch sensing circuit may comprise as many differential sensing circuits as the number of touch electrodes included in each of the g number of touch electrode groups.

The differential sensing circuit may have a positive input terminal and a negative input terminal.

The positive input terminal of the differential sensing circuit may be electrically connected to one among the k number of touch electrodes included in the first touch electrode group, which are selected as sensing touch electrodes. The negative input terminal of the differential sensing circuit may be electrically connected to one among the k number of touch electrodes included in the second touch electrode group, which are selected as reference touch electrodes.

The differential sensing circuit may output or store a voltage difference between a voltage applied to the positive input terminal and a voltage applied to the negative input terminal.

The touch sensing circuit may include the k number of multiplexers that selects a sensing channel and a reference channel from among the g number of channels, and the k number of differential sensing circuits including a positive input terminal, a negative input terminal, and an output terminal.

Each of the k number of multiplexers may include the g number of channels and two channel connection terminals (a sensing channel connection terminal and a reference channel connection terminal).

Each of the k number of multiplexers may select the sensing channel and the reference channel from among the g number of channels, and may connect the selected channels to two channel connection terminals (the sensing channel connection terminal and the reference channel connection terminal).

The k number of touch electrodes included in the first touch electrode group are the sensing touch electrodes and correspond to sensing channels selected from the respective k number of multiplexers, and the k number of touch electrodes included in the second touch electrode group are the reference touch electrodes and correspond to reference channels selected from the respective k number of multiplexers.

Any i-th multiplexer among the k number of multiplexers may be connected to an i-th differential sensing circuit among the k number of differential sensing circuits. Here, i may be one of numbers from 1 to k.

The i-th multiplexer may select a sensing channel and a reference channel among the g number of channels corresponding to i-th touch electrodes of the respective g number of touch electrode groups, and may connect the sensing channel and the reference channel to a sensing channel connection terminal and a reference channel connection terminal, respectively.

In the i-th multiplexer, the sensing channel connection terminal may be electrically connected to a positive input terminal of an i-th differential sensing circuit, and the reference channel connection terminal maybe connected to a negative input terminal of the i-th differential sensing circuit.

A first preamplifier electrically connected between the sensing channel connection terminal of the i-th multiplexer and the positive input terminal of the i-th differential sensing circuit may be included, and a second preamplifier electrically connected between the reference channel connection terminal of the i-th multiplexer and the negative input terminal of the i-th differential sensing circuit may be included.

A first integrator may be connected between the first preamplifier and the positive input terminal of the i-th differential sensing circuit, and a second integrator may be connected between the second preamplifier and the negative input terminal of the i-th differential sensing circuit.

An integrator may be connected to an output terminal of the i-th differential sensing circuit.

The first touch electrode group mentioned above may be positioned closer to the touch sensing circuit, compared to the second touch electrode group.

On the contrary, the second touch electrode group mentioned above may be positioned closer to the touch sensing circuit, compared to the first touch electrode group.

The touch sensing circuit may operate by alternating group differential sensing directions for each frame.

Accordingly, during a frame other than the j-th frame, the touch sensing circuit may: select, as sensing touch electrodes, the k number of touch electrodes included in the second touch electrode group from among the g number of touch electrode groups; select, as reference touch electrodes, the k number of touch electrodes included in the first touch electrode group from among the g number of touch electrode groups; and match the k number of the touch electrodes included in the second touch electrode group and the k number of touch electrodes included in the first touch electrode group, so as to concurrently perform group differential sensing.

Touch electrodes arranged in each touch electrode column may further include one additional touch electrode group including the d number of touch electrodes, in addition to the g number of touch electrode groups, each of which includes the k number of touch electrodes. Here, d is a natural number equal to or larger than 1 and smaller than k.

The touch sensing circuit may select, as sensing touch electrodes, the k number of touch electrodes including the d number of touch electrodes and the (k–d) number of touch electrodes arranged on the d number of touch electrodes, may select, as reference touch electrodes, the k number of touch electrodes arranged on the (k–d) number of touch electrodes, and may differentially sense the k number of touch electrodes selected as the sensing touch electrodes and the k number of touch electrodes selected as the reference touch electrodes.

The touch display device may include a display panel in which multiple data lines and multiple gate lines are arranged. In this case, the multiple touch electrodes may be embedded in the display panel.

The touch display device may perform display and touch sensing independently.

For example, the touch display device may concurrently perform display and touch sensing.

To this end, when a touch electrode driving signal of a pulse modulation signal type, in which voltage swings to the k number of touch electrodes included in the first touch electrode group and the k number of touch electrodes included in the second touch electrode group, is applied, a data signal for image display may be applied to the data lines.

Each touch electrode column may be disposed so as to overlap with the data lines.

In another aspect, a touch sensing circuit of embodiments of the present disclosure may include: the k number of multiplexers that select, during a j-th frame, as sensing touch electrodes, the k number of touch electrodes (k≥2) included in a first touch electrode group among the g number of touch electrode groups (g≥2) in which multiple touch electrodes are grouped, and selects, as reference touch electrodes, the k number of touch electrodes included in a second touch electrode group other than the first touch electrode group from among the g number of touch electrode groups; and a differential sensing circuit that matches the k number of touch electrodes included in the first touch electrode group and the k number of touch electrodes included in the second touch electrode group so as to perform differential sensing.

The k number of touch electrodes included in the first touch electrode group may be divided and connected to the k number of multiplexers, and the k number of multiplexers may select, as sensing touch electrodes, all the k number of touch electrodes included in the first touch electrode group so as to connect the selected k number of touch electrodes to positive input terminals of the k number of differential sensing circuits.

The k number of touch electrodes included in the second touch electrode group may be divided and connected to the k number of multiplexers, and the k number of multiplexers may select, as reference touch electrodes, all the k number of touch electrodes included in the second touch electrode group so as to connect the selected k number of touch electrodes to negative input terminals of the k number of differential sensing circuits.

During a frame other than the j-th frame: the k number of multiplexers may select, as sensing touch electrodes, the k number of touch electrodes included in the second touch electrode group from among the g number of touch electrode groups, and may select, as reference touch electrodes, the k number of touch electrodes included in the first touch electrode group from among the g number of touch electrode groups; and the k number of differential sensing circuits may match the k number of the touch electrodes included in the second touch electrode group and the k number of touch electrodes included in the first touch electrode group, so as to concurrently perform group differential sensing.

Each of the k number of differential sensing circuits may be a sample-and-hold circuit or a differential amplifier.

In still another aspect, embodiments of the present disclosure relate to a method of driving a touch display device that includes multiple touch electrodes and a touch sensing circuit configured to sense the multiple touch electrodes, the method including: during a j-th frame, selecting, as sensing touch electrodes, the k number of touch electrodes (k≥2) included in a first touch electrode group among the g number of touch electrode groups (g≥2) in which multiple touch electrodes are grouped, and selecting, as reference touch electrodes, the k number of touch electrodes included in a second touch electrode group other than the first touch electrode group from among the g number of touch electrode groups; and matching the k number of touch electrodes included in the first touch electrode group, i.e., a sensing touch electrode group, and the k number of touch electrodes included in the second touch electrode group, i.e., a reference touch electrode group, so as to perform differential sensing.

The method may further include: during the j-th frame, after performing of the differential sensing, during another frame other than the j-th frame, selecting, as sensing touch electrodes, the k number of touch electrodes included in the second touch electrode group from among the g number of touch electrode groups, and selecting, as reference touch electrodes, the k number of touch electrodes included in the first touch electrode group from among the g number of touch electrode groups; and matching the k number of the touch electrodes included in the second touch electrode group, i.e., the sensing touch electrode group, and the k number of touch electrodes included in the first touch electrode group, i.e., the reference touch electrode group, so as to perform group differential sensing.

The multiple touch electrodes may be embedded in the display panel in which multiple data lines and multiple gate lines are arranged.

When a touch electrode driving signal is applied to the k number of touch electrodes included in the first touch electrode group and the k number of touch electrodes included in the second touch electrode group, a data signal for image display may be applied to the data lines.

Embodiments of the present disclosure described above may provide a touch display device, a touch sensing circuit, and a driving method, by which a touch sensing time can be significantly reduced.

Embodiments of the present disclosure may provide the touch display device, the touch sensing circuit, and the driving method, by which excellent touch sensitivity and a fast touch sensing speed are allowed.

Embodiments of the present disclosure may provide the touch display device, the touch sensing circuit, and the driving method, by which influence between display driving and touch driving can be reduced.

Embodiments of the present disclosure may provide the touch display device, the touch sensing circuit, and the driving method, by which, even though display and touch sensing are concurrently performed, touch sensing is prevented from being influenced by display driving, so that touch sensitivity can be improved.

Embodiments of the present disclosure may provide the touch display device, the touch sensing circuit, and the driving method, by which, when display and touch sensing are concurrently performed, undesired voltage fluctuation in touch electrodes due to voltage fluctuation of a display driving electrode, such as a data line, is prevented from occurring, so that touch sensitivity can be improved.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles. In the drawings:

FIG. 8 is a diagram illustrating a touch electrode driving signal (TDS) for each of three cases of time free driving in the touch display device according to embodiments of the present disclosure;

DETAILED DESCRIPTION

Figure 1:
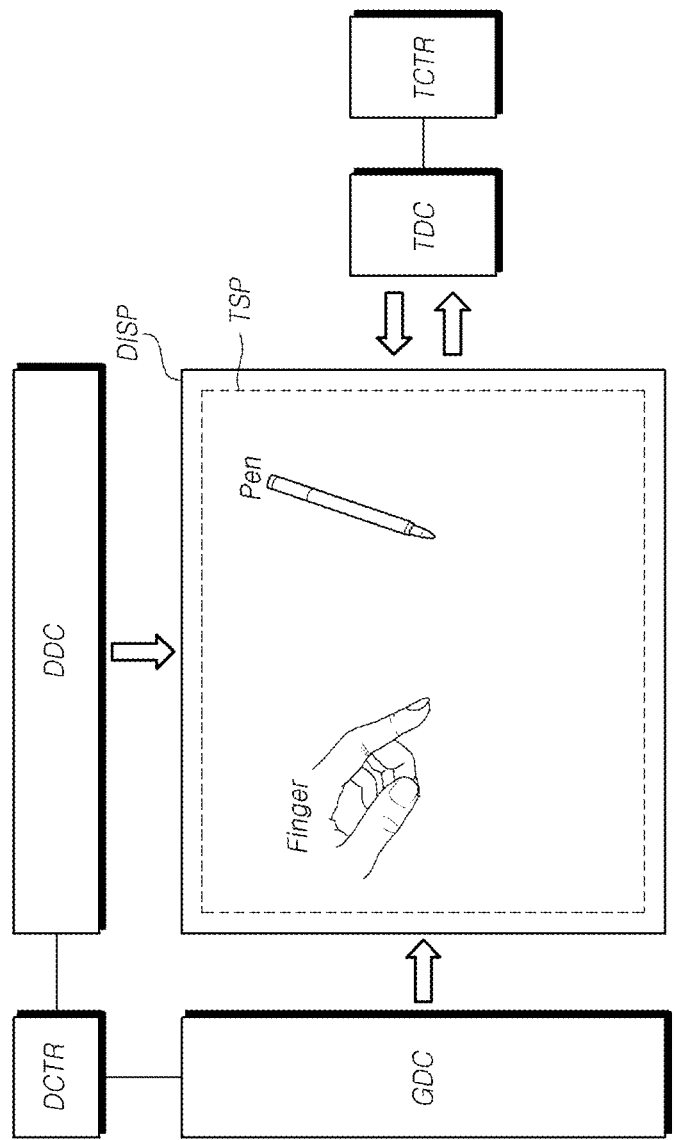
FIG. 1 is a schematic system configuration diagram of a touch display device according to embodiments of the present disclosure.

Hereinafter, embodiments of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. Each of these terminologies is not used to define an essence, order, or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

Figure 2:
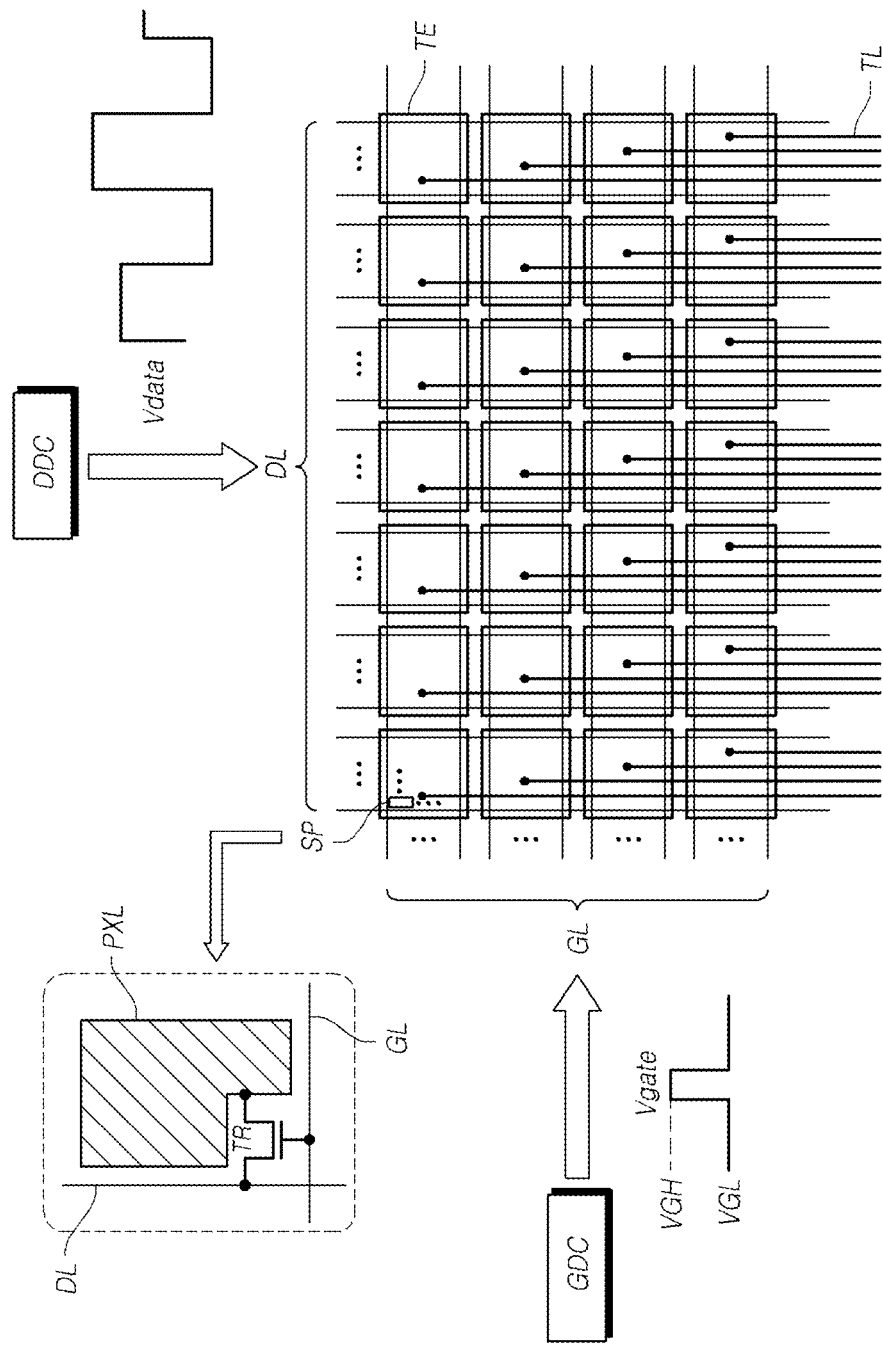
FIG. 2 is a diagram simply illustrating display driving of the touch display device according to embodiments of the present disclosure.
Figure 3:
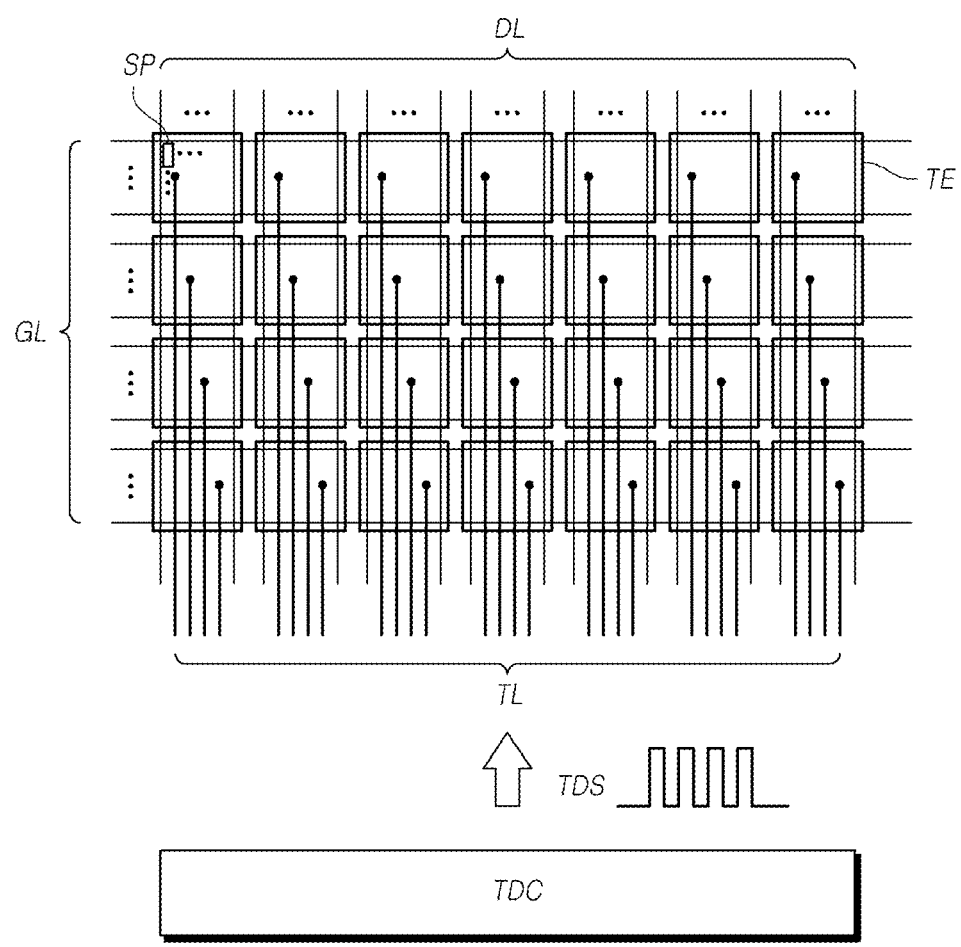
FIG. 3 is a diagram simply illustrating touch driving of the touch display device according to embodiments of the present disclosure.

FIG. 1 is a schematic system configuration diagram of a touch display device according to embodiments of the present disclosure, FIG. 2 is a diagram simply illustrating display driving of the touch display device according to embodiments of the present disclosure, and FIG. 3 is a diagram simply illustrating touch driving of the touch display device according to embodiments of the present disclosure.

Referring to FIG. 1, a touch display device according to embodiment of the present disclosure may provide a display function of displaying an image. The touch display device according to embodiments of the present disclosure may provide a touch sensing function of sensing a user's touch, and a touch input function of performing input processing according to the user's touch by using a touch sensing result.

Hereinbelow, display driving and elements for providing the display function are described with reference to FIG. 1 and FIG. 2, and touch driving and elements for providing the touch sensing function are described with reference to FIG. 1 and FIG. 3.

Referring to FIG. 1 and FIG. 2, the touch display device according to embodiments of the present disclosure may include: a display panel DISP in which, in order to provide a display function, multiple data lines DL and multiple gate lines GL may be arranged, and multiple subpixels SP defined by the multiple data lines DL and the multiple gate lines GL are arranged; a data driving circuit DDC that drives the multiple data lines DL; a gate driving circuit GDC that drives the multiple gate lines GL; and a display controller DCTR that controls the data driving circuit DDC and the gate driving circuit GDC.

The display controller DCTR supplies various control signals to the data driving circuit DDC and the gate driving circuit GDC and controls the data driving circuit DDC and the gate driving circuit GDC.

The display controller DCTR starts scanning according to timing implemented in each frame, converts input image data input from the outside according to a data signal format used in the data driving circuit DDC, outputs the converted image data, and controls data driving at an appropriate time for scanning.

The gate driving circuit GDC sequentially supplies gate signals of an on-voltage and an off-voltage to the multiple gate lines GL according to control of the display controller DCTR.

When a specific gate line GL is open by the gate driving circuit GDC, the data driving circuit DDC converts an image data signal received from the display controller DCTR into an image analog signal, and supplies a data signal Vdata corresponding thereto to the multiple data lines DL.

The display controller DCTR may be a timing controller used in a typical display technology or a control device further performing other control functions, which includes the timing controller, and may be a control device differing from the timing controller.

The display controller DCTR may be implemented as a part separate from the data driving circuit DDC and may be implemented as an integrated circuit together with the data driving circuit DDC.

The data driving circuit DDC drives the multiple data lines DL by supplying the data signal Vdata to the multiple data lines DL. Here, the data driving circuit DDC may be referred to as a "source driver".

This data driving circuit DDC may include at least one Source Driver Integrated Circuit (SDIC). Each SDIC may include a shift register, a latch circuit, a Digital-to-Analog Converter (DAC), an output buffer circuit, and the like. Each SDIC may further include an Analog-to-Digital Converter (ADC) according to circumstances.

Each SDIC may be connected to a bonding pad of the display panel DISP in a Tape Automated Bonding (TAB) scheme or a Chip On Glass (COG) scheme, or may be directly disposed in the display panel DISP, and may be integratedly disposed in the display panel DISP according to circumstances. Further, each SDIC may be implemented in a Chip On Film (COF) scheme, in which the SDIC is mounted on a film connected to the display panel DISP.

The gate driving circuit GDC sequentially drives the multiple gate lines GL by sequentially supplying scan signals Vgate (also referred to as a scan voltage, a gate signal, or a gate voltage) to the multiple gate lines GSL. Here, the gate driving circuit GDC is referred to as a "scan driver".

The scan signal Vgate includes an off-level gate voltage causing a corresponding gate line GL to be closed and an on-level gate voltage causing the gate line GL to be open.

More specifically, the scan signal Vgate includes the off-level gate voltage causing a transistor connected to the gate line GL to be turned off and the on-level gate voltage causing the transistor connected to the gate line GL to be turned on.

When the transistor is an N type, the off-level gate voltage may be a low-level gate voltage VGL, and the on-level gate voltage may be a high-level gate voltage VGH. When the transistor is a P type, the off-level gate voltage may be a high-level gate voltage VGH, and the on-level gate voltage may be a low-level gate voltage VGL. Hereinbelow, for convenience of explanation, an example, in which the off-level gate voltage is a low-level gate voltage VGL, and the on-level gate voltage is a high-level gate voltage VGH, is provided.

This gate driving circuit GDC may include at least one Gate Driver Integrated Circuit (GDIC). Each GDIC may include a shift register, a level shifter, and the like.

Each GDIC may be connected to a bonding pad of the display panel DISP in a Tape Automated Bonding (TAB) scheme or a Chip On Glass (COG) scheme, or may be implemented in a Gate In Panel (GIP) type to be directly disposed in the display panel DISP, and may be integratedly disposed in the display panel (DISP) according to circumstances. Further, each GDIC may be implemented in a Chip On Film (COF) scheme, in which the GDIC is mounted on a film connected to the display panel DISP.

As shown in FIG. 1, the data driving circuit DDC may be positioned only on one side (e.g., the upper side or the lower side) of the display panel DISP, and may be positioned on both sides (e.g., an upper side and the lower side) of the display panel DISP according to a driving scheme, a panel design scheme, and the like according to circumstances.

As shown in FIG. 1, the gate driving circuit GDC may be positioned on only one side (e.g., the right side or the left side) of the display panel DISP, and may be positioned on both sides (e.g., the right side and the left side) of the display panel DISP according to a driving scheme, a panel design scheme, and the like according to circumstances.

The touch display device according to the present embodiments may be various types of display devices, such as a liquid crystal display device, an organic light emitting display device, and the like. The display panel DISP according to the present embodiments may be various types of display panels, such as a liquid crystal display panel, an organic light emitting display panel, and the like.

Each subpixel SP disposed in the display panel DISP may include one or more circuit elements (e.g., a transistor, a capacitor, etc.).

For example, when the display panel DISP is a liquid crystal display panel, in each subpixel SP, a pixel electrode PXL may be disposed, and a transistor TR may be electrically connected between the pixel electrode PXL and the data lines DL. The transistor TR may be turned on by a scan signal Vgate supplied to a gate node through the gate lines GL, and when the transistor TR is turned on, a data signal Vdata supplied to a source node (or a drain node) through the data lines DL may be output to a drain node (or a source node), so that the data signal Vdata may be applied to the pixel electrode PXL electrically connected to the drain node (or the source node). An electric field is formed between the pixel electrode PXL, to which the data signal Vdata is applied, and a common electrode, to which a common voltage Vcom is applied, and a capacitance may be formed between the pixel electrode PXL and the common electrode.

A structure of each subpixel SP may be variously determined according to a panel type, a provided function, a design scheme, and the like.

Referring to FIG. 1 and FIG. 3, the touch display device according to embodiments of the present disclosure may include, in order to provide a touch sensing function, a touch panel TSP, a touch sensing circuit TDC that drives the touch panel TSP to perform sensing, a touch controller TCTR that performs sensing using a result of sensing the touch panel TSP, and the like.

In the touch panel TSP, a touch by a user's pointer may be made or brought close. In this touch panel TSP, touch sensors may be disposed.

The user's pointer may be a finger, a pen, or the like.

The pen may be a passive pen without a signal transmission/reception function or may be an active pen with a signal transmission/reception function. The touch sensing circuit TDC may supply a touch driving signal to the touch panel TSP, and may sense the touch panel TSP. The touch controller TCTR may sense a touch by using a result of sensing the touch panel TSP by the touch sensing circuit TDC. Here, sensing the touch may refer to determining the presence or absence of the touch and/or determining touch coordinates.

The touch panel TSP may be an external type disposed outside the display panel DISP or a built-in type disposed inside the display panel DISP.

When the touch panel TSP is an external type, the touch panel TSP and the display panel DISP may be separately manufactured and then bonded together with an adhesive or the like. The external touch panel TSP may be referred to as an add-on type.

When the touch panel TSP is a built-in type, the touch panel TSP may be manufactured together during a manufacturing process of the display panel DISP. That is, the touch sensors constituting the touch panel TSP may be disposed inside the display panel DISP. A built-in touch panel TSP may be an in-cell type, an on-cell type, a hybrid type, and the like.

Hereinbelow, for convenience of explanation, it is assumed that the touch panel TSP is a built-in type disposed inside the display panel DISP.

When the touch panel TSP is embedded in the display panel DISP, that is, when multiple touch electrodes TE are disposed in the display panel DISP, the multiple touch electrodes TE may be included in the display panel DISP separately from electrodes used for display driving, and the electrodes that are disposed in the display panel DISP so as to perform display driving may be used as the multiple touch electrodes TE.

For example, common electrodes disposed in the display panel DISP may be divided into multiple common electrodes and used as the multiple touch electrodes TE. That is, the multiple touch electrodes TE disposed in the display panel DISP may be electrodes that perform touch sensing and may be electrodes perform displaying at the same time. In this case, a capacitance for display driving may be formed between the pixel electrode PXL and the touch electrodes TE functioning as the common electrodes. Hereinafter, it is assumed that the multiple touch electrodes TE disposed in the display panel DISP are the common electrodes.

The touch controller TCTR may be implemented as, for example, a micro control unit (MCU), a processor, and the like.

The display controller DCTR and the touch controller TCTR may be implemented separately and may be implemented in an integrated manner.

Referring to FIG. 3, in the touch panel TSP of the touch display device according to embodiments of the present disclosure, multiple touch electrodes TE may be disposed and multiple touch lines TL that electrically connect the multiple touch electrodes TE and the touch sensing circuit TDC may be disposed. In each touch electrode TE, one or more touch lines TL may be electrically connected through one or more contact holes. The touch lines TL electrically connected to the touch electrodes TE included in each touch electrode column may be disposed in parallel or overlapping with one or more data lines DL.

The touch display device according to embodiments of the present disclosure may sense a touch on the basis of self-capacitance of the touch electrodes TE or may sense a touch on the basis of mutual-capacitance between the touch electrodes TE.

When the touch display device according to embodiments of the present disclosure senses a touch on the basis of self-capacitance, multiple first touch electrode lines and multiple second touch electrode lines are disposed to cross each other in the touch panel TSP. For example, the multiple first touch electrode lines may be disposed in the X-axis direction, and the multiple second touch electrode lines may be disposed in the Y-axis direction. Each of the first touch electrode lines and the second touch electrode lines may be a single touch electrode in a bar shape and may be two or more electrically connected touch electrodes. The first touch electrode lines may be referred to as driving lines, driving electrodes, driving touch electrode lines, Tx lines, Tx electrodes, Tx touch electrode lines, or the like, and the second touch electrode lines may be referred to as reception lines, reception electrodes, reception touch electrode lines, sensing lines, sensing electrodes, sensing touch electrode lines, Rx lines, Rx electrodes, Rx touch electrode lines, or the like.

In this case, the touch sensing circuit TDC may supply a driving signal to one or more among the multiple first touch electrode lines and senses the second touch electrode lines to output sensing data, and the touch controller TCTR may calculate the presence or absence of touch and/or touch coordinates by using the sensing data.

When the touch display device according to embodiments of the present disclosure senses a touch on the basis of mutual-capacitance, as shown in FIG. 3, the multiple touch electrodes TE may be disposed in a separated manner in the touch panel TSP.

In this case, the touch sensing circuit TDC may supply a driving signal (hereinafter, referred to as a touch electrode driving signal (TDS)) to all or some of the multiple touch electrodes TE, and senses one or more touch electrodes TE, to which the driving signal has been supplied, to output sensing data, and the touch controller TCTR may calculate the presence or absence of touch and/or touch coordinates by using the sensing data.

Hereinafter, for convenience of explanation, it is assumed that the touch display device according to embodiments of the present disclosure senses a touch on the basis of self-capacitance, and the touch panel TSP is configured as illustrated in FIG. 2 and FIG. 3.

The touch electrode driving signal TDS output from the touch sensing circuit TDC may be a signal having a constant voltage and may be a signal having a variable voltage.

When the touch electrode driving signal TDS is a signal having a variable voltage, the touch electrode driving signal TDS may have a variety of signal waveforms, for example, a sinusoidal waveform, a triangular waveform, or a square wave waveform.

Hereinafter, it is assumed that when the touch electrode driving signal TDS is a signal having a variable voltage, the touch electrode driving signal TDS is a pulse signal including multiple pulses. When the touch electrode driving signal TDS is a pulse signal having multiple pulses, the touch electrode driving signal TDS may have a constant frequency or may have a variable frequency.

Referring to FIG. 2 and FIG. 3, the size of an area occupied by a single touch electrode TE may correspond to the size of an area occupied by a single subpixel SP, and may correspond to the size of an area occupied by two or more subpixels SP.

The multiple touch electrodes TE are arranged in one touch electrode column, and multiple touch lines TL electrically connected to the multiple touch electrodes TE may overlap the multiple touch electrodes TE. For example, when it is assumed that the multiple touch electrodes TE arranged in one touch electrode column include a first touch electrode and a second touch electrode, a first touch line connected to the first touch electrode overlaps the second touch electrode, but may be electrically disconnected from the second touch electrode.

As described above, when the size of the area occupied by one touch electrode TE correspond to the size of the area occupied by one or more subpixels SP, the one touch electrode TE may overlap one or more data lines DL.

If each touch electrode column is disposed in the same direction as that of the data line DL, that is, if each touch electrode column is disposed in parallel with the data line DL, each touch electrode column may overlap one or more data lines DL. In this case, each touch electrode row may overlap one or more gate lines GL.

Figure 4:
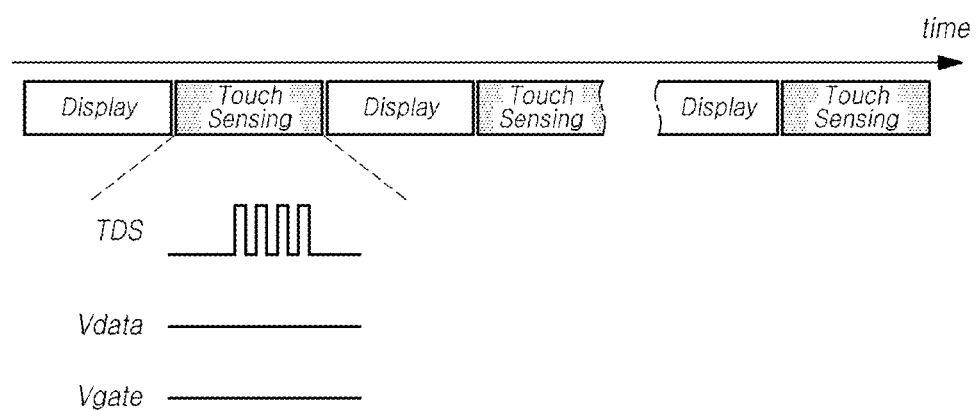
FIG. 4 and FIG. 5 are diagrams for describing a time division driving scheme of the touch display device according to embodiments of the present disclosure.
Figure 5:
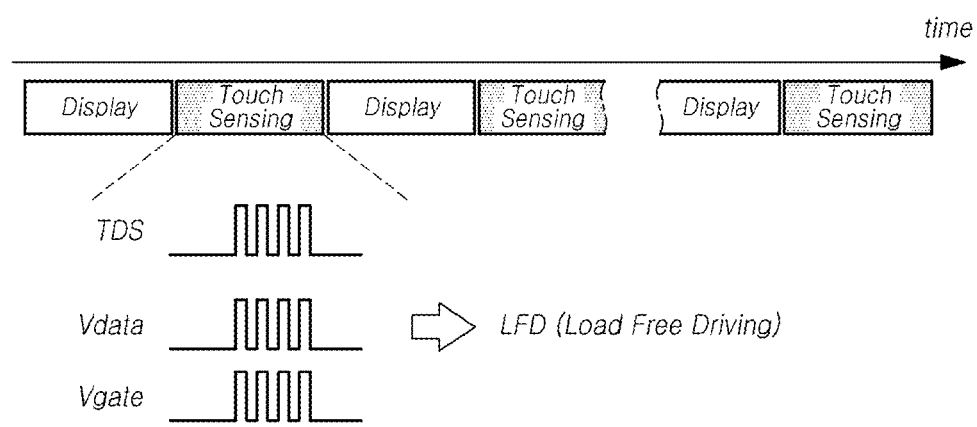

FIG. 4 and FIG. 5 are diagrams for describing a Time Division Driving (TDD) scheme of the touch display device according to embodiments of the present disclosure.

Referring to FIG. 4, the touch display device according to embodiment of the present disclosure may alternately perform display and touch sensing. The scheme, in which display driving for display and touch driving for touch sensing are alternately performed, is referred to as a time division driving scheme.

According to the time division driving scheme, a display period for display and a touch sensing period for touch sensing are alternated. During the display period, the touch display device may perform display driving. During the touch sensing period, the touch display device may perform touch driving.

As an example of the time driving deriving scheme, one frame time may be divided into one display period and one touch sensing period. As another example of the time division driving scheme, one frame time may be divided into two or more display periods and one touch sensing period or two or more touch sensing periods.

Referring to FIG. 4, according to the time division driving scheme, during the touch sensing period, a touch electrode driving signal TDS may be applied to one or more among the multiple touch electrodes TE. The multiple data lines DL and the multiple gate lines GL may not be driven.

In this case, unnecessary parasitic capacitance due to a potential difference may be generated between the touch electrode TE, to which the touch electrode driving signal TDS is applied, and one or more data lines DL positioned in the vicinity. The unnecessary parasitic capacitance may increase an RC delay for the touch electrode TE and a touch line TL connected thereto, so as to decrease touch sensitivity.

The unnecessary parasitic capacitance due to a potential difference may also be generated between the touch electrode TE, to which the touch electrode driving signal TDS is applied, and one or more gate lines GL positioned in the vicinity. The unnecessary parasitic capacitance may increase an RC delay for the touch electrode TE and a touch line TL connected thereto, so as to decrease touch sensitivity.

The unnecessary parasitic capacitance due to a potential difference may be generated between the touch electrode TE, to which the touch electrode driving signal TDS is applied, and one or more other touch electrodes TE positioned in the vicinity. The unnecessary parasitic capacitance may increase an RC delay for the touch electrode TE and a touch line TL connected thereto, so as to decrease touch sensitivity.

The RC delay described above, may be referred to as a time constant or a load.

In order to eliminate such a load, the touch display device according to embodiments of the present disclosure may perform Load Free Driving (LFD) during the touch sensing period.

At the load free driving, when the touch electrode driving signal TDS is applied to all or some of the multiple touch electrodes TE, the touch display device according to embodiments of the present disclosure may apply, as a data signal Vdata, a load free driving signal to all data lines DL or some data lines DL which is likely to have parasitic capacitance formed therein.

At the load free driving, when the touch electrode driving signal TDS is applied to all or some of the multiple touch electrodes TE, the touch display device according to embodiments of the present disclosure may apply, as a gate signal Vgate, a load free driving signal to all gate lines GL or some gate lines GL which is likely to have parasitic capacitance formed therein.

At the load free driving, when the touch electrode driving signal TDS is applied to all or some of the multiple touch electrodes TE, the touch display device according to embodiments of the present disclosure may apply a load free driving signal to all other touch electrodes TE or some other touch electrodes TE which is likely to have parasitic capacitance formed therein.

The described load free driving signal may be a touch electrode driving signal and may be a signal having the same or similar signal characteristic as that of the touch electrode driving signal.

For example, a frequency or a phase of the load free driving signal described above may be the same as a frequency and a phase of the touch electrode driving signal TDS, or may be the same as those of the touch electrode driving signal TDS with in a predetermined error range. The amplitude of the load free driving signal and the amplitude of the touch electrode driving signal TDS may be the same or may be the same within a predetermined error range, and there may be a deliberate difference in some cases.

Figure 6:
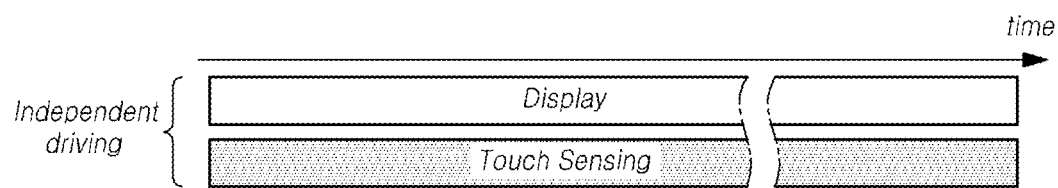
FIG. 6 is a diagram for describing a time free driving scheme of the touch display device according to embodiments of the present disclosure.

FIG. 6 is a diagram for describing a Time Free Driving (TFD) scheme of the touch display device according to embodiments of the present disclosure.

Referring to FIG. 6, the touch display device according to embodiment of the present disclosure may perform display and touch sensing independently. The scheme, in which display driving for display and touch driving for touch sensing are independently performed, is referred to as a time free driving scheme.

According to the time free driving scheme, display driving for display and touch sensing driving for touch sensing may be concurrently performed. In some periods, only display driving for display may be performed or only touch driving for touch sensing may be proceeded.

Figure 7:
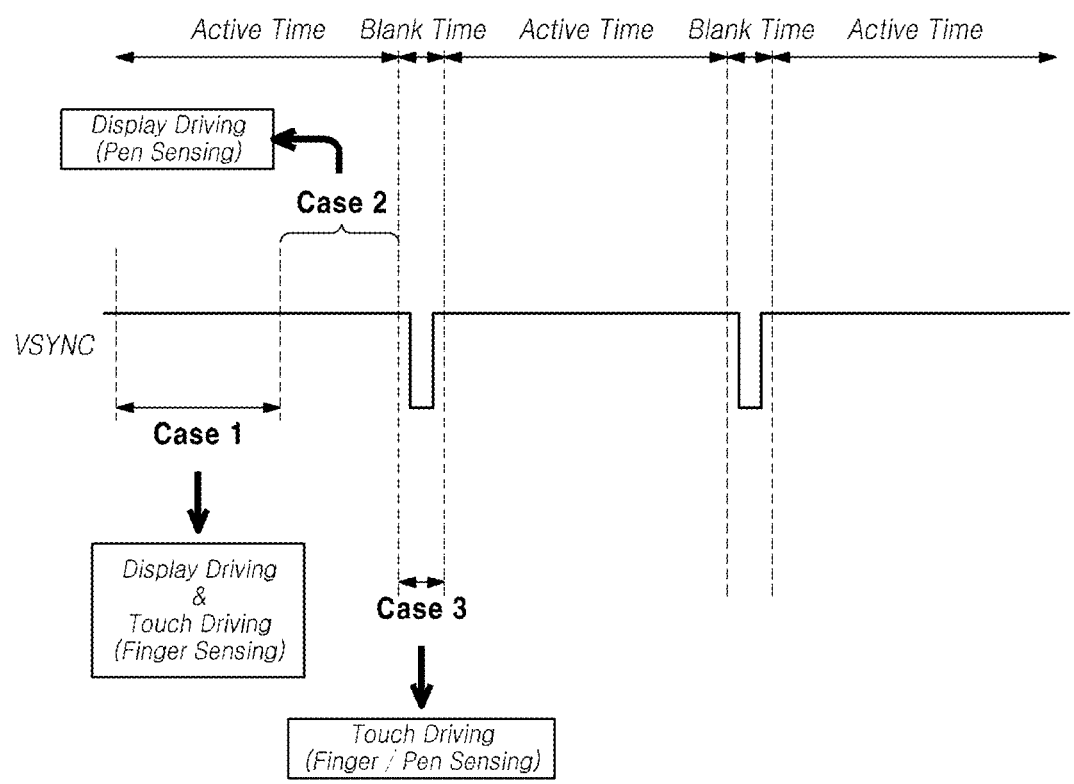
FIG. 7 is a diagram illustrating three cases of time free driving in the touch display device according to embodiments of the present disclosure.

FIG. 7 is a diagram illustrating three cases (cases 1, 2, and 3) of time free driving when the touch display device according to embodiments of the present disclosure performs time free driving, and FIG. 8 is a diagram illustrating a touch electrode driving signal (TDS) for each of three cases (cases 1, 2, and 3) of time free driving by the touch display device according to embodiments of the present disclosure.

According to case 1 of time free driving, the touch display device may concurrently perform display driving and touch driving.

In case 1, the touch display device may supply a touch electrode driving signal TDS in the form of a variable voltage to the touch electrode TE in order to perform touch driving.

Hereinafter, in case 1, the touch electrode driving signal TDS applied to the touch electrode TE is referred to as a first touch electrode driving signal TDS1. The first touch electrode driving signal TDS1 has a first amplitude AMP1.

In case 1, the touch display device may perform touch driving to sense a touch by a finger contact on the touch panel TSP. This touch sensing is referred to as finger sensing.

Alternatively, in case 1, the touch display device may perform touch driving to sense a touch by a finger or a pen in the case in which the finger or the pen is close to the touch panel TSP without touching the touch panel TSP. This touch sensing is referred to as hover sensing.

According to case 2 of time free driving, the touch display device may perform only display driving.

In case 2, the touch display device does not perform normal touch driving because it is unnecessary to sense a touch by a finger. That is, the touch display device does not supply the touch electrode driving signal TDS in the form of a variable voltage to the multiple touch electrodes TE disposed in the touch panel TSP.

In case 2, the touch display device may supply the touch electrode driving signal TDS in the form of DC voltage. Hereinafter, in case 2, the touch electrode driving signal TDS applied to the touch electrode TE is referred to as a second touch electrode driving signal TDS2.

In case 2, the touch display device may receive a pen signal output from a pen through the touch electrode TE so as to sense the pen. The touch display device may obtain a pen sensing result, a position of the pen, a tilt, a pressure (writing pressure), or various additional information.

According to case 3 of time free driving, the touch display device may perform only touch driving.

In case 3, the touch display device may supply a touch electrode driving signal TDS in the form of a variable voltage to the touch electrode TE in order to perform touch driving.

Hereinafter, in case 3, the touch electrode driving signal TDS applied to the touch electrode TE is referred to as a third touch electrode driving signal TDS3. The third touch electrode driving signal TDS3 has a third amplitude AMP3 differing from the first amplitude AMP1.

In case 3, the touch display device may perform touch driving to sense a touch by a finger contact on the touch panel TSP.

Referring to FIG. 7, in the touch display device, among three cases (cases 1, 2, and 3) of time free driving, case 1 may be performed at a first active time, and case 3 may be performed at a blank time. The active time correspond to a time at which a screen of one frame is displayed, and the blank time may correspond to a time required to start displaying a screen of the next frame after the screen of one frame is displayed.

Referring to FIG. 7, during the active time, case 1 may be switched to case 2.

Referring to FIG. 7, during the active time, the touch display device may stop touch driving, for finger sensing to perform pen sensing while performing display driving and touch driving together (performing according to case 1) (that is, case 1 is switched to case 2).

In cases 1 and 3, when touch driving for finger sensing is performed, touch electrode driving signals TDS 1 and TDS 3 having amplitudes AMP1 and AMP3 may be applied to the touch electrode TE.

In case 2, for pen sensing, the touch electrode driving signal TDS2 in the form of DC voltage may be applied to the touch electrode TE.

Referring to FIG. 8, the first amplitude AMP1 of the first touch electrode driving signal TDS1 applied to the touch electrode TE when display driving is performed together with touch driving (case 1) may be smaller than the third amplitude AMP3 of the third touch electrode driving signal TDS3 applied to the touch electrode TE when only touch driving is performed (case 3).

The first amplitude AMP1 of the first touch electrode driving signal TDS1 applied to the touch electrode TE during the active time may be smaller than the third amplitude AMP3 of the third touch electrode driving signal TDS3 applied to the touch electrode TE during the blank time.

Referring to FIG. 7 and FIG. 8, during the active time, the touch sensing circuit TDC may supply, to the multiple touch electrodes TE, the first touch electrode driving signal TDS1 having the first amplitude AMP1 and the second touch electrode driving signal TDS2 corresponding to the DC voltage.

Referring to FIG. 7 and FIG. 8, during the blank time, the touch sensing circuit TDC may supply the third touch electrode driving signal TDS3 having the third amplitude AMP3 to one or more among the multiple touch electrodes TE.

Figure 9:
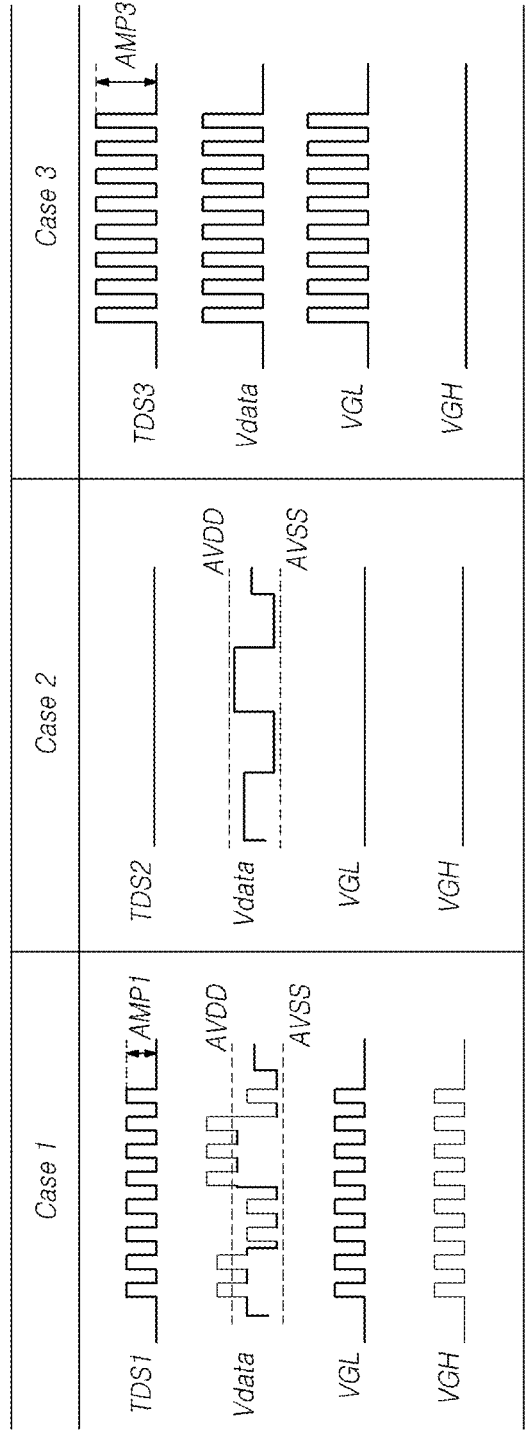
FIG. 9 is a diagram summarizing and illustrating waveforms of main signals for each of three cases of time free driving in the touch display device according to embodiments of the present disclosure.

FIG. 9 is a diagram summarizing and illustrating waveforms of main signals (TDS1, Vdata, VGL_M, and VGH_M) for each of three cases (case 1, case 2, and case 3) of time free driving in the touch display device according to embodiments of the present disclosure.

Case 1 and case 2 are driving cases during an active time. Case 3 is a driving case during a blank time.

For each of three cases, a touch electrode driving signal TDS applied to the touch electrode TE, a data signal Vdata applied to the data line DL, an on-level gate voltage VGH and an off-level gate voltage VGL supplied to a gate driving circuit GDC to generate a scan signal Vgate supplied to the gate line GL will be examined.

In case 2 in which only display driving is performed during the active time, the touch electrode driving signal TDS applied to the touch electrode TE is a second touch electrode driving signal TDS2 in the form of DC voltage.

The data signal Vdata applied to the data line DL may be a signal corresponding to an image analog signal, in which an image digital signal is digital-to-analog converted for display, and may be a pixel voltage applied to a pixel electrode PXL of a corresponding subpixel SP through the data line DL. The data signal Vdata may be a voltage fluctuation between a driving voltage AVDD and a ground voltage AVSS.

Each of the off-level gate voltage VGL and the on-level gate voltage VGH included in the scan signal Vgate applied to the gate line GL is corresponding DC voltage.

As described above, the touch electrode TE may function as a common electrode that performs display driving. Therefore, in the case 2 in which only display driving is performed during the active time, the second touch electrode driving signal TDS2 applied to the touch electrode TE corresponds to a common voltage for display.

Accordingly, in the corresponding subpixel SP, by a voltage difference between the data signal Vdata applied to the pixel electrode PXL through the data line DL and the second touch electrode driving signal TDS2 corresponding to the common voltage applied to the touch electrode TE, an electric field is formed between the pixel electrode PXL and the touch electrode TE, so that desired light may be emitted from the subpixel.

In case 3 in which touch driving is performed during the blank time, the touch electrode driving signal TDS3 applied to the touch electrode TE is a third touch electrode driving signal TDS3 having the third amplitude AMP3.

During the blank time, the data line DL may be applied with the data signal Vdata corresponding to the DC voltage, or may be in a floating state. During the blank time, the scan signal Vgate configured by the off-level gate voltage VGL corresponding to the DC voltage may be applied to the gate line GL.

During the blank time in which only touch driving is performed, if load free driving is performed, the data line DL and the gate line GL may be oscillated in the same manner as the touch electrode TE in terms of voltage characteristics.

According to load free driving, during the blank time, the data signal Vdata applied to the data line DL may be the third touch electrode driving signal TDS3 or may be a load free driving signal, the signal characteristic (e.g., a phase, a frequency, an amplitude, etc.) of which is similar to or the same as that of the third touch electrode driving signal TDS3.

According to load free driving, during the blank time, the off-level gate voltage VGL applied to the gate line GL may be the third touch electrode driving signal TDS3 or may be a load free driving signal, the signal characteristic (e.g., a phase, a frequency, an amplitude, etc.) of which is similar to or the same as that of the third touch electrode driving signal TDS3.

In case 1 in which display driving and touch driving are concurrently performed during the active time, the touch electrode driving signal TDS applied to the touch electrode TE is a first touch electrode driving signal TDS1 having a first amplitude AMP1.

In case 1, because display driving and touch driving are concurrently performed during the active time, the first touch electrode driving signal TDS1 may be a driving signal for touch sensing, and may be a common voltage Vcom for display at the same time.

The first touch electrode driving signal TDS1 applied to the touch electrode TE may be required to have a determined voltage difference for display with the data signal Vdata corresponding to the pixel voltage for display.

In case 1 in which display driving and touch driving are concurrently performed, the first touch electrode driving signal TDS1 performs two functions (a driving signal for touch sensing and a common voltage for display).

Accordingly, because the common voltage Vcom corresponding to the first touch electrode driving signal TDS1 is not a constant voltage and is a variable voltage, in order to prevent the data line DL from being influenced by touch driving, there should be, for the data signal Vdata, additional voltage fluctuation as much as the first amplitude AMP1 of the first touch electrode driving signal TDS 1 in addition to original voltage fluctuation for display.

Only then, in the voltage difference between the data signal Vdata corresponding to the pixel voltage and the first touch electrode driving signal TDS1 corresponding to the common voltage Vcom, a voltage fluctuation part (i.e., the first amplitude AMP1) of the first touch electrode driving signal TDS1 is excluded, and only the original voltage fluctuation for display is present. Accordingly, no al display may be possible.

Therefore, the data signal Vdata of case 1, in which display driving and touch driving are concurrently performed, may be a signal of the form in which the data signal Vdata of a case (case 2), in which only display driving is performed, and the first touch electrode driving signal TDS1 are combined.

In other words, the data signal Vdata of case 1, in which display driving and touch driving are concurrently performed, may be a signal of the form in which the original data signal Vdata of the case (case 2), in which only display driving is performed, is offset by the first touch electrode driving signal TDS1. The data signal Vdata may be a voltage fluctuation between a driving voltage AVDD and a ground voltage AVSS.

Therefore, the voltage difference between the data signal Vdata in case 1, in which touch driving and display driving are concurrently performed, and the first touch electrode driving signal TDS1 is the same as the voltage difference between the data signal Vdata in case 2, in which only display driving is performed, and the second touch electrode driving signal TDS2.

In case 1, because touch driving and display driving are concurrently performed, load free driving may be required.

That is, in case 1, because touch driving and display driving are concurrently performed, it may be necessary to prevent generation of parasitic capacitance between the touch electrode TE and the data line DL due to touch driving, and to prevent generation of parasitic capacitance between the touch electrode TE and the gate line GL due to touch driving.

According to the description above, in case 1, because the touch electrode TE and the data line DL are shaken according to voltage fluctuation of the first touch electrode driving signal TDS1, only a voltage difference for display occurs and unnecessary parasitic capacitance due to touch driving is not generated between the touch electrode TE and the data line DL. That is, in case 1, load free driving for the data line DL is necessarily performed.

In case 1, in order for the gate driving circuit GDC to generate a scan signal SCAN to be applied to the gate line GL, each of the on-level gate voltage VGH and the off-level gate voltage VGL supplied to the gate driving circuit GDC may be a load free driving signal, the signal characteristic (e.g., a phase, a frequency, an amplitude, etc.) of which is similar to or the same as that of the third touch electrode driving signal TDS3.

Figure 10:
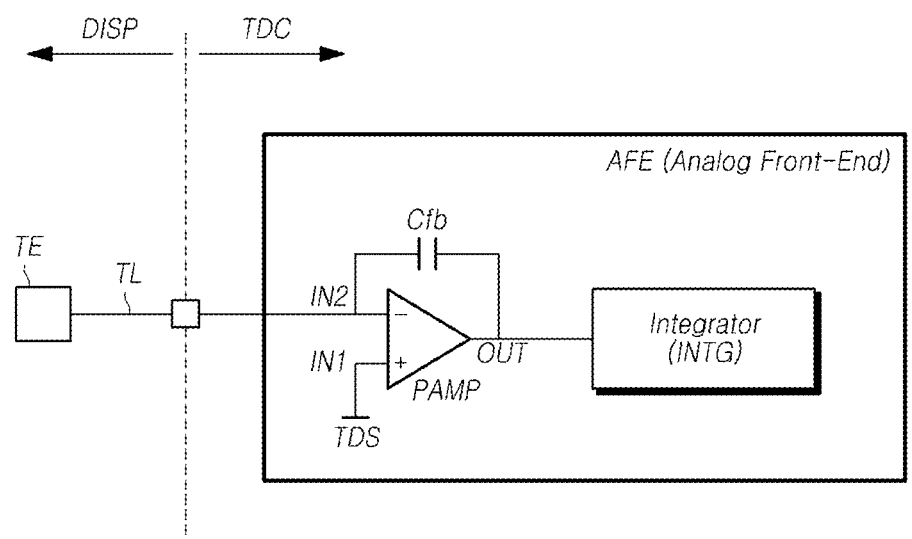
FIG. 10 is a diagram simply illustrating an analog front-end within a touch sensing circuit of the touch display device according to embodiments of the present disclosure.

FIG. 10 is a diagram simply illustrating an analog front-end AFE within a touch sensing circuit TDC of the touch display device according to embodiments of the present disclosure.

Referring to FIG. 10, the touch sensing circuit TDC includes an analog front-end AFE including a preamplifier PAMP, an integrator INTG, and the like.

The preamplifier PAMP has a first input terminal IN1, a second input terminal IN2, and an output terminal.

In the preamplifier PAMP, a touch electrode driving signal TDS (TDS1 or TDS3 of FIG. 9) in a pulse signal form is input to the first input terminal IN1. The second input terminal IN2 may be electrically connected to a touch line TL that is connected to a touch electrode TE to be sensed in the display panel DISP. The touch electrode driving signal TDS input to the first input terminal IN1 may be applied to the touch electrode TE through the second input terminal IN2.

In the preamplifier PAMP, a feedback capacitor Cfb may be electrically connected between the second input terminal IN2 and the output terminal OUT.

As the touch electrode driving signal TDS is applied to the touch electrode TE, the feedback capacitor Cfb may be charged. The charging amount of the feedback capacitor Cfb may vary depending on whether a touch pointer (e.g., a finger, a pen, etc.) touches or is close to the touch electrode TE.

Figure 11:
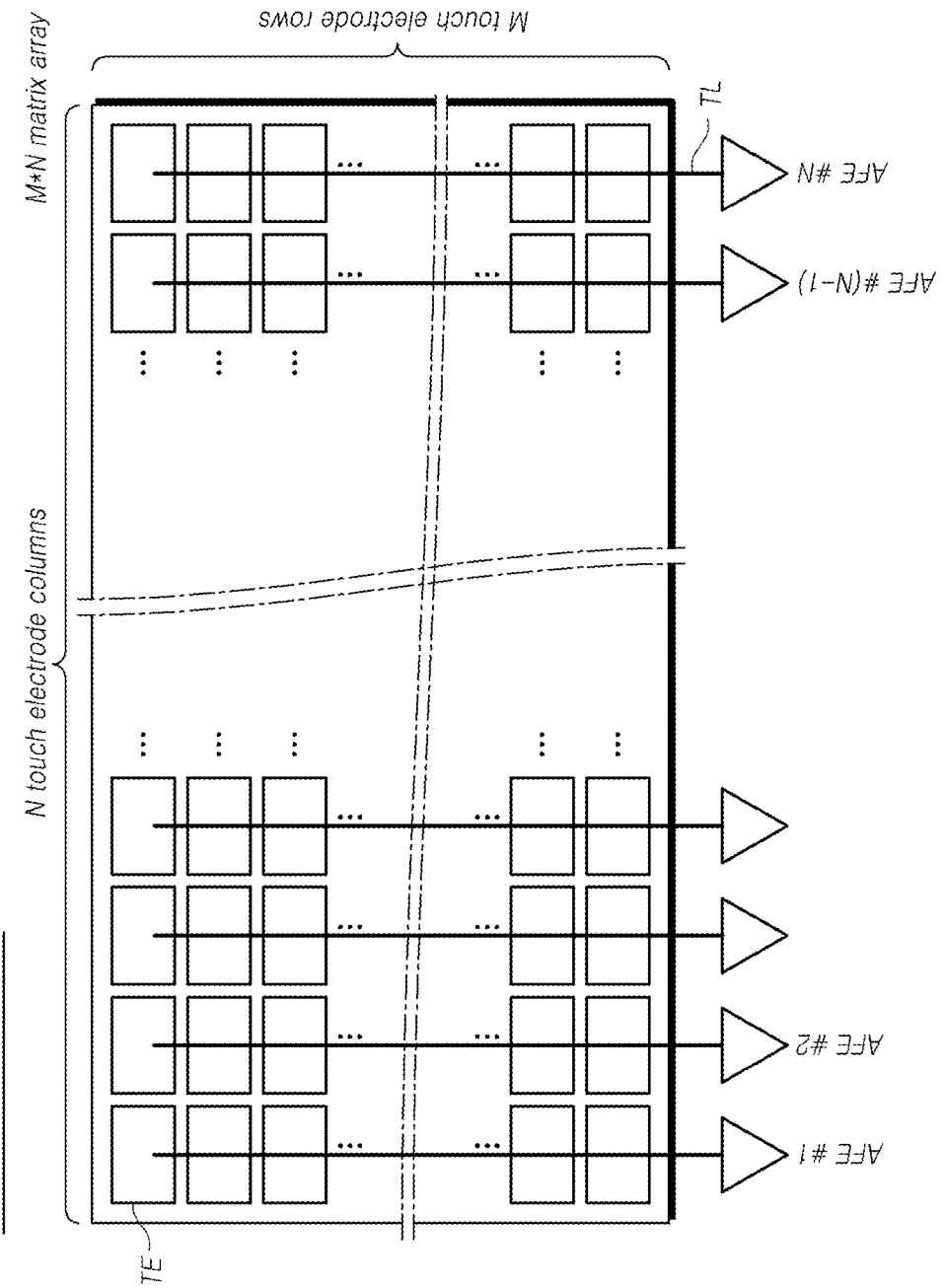
FIG. 11 is a diagram illustrating a single-ended sensing scheme of the touch display device according to embodiments of the present disclosure.

FIG. 11 is a diagram illustrating a single-ended sensing scheme of the touch display device according to embodiments of the present disclosure.

Referring to FIG. 11, in the touch display device according to embodiments of the present disclosure, one analog front-end AFE may sense a touch electrode TE to be touch-sensed, as shown in FIG. 10. This sensing scheme is referred to as a "single-ended sensing scheme".

Referring to FIG. 11, the single-ended sensing scheme will be described as an example.

The M*N number of touch electrodes TE disposed in the display panel DISP may be arranged in M rows and N columns. M may be a natural number of 2 or greater, and N may be a natural number of 2 or greater.

For example, the touch display device may include the N number of analog front-ends AFE#1-AFE#N. When the N number of touch electrodes TE arranged in a first row are objects to be sensed, according to the single-ended sensing scheme, the N number of analog front-ends AFE#1-AFE#N may correspond one-to-one to the N number of touch electrodes TE arranged in the first row, and may sense the N number of touch electrodes TE.

In the case of the single-ended sensing scheme described above, it may take a lot of time to sense all touch electrodes TE.

In the case (case 1) in which display driving and touch driving are concurrently performed according to the time free driving scheme, according to the single-ended scheme, display driving may greatly affect touch sensing. This phenomenon is referred to as a "Display to Touch Crosstalk (DTX) phenomenon".

As shown in FIG. 2 and FIG. 3, the DTX phenomenon may further become worse when each touch electrode TE column is overlappingly disposed with one or more data lines DL.

In the case (case 1) in which display driving and touch driving are concurrently performed according to the time free driving scheme, unnecessary noise may occur in a touch electrode column parallel to the data line DL due to voltage fluctuation of the data line DL. The occurrence of the unnecessary noise may correspond to occurrence of the DTX phenomenon, may degrade a touch sensing performance, and may degrade a display performance in some cases.

As described above, in order to reduce the DTX phenomenon which may become worse in the single-ended sensing scheme, the touch display device according to embodiments of the present disclosure may "differentially sense" two touch electrodes TE arranged in a direction in which the data line DL is disposed.

Figure 12:
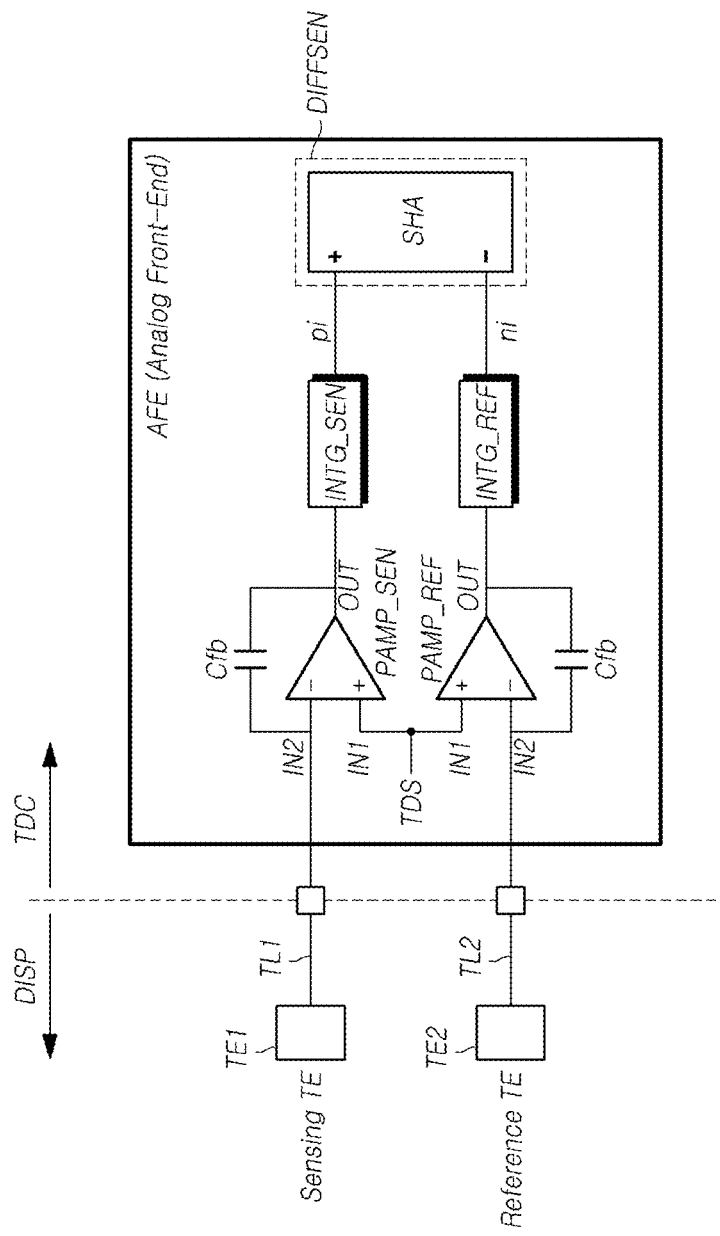
FIG. 12 and FIG. 13 are diagrams simply illustrating an analog front-end within a touch sensing circuit when the touch display device performs differential sensing according to embodiments of the present disclosure.
Figure 13:
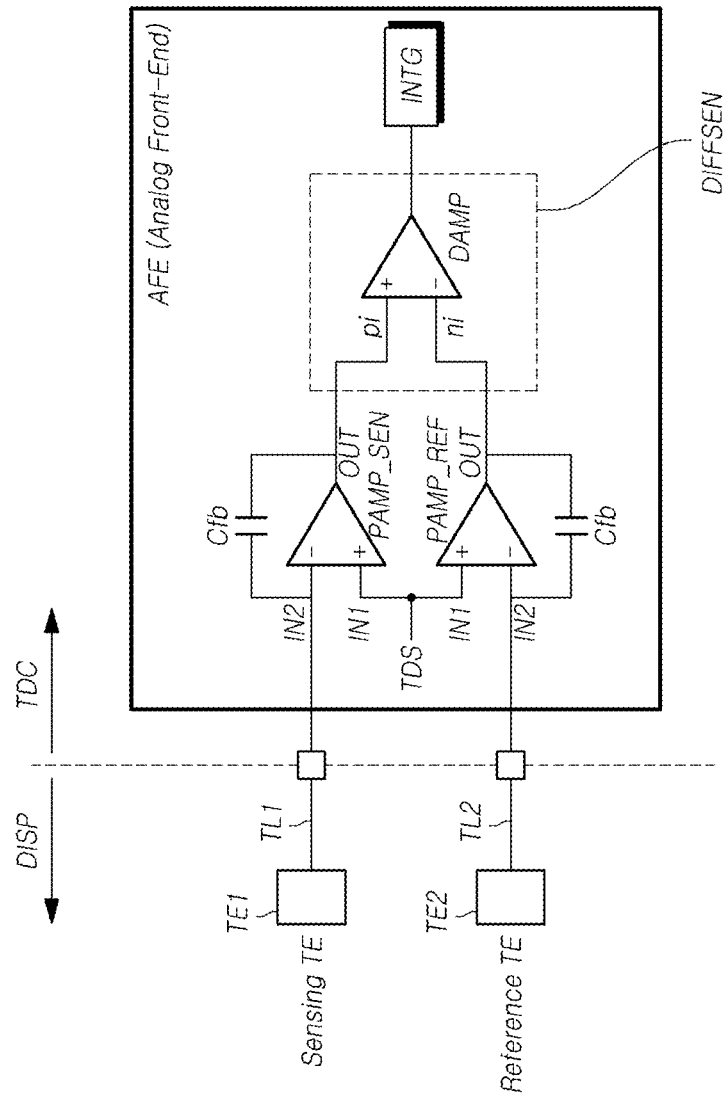

FIG. 12 and FIG. 13 are diagrams simply illustrating an analog front-end AFE within a touch sensing circuit TDC when the touch display device performs differential sensing according to embodiments of the present disclosure.

Referring to FIG. 12 and FIG. 13, in order for the touch display device according to embodiments of the present disclosure to perform differential sensing, the analog front-end AFE within the touch sensing circuit TDC may include a differential sensing circuit DIFFSEN.

The differential sensing circuit DIFFSEN may output or store a difference between voltages input to a positive input terminal pi and a negative input terminal ni, respectively.

The positive input terminal pi of the differential sensing circuit DIFFSEN is connected to an output terminal OUT of a first preamplifier PAMP_SEN that detects a signal of a touch electrode TE1 to be sensed. The negative input terminal ni of the differential sensing circuit DIFFSEN is connected to an output terminal OUT of a second preamplifier PAMP_REF that detects a signal of another touch electrode TE2 other than the touch electrode TE1 to be sensed.

The touch electrode TE2 other than the touch electrode TE1 to be sensed is also referred to as a touch electrode TE serving as a reference for differential sensing.

Likewise, two touch electrodes TE1 and TE2 to be differentially sensed may include the touch electrode TE1 to be sensed and the touch electrode TE serving as a reference, and may be touch electrodes disposed in parallel with a direction in which the data lines DL are extended (column direction). The two touch electrodes TE1 and TE2 to be differentially sensed may be touch electrodes arranged in the same touch electrode column.

As illustrated in FIG. 12, the differential sensing circuit DIFFSEN may be a Sample-and-Hold Circuit SHA. Alternatively, as illustrated in FIG. 13, the differential sensing circuit DIFFSEN may be a differential amplifier DAMP.

Referring to FIG. 12 and FIG. 13, the first preamplifier PAMP_SEN may be electrically connected between the positive input terminal pi of the differential sensing circuit DIFFSEN and the touch electrode TE1 to be sensed. The second preamplifier PAMP_REF may be electrically connected between the negative input terminal ni of the differential sensing circuit and the touch electrode TE2 serving as a reference.

Referring to FIG. 12, a first integrator INTG_SEN may be electrically connected between the positive input terminal pi of the differential sensing circuit DIFFSEN and the first preamplifier PAMP_SEN. A second integrator INTG_REF may be electrically connected between the negative input terminal ni of the differential sensing circuit DIFFSEN and the second preamplifier PAMP_REF.

In this case, because the differential sensing circuit DIFFSEN stores or outputs a difference between an integration value output from the first integrator INTG_SEN and an integration value output from the second integrator INTG_REF so as to perform differential sensing, more accurate differential sensing may be possible. A value output from the differential sensing circuit DIFFSEN may be input to the analog-to-digital converter ADC.

Unlike FIG. 12, as illustrated in FIG. 13, an integrator INTG may be connected to the output terminal of the differential sensing circuit DIFFSEN. In this case, it is beneficial to reduce the number of integrators INTG. The value output from the integrator INTG may be input to the analog-to-digital converter ADC.

Figure 14:
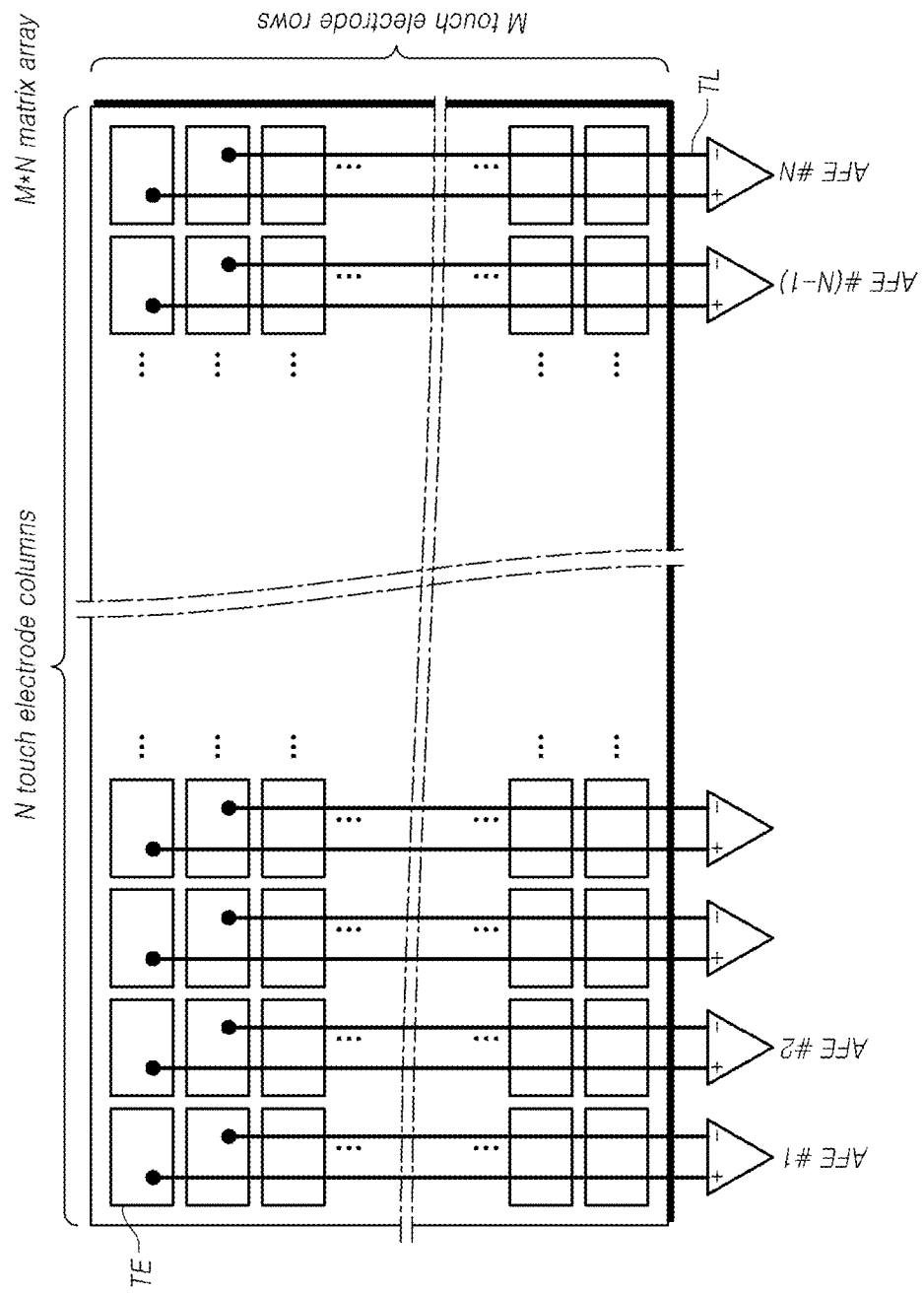
FIG. 14 to FIG. 16 are diagrams illustrating a sequential differential sensing scheme of the touch display device according to embodiments of the present disclosure.
Figure 15:
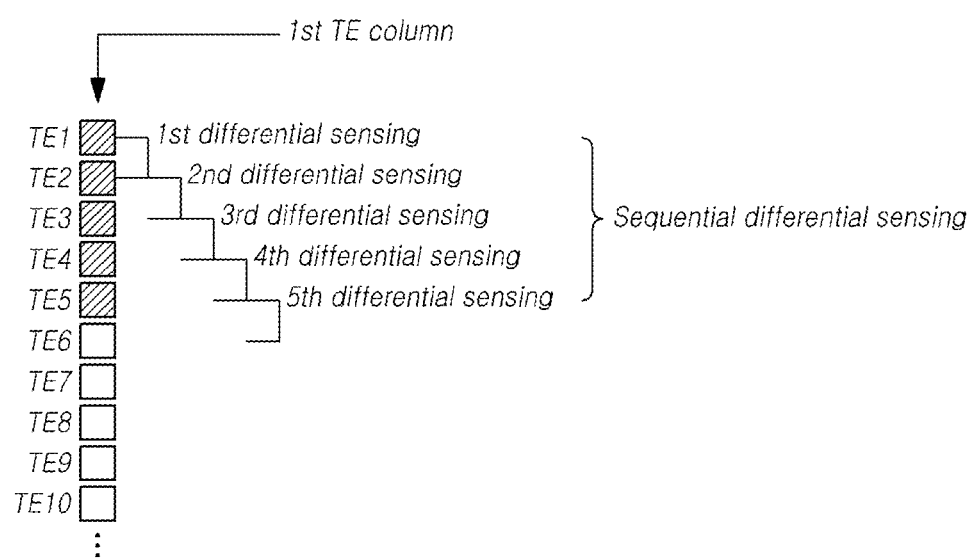
Figure 16:
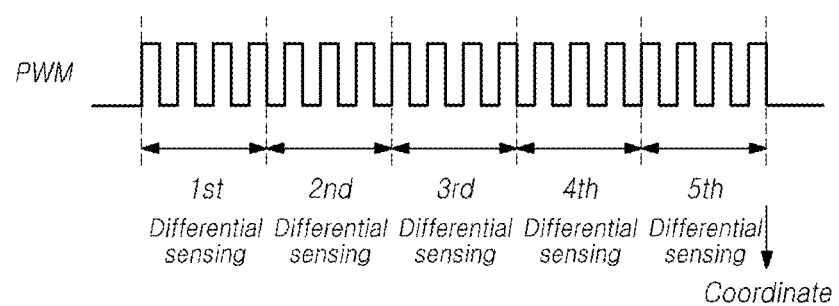

FIG. 14 to FIG. 16 are diagrams illustrating a sequential differential sensing scheme of the touch display device according to embodiments of the present disclosure.

Referring to FIG. 14, the touch display device according to embodiments of the present disclosure may differentially sense two touch electrodes TE included in the same column according to a differential sensing scheme.

As illustrated in FIG. 14, the M*N number of touch electrodes disposed in the display panel DISP may be arranged in M rows and N columns. M may be a natural number of 2 or greater, and N may be a natural number of 2 or greater.

For example, the touch display device may include the N number of analog front-ends AFE#1-AFE#N. When the N number of touch electrodes TE arranged in the first row are touch electrodes to be sensed and the N number of touch electrodes TE arranged in a second row are touch electrodes serving as a reference, according to the differential sensing scheme, the N number of analog front-ends AFE#1-AFE#N may differentially sense the N number of touch electrodes TE arranged in the first row and the N number of touch electrodes TE arranged in the second row.

Referring to FIG. 14, in each of the N analog front-ends AFE#1-AFE#N, a "+" sign represents the positive input terminal pi of the differential sensing circuit DIFFSEN in FIG. 12 and FIG. 13. In each of the N analog front-ends AFE#1-AFE#N, a "−" sign represents the negative input terminal ni of the differential sensing circuit DIFFSEN in FIG. 12 and FIG. 13.

As illustrated in FIG. 14, a scheme of differentially sensing two touch electrodes TE, which are directly adjacent and included in the same touch electrode column, is referred to as a "sequentially differential sensing scheme".

Referring to FIG. 15 and FIG. 16, an example of sequentially sensing ten touch electrodes TE1-TE10 included in the first touch electrode column (1st TE column) will be described. Here, the ten touch electrodes TE1-TE10 represent ten touch electrode rows (TE row).

Referring to FIG. 15, according to the sequential differential scheme, the touch sensing circuit TDC differentially senses (1st differential sensing) TE1 (a touch electrode to be sensed) and TE2 (a reference touch electrode), continues differential sensing (2nd differential sensing) of TE2 (a touch electrode to be sensed) and TE3 (a reference touch electrode), continues differential sensing (3rd differential sensing) of TE3 (a touch electrode to be sensed) and TE4 (a reference touch electrode), continues differential sensing (4th differential sensing) of TE4 (a touch electrode to be sensed) and TE5 (a reference touch electrode), and then continues differential sensing (5th differential sensing) of TE5 (a touch electrode to be sensed) and TE6 (a reference touch electrode).

Referring to FIG. 16, if it is assumed that touch coordinates are obtained after, for example, first to fifth differential sensing is sequentially performed, that is, for pulse signals PWM for first to fifth differential sensing, after the touch electrode driving signal TDS is supplied to the display panel DISP, five driving times are required for the first to fifth differential sensing.

Therefore, it takes a lot of time to sense all five touch electrode lines (i.e., five touch electrodes TE1-TE5) according to the sequential differential sensing scheme. Particularly, it may be difficult or impossible to perform local sensing of a touch by a finger or a pen.

In order to reduce a sensing time, it is required to reduce the pulse number of the touch electrode driving signal TDS. However, in this case, touch sensing performance (touch sensitivity) is inevitably lowered due to reduction of the pulse number.

After touch driving for each of the five times of differential sensing (the first to fifth differential sensing), since time to transmit sensing data to the touch controller TCTR is necessary, it becomes more difficult to reduce the sensing time.

Therefore, the touch display device according to embodiments of the present disclosure proposes a "group differential sensing scheme" that is a new differential sensing scheme, by which a sensing time may be reduced, finger/pen local sensing may be possible, and deterioration of touch sensitivity may also be prevented. Hereinafter, a "group differential sensing scheme" will be described in detail.

Figure 17:
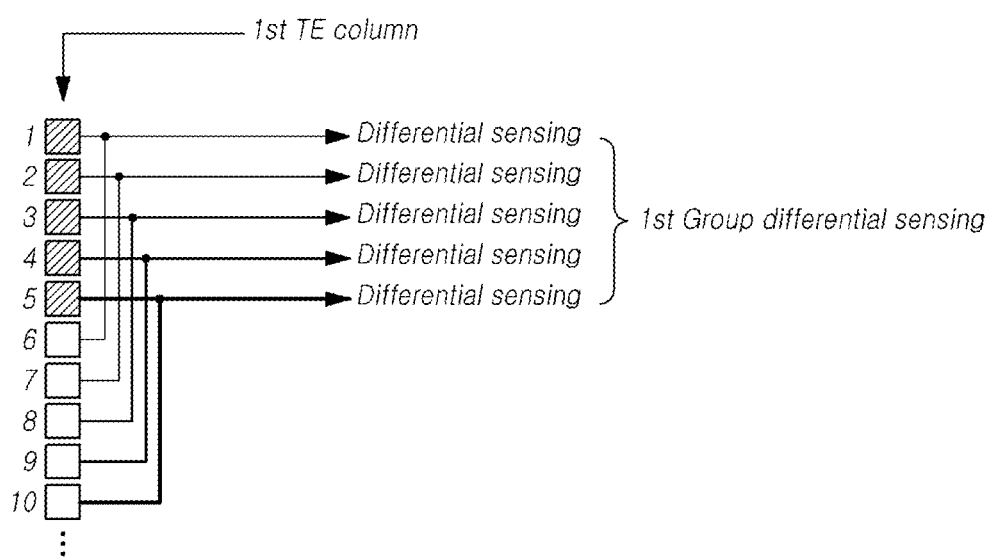
FIG. 17 and FIG. 18 are diagrams illustrating a group differential sensing scheme of the touch display device according to embodiments of the present disclosure.
Figure 18:
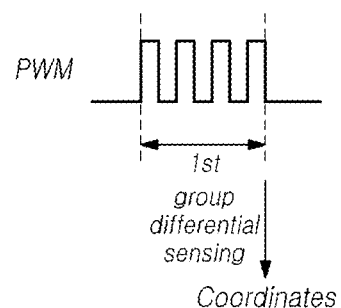

FIG. 17 and FIG. 18 are diagrams illustrating a group differential sensing scheme of the touch display device according to embodiments of the present disclosure.

Referring to FIG. 17 and FIG. 18, according to the group differential sensing scheme, all or some of ten touch electrodes TE1-TE10 included in a first touch electrode column (1st TE column) are grouped into a single group (hereinafter, referred to as a "touch electrode group (TEG)"). Here, the ten touch electrodes TE1-TE10 represent ten touch electrode rows (TE row).

FIG. 17 shows a case in which, among ten touch electrodes TE1-TE10, first five touch electrodes TE1-TE5 are grouped into one group of a first touch electrode group TEG#A, and following five touch electrodes TE6-TE10 are grouped into another group of a second touch electrode group TEG#B.

Referring to FIG. 17 and FIG. 18, according to the group differential scheme, when performing a first group differential sensing, the touch sensing circuit TDC selects, as sensing touch electrodes, five touch electrodes TE1-TE5 included in the first touch electrode group TEG#A and concurrently senses the selected five touch electrodes TE1-TE5. Thereafter, when performing a second group differential sensing, the touch sensing circuit TDC selects, as sensing touch electrodes, five touch electrodes TE6-TE10 included in the second touch electrode group TEG#B, and concurrently senses the selected five touch electrodes TE6-TE10.

More particularly, referring to FIG. 17, when performing the first group differential sensing, the touch sensing circuit TDC may select, as sensing touch electrodes, five touch electrodes TE1-TE5 included in the first touch electrode group TEG#A, may select, as reference touch electrodes, five touch electrodes TE6-TE10 included in the second touch electrode group TEG#B, and may match the five touch electrodes TE1-TE5 included in the first touch electrode group TEG#A and the five touch electrodes TE6-TE10 included in the second touch electrode group TEG#B, so as to perform differential sensing.

That is, when performing the first group differential sensing, the touch sensing circuit TDC may concurrently perform differential sensing for TE1 (sensing touch electrode) and TE6 (reference touch electrode), differential sensing for TE2 (sensing touch electrode) and TE7 (reference touch electrode), differential sensing for TE3 (sensing touch electrode) and TE8 (reference touch electrode), differential sensing for TE4 (sensing touch electrode) and TE9 (reference touch electrode), and differential sensing for TE5 (sensing touch electrode) and TE10 (reference touch electrode).

Likewise, a second group differential sensing between the second touch electrode group TEG#B and another touch electrode group following thereafter may be performed.

Sensing data obtained as a result of the first group differential sensing is sensing data of the five touch electrodes TE1-TE5 included in the first touch electrode group TEG#A. Further, sensing data obtained as a result of the second group differential sensing is sensing data of the five touch electrodes TE6-TE10 included in the second touch electrode group TEG#B.

Referring to FIG. 18, according to the group differential sensing scheme described above, it may be known that time required to obtain touch coordinates by sensing five touch electrodes TE1-TE5 included in the first touch electrode group TEG#A has been reduced to ⅕ of time required to obtain touch coordinates by sensing the same five touch electrodes TE1-TE5 according to the sequential differential sensing scheme in FIG. 16.

Therefore, according to the group differential sensing scheme, a sensing time may be reduced, finger/pen local sensing may be possible, and deterioration of touch sensitivity may also be prevented.

While a sensing operation is performed according to the group differential sensing scheme, the touch sensing circuit TDC may receive a pen signal output from a pen via at least one of multiple touch electrodes TE.

Hereinafter, the group differential sensing scheme will be described more specifically with respect to the touch sensing circuit TDC.

Figure 19:
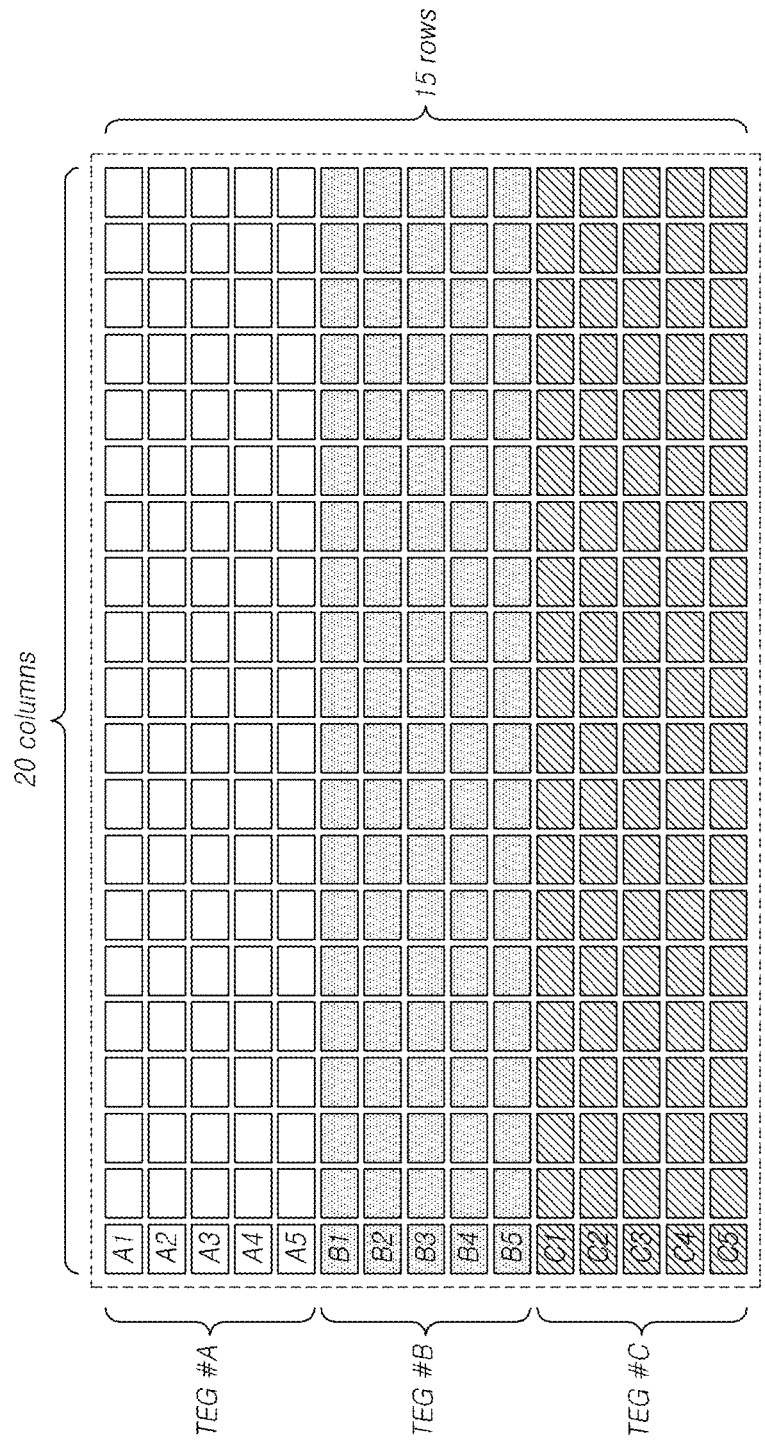
FIG. 19 is an exemplary diagram of touch electrode arrangement for describing an exemplary group differential sensing scheme of the touch display device according to embodiments of the present disclosure.
Figure 20:
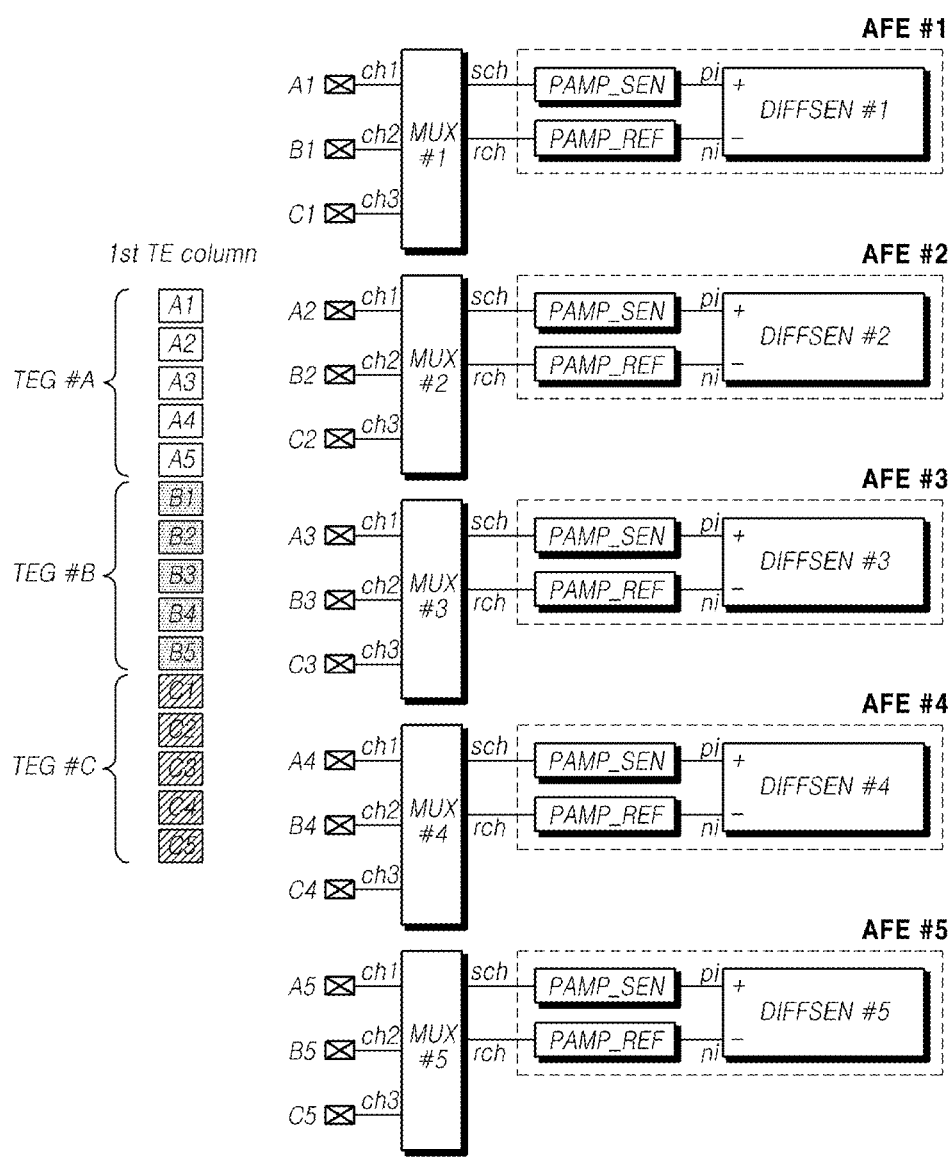
FIG. 20 is a diagram simply illustrating, in order to describe the exemplary group differential sensing scheme of the touch display device, structures of analog front-ends and multiplexers for group differential sensing with respect to each touch electrode column in the touch electrode arrangement structure in FIG. 19 according to embodiments of the present disclosure.
Figure 21:
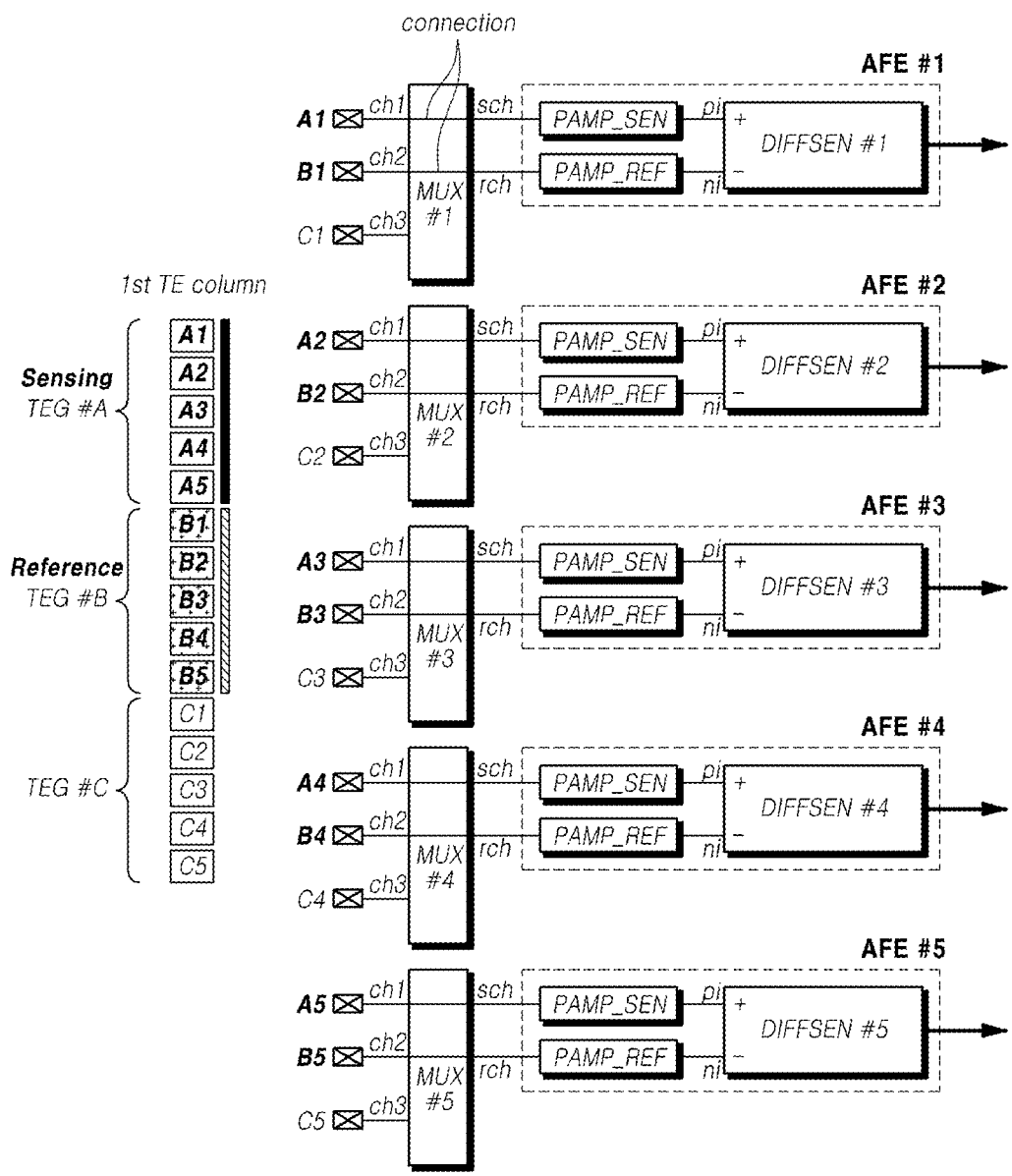
FIG. 21 and FIG. 22 are diagrams illustrating a group differential sensing procedure of the touch display device with respect to each touch electrode column during a j-th frame according to embodiments of the present disclosure.
Figure 22:
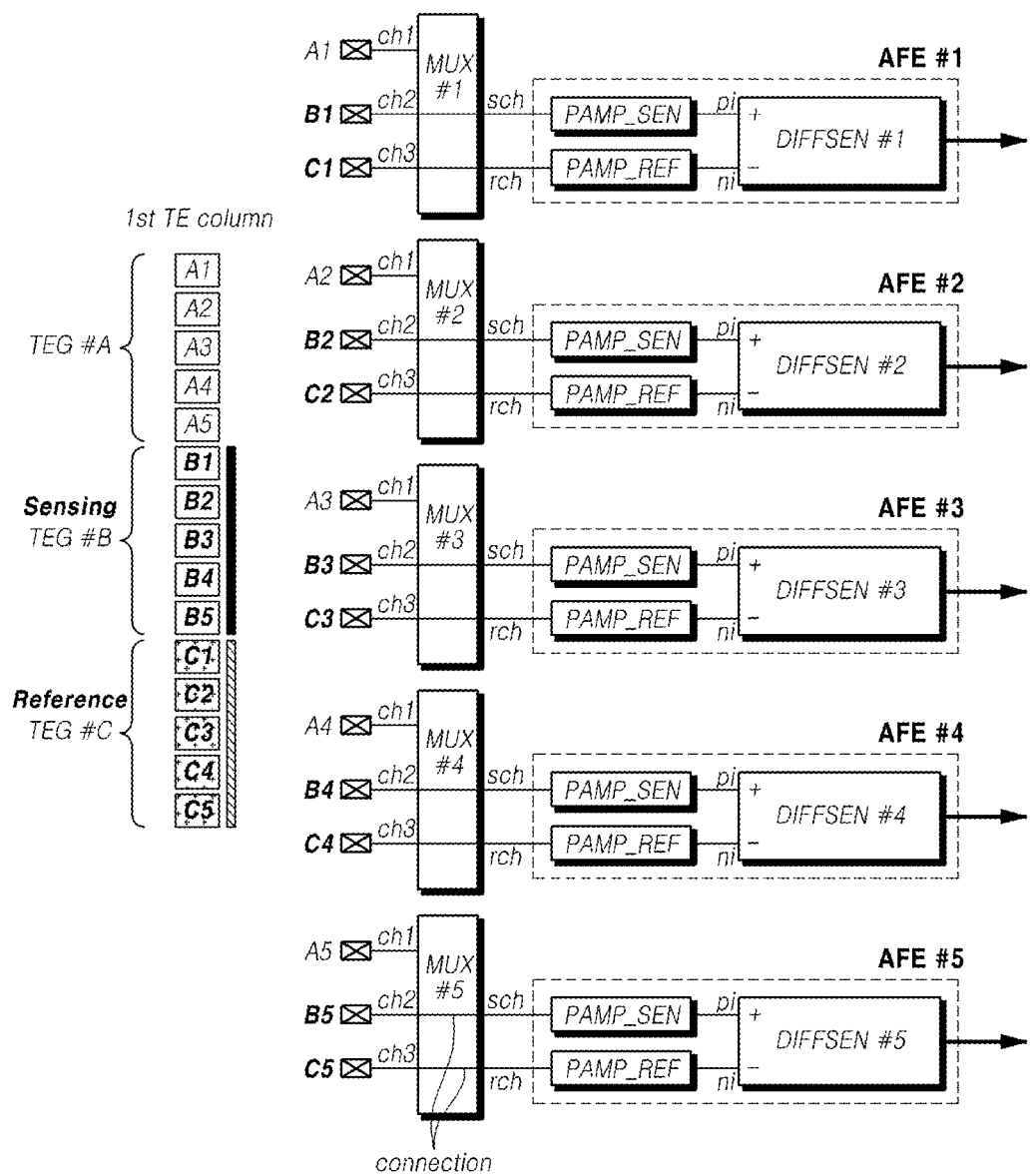

FIG. 19 is an exemplary diagram of touch electrode TE arrangement for describing an exemplary group differential sensing scheme of the touch display device according to embodiments of the present disclosure, and FIG. 20 is a diagram simply illustrating, in order to describe the exemplary group differential sensing scheme of the touch display device, structures of analog front-ends AFE and multiplexers for group differential sensing with respect to each touch electrode column (TE column) in the touch electrode arrangement structure in FIG. 19 according to embodiments of the present disclosure. FIG. 21 and FIG. 22 are diagrams illustrating a group differential sensing procedure with respect to each touch electrode column (TE column) during a j-th frame according to embodiments of the present disclosure.

The touch display device according to embodiments of the present disclosure may include multiple touch electrodes TE, a touch sensing circuit TDC that senses the multiple touch electrodes TE for each group, and the like.

As illustrated in FIG. 19, the M(M=15) number of touch electrodes A1-A5, B1-B5, and C1-C5 disposed in each touch electrode column (TE column) may be grouped into the g number of touch electrode groups TEG#A, TEG#B, and TEG#C (g=3), each of which include the k number of touch electrodes (k=5).

G represents the number of the touch electrode groups, i.e., aggregates of concurrently sensible touch electrodes, and may be a natural number of 2 or greater. K represents the number of touch electrode rows included in one touch electrode group and may be a natural number of 2 or greater. In terms of one touch electrode column, k represents the number of touch electrodes included in one touch electrode group and may be a natural number of 2 or greater. According to description above, M which represents the number of touch electrode rows is (g*k).

Figure 27:
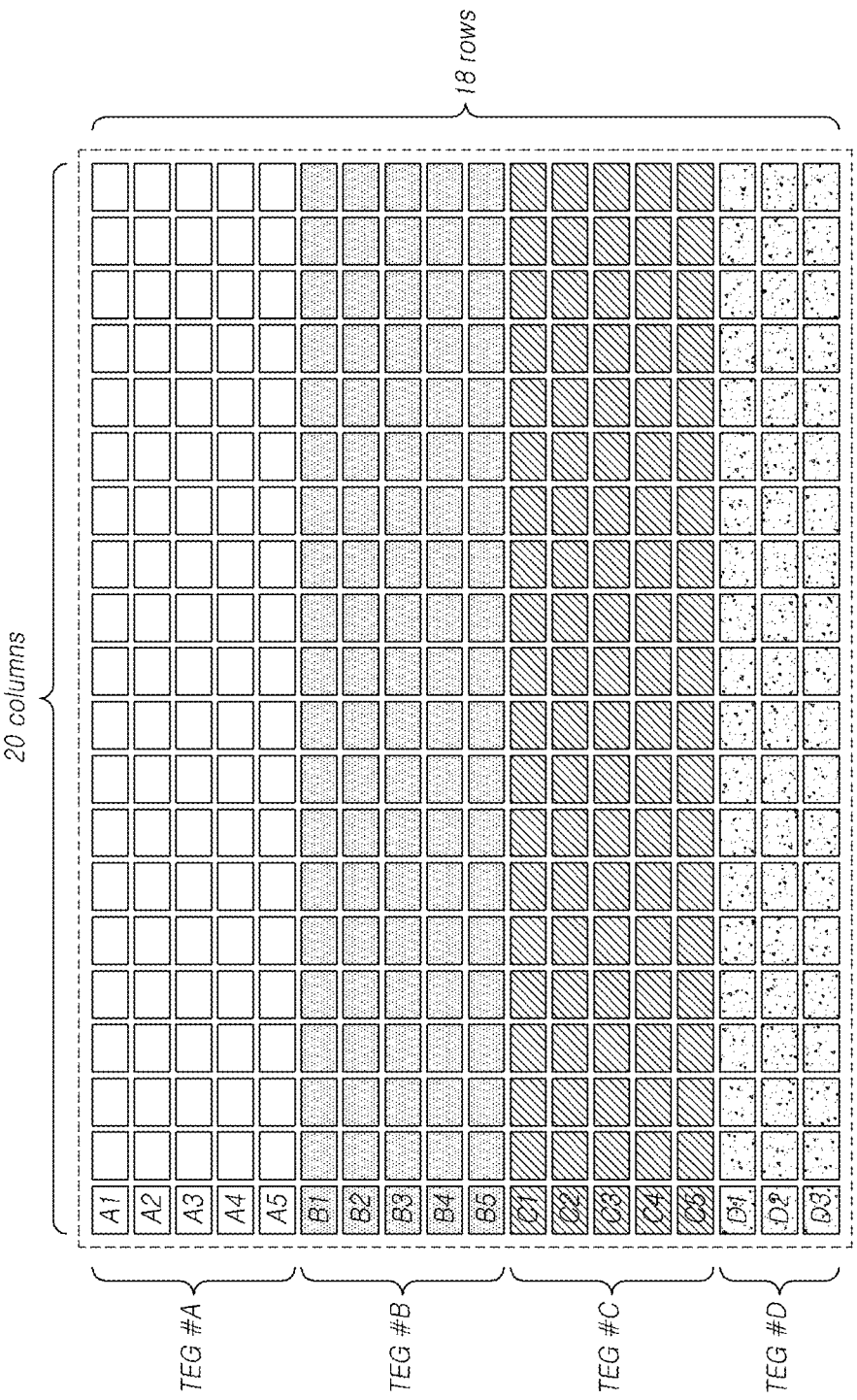
FIG. 27 is another exemplary diagram of touch electrode arrangement for describing an exemplary group differential sensing scheme of the touch display device according to embodiments of the present disclosure.

Alternatively, hereinafter, as illustrated in FIG. 27, the M number of touch electrodes TE disposed in each touch electrode column TE (TE column) may be grouped into the g number of touch electrode groups TEG#A, TEG#B, and TEG#C, each of which includes the k number of touch electrodes TE, and an additional touch electrode group TEG#D including the d number of touch electrodes, in which d is different from k.

According to an example of FIG. 19, the multiple touch electrodes TE arranged in a matrix type may be arranged in a matrix of 300, and 300 touch electrodes TE may be arranged in a matrix of 15 rows and 20 columns. That is, the number M of touch electrode rows is 15, and the number N of touch electrode columns is 20 (M=15, N=20).

According to the example of FIG. 19, g=3, k=5, and M=g*k=3*5=15.

There are three touch electrode groups TEG#A, TEG#B, TEG#C in the display panel DISP (g=3). There are five touch electrode rows in each of three touch electrode groups TEG#A, TEG#B, and TEG#C (k=5). In the first touch electrode column, five touch electrodes may be included in each of three touch electrode groups TEG#A, TEG#B, and TEG#C. More particularly, five touch electrodes A1-A5 are included in the first touch electrode group TEG#A. Five touch electrodes B1-B5 are included in the second touch electrode group TEG#B. Five touch electrodes C1-C5 are included in the third touch electrode group TEG#C. The number M of touch electrode rows is 15 (=3*5).

Referring to FIG. 20, during the j-th frame, in the case of sensing the first touch electrode group TEG#A, the touch sensing circuit TDC may select, as sensing touch electrodes, five touch electrodes A1-A5 included in the first touch electrode group TEG#A from among three touch electrode groups EG#A, TEG#B, and TEG#C, may select, as reference touch electrodes, five touch electrodes B1-B5 included in the second touch electrode group TEG#B from among three touch electrode groups TEG#A, TEG#B, and TEG#C, and then may match the five touch electrodes A1-A5 included in the first touch electrode group TEG#A and the five touch electrodes B1-B5 included in the second touch electrode group TEG#B, so as to perform differential sensing.

That is, the touch sensing circuit TDC may concurrently perform differential sensing for the touch electrode A1 (sensing touch electrode) and the touch electrode B1 (reference touch electrode), differential sensing for the touch electrode A2 (sensing touch electrode) and the touch electrode B2 (reference touch electrode), differential sensing for the touch electrode A3 (sensing touch electrode) and the touch electrode B3 (reference touch electrode), differential sensing for the touch electrode A4 (sensing touch electrode) and the touch electrode B4 (reference touch electrode), and differential sensing for the touch electrode A5 (sensing touch electrode) and the touch electrode B5 (reference touch electrode).

Referring to FIG. 20, for the group differential sensing scheme described above, the touch sensing circuit TDC according to embodiments of the present disclosure may include the k number of analog front-ends (when k=5, AFE#1-AFE#5). Each of the k number of analog front-ends (when k=5, AFE#1-AFE#5) may include one multiplexer, one differential sensing circuit, and the like (see FIG. 12 and FIG. 13).

Therefore, the touch sensing circuit TDC according to embodiments of the present disclosure may include the k number of multiplexers (when k=5, MUX#1 to MUX#5), the k number of differential sensing circuits DIFFSEN#1-DIFFSEN#5, and the like. Here, the number of the multiplexers and the number of the differential sensing circuits may be the same as k which represents the number of touch electrode rows within a single touch electrode group (the number of touch electrodes within the touch electrode group in a single touch electrode column).

The touch sensing circuit TDC may include: the k number of multiplexers MUX#1-MUX#5 (k=5), in which k is the number of the touch electrodes TE (k=5) included in each of the g number of touch electrode groups TEG#A, TEG#B, and TEG#C (g=3); and the k number of differential sensing circuits DIFFSEN#1-DIFFSEN#5 corresponding to the k number of multiplexers MUX#1-MUX#5.

Each of the k number of multiplexers MUX#1-MUX#5 may select one sensing channel and one reference channel from among the g number of channels ch1-ch3.

Each of the k number of differential sensing circuits DIFFSEN#1-DIFFSEN#5 may have a positive input terminal pi and a negative input terminal ni. The positive input terminal pi and the negative input terminal ni of each of the k number of differential sensing circuits DIFFSEN#1-DIFFSEN#5 may be electrically connected to a sensing channel connection terminal sch and a reference channel connection terminal rch of each of the k number of multiplexers MUX#1-MUX#5.

As an example of group differential sensing, during the j-th frame, the k number of multiplexers MUX#1-MUX#5 may select, as sensing touch electrodes, the k number of touch electrodes A1-A5 (k≥2) included in the first touch electrode group TEG#A from among the g number of touch electrode groups (g≥2) (when g=3, TEG#A, TEG#B, and TEG#C) in which multiple touch electrodes TE are grouped, and may select, as reference touch electrodes, five touch electrodes B1-B5 included in the second touch electrode group TEG#B from among the g number of touch electrode groups (when g=3, TEG#A, TEG#B, and TEG#C).

The k number of differential sensing circuits DIFFSEN#1-DIFFSEN#5 may match the five touch electrodes A1-A5 included in the first touch electrode group TEG#A that is a sensing touch electrode group and the five touch electrodes B1-B5 included in the second touch electrode group TEG#B that is a reference touch electrode group, so as to perform differential sensing.

Referring to FIG. 20, the five touch electrodes A1-A5 included in the first touch electrode group TEG#A may be divided and connected to the k number of multiplexers MUX#1-MUX#5 (k=5). When the first touch electrode group TEG#A is a concurrently sensed touch electrode group, the k number of multiplexers MUX#1-MUX#5 (k=5) may select, as sensing touch electrodes, all the five touch electrodes A1-A5 included in the first touch electrode group TEG#A, so as to connect the selected touch electrodes to positive input terminals pi of the k number of differential sensing circuits DIFFSEN#1-DIFFSEN#5 (k=5).

Referring to FIG. 20, the five touch electrodes B1-B5 included in the second touch electrode group TEG#B may be divided and connected to the k number of multiplexers MUX#1-MUX#5 (k=5). When the first touch electrode group TEG#A is a concurrently sensed touch electrode group, in the case where the second touch electrode group TEG#B is a touch electrode group serving as a reference, the k number of multiplexers MUX#1-MUX#5 may select, as reference touch electrodes, all the five touch electrodes B1-B5 included in the second touch electrode group TEG#B, so as to connect the selected touch electrodes to negative input terminals ni of the k number of differential sensing circuits DIFFSEN#1-DIFFSEN#5 (k=5).

Referring to FIG. 20, each of the five differential sensing circuits DIFFSEN#1-DIFFSEN#5 may include a positive input terminal pi, a negative input terminal ni, and an output terminal.

In each of the five differential sensing circuits DIFFSEN#1-DIFFSEN#5, the positive input terminal pi may be electrically connected to one of the five touch electrodes A1-A5 included in the first touch electrode group TEG#A, which have been selected as sensing touch electrodes. The negative input terminal ni may be electrically connected to one of the five touch electrodes B1-B5 included in the second touch electrode group TEG#B, which have been selected as reference touch electrodes. The output terminal may be stored or output a voltage difference between the positive input terminal pi and the negative input terminal ni.

The first touch electrode group TEG#A among three touch electrode groups TEG#A, TEG#B, and TEG#C may be positioned closer to the touch sensing circuit TDC compared to the second touch electrode group TEG#B.

On the contrary, the second touch electrode group TEG#B among three touch electrode groups TEG#A, TEG#B, and TEG#C may be positioned closer to the touch sensing circuit TDC compared to the first touch electrode group TEG#A.

As illustrated in FIG. 12 and FIG. 13, each of the k number of differential sensing circuits DIFFSEN#1-DIFFSEN#5 may be a sample-and-hold circuit SHA or a differential amplifier DAMP.

Referring to FIG. 20, a circuit structure will be examined in terms of an i-th multiplexer (i is one of numbers from 1 to k) among the k number of multiplexers MUX#1-MUX#5 and an i-th differential sensing circuit corresponding to the i-th multiplexer from among the k number of differential sensing circuits DIFFSEN#1-DIFFSEN#5.

A first preamplifier PAMP_SEN electrically connected between a sensing channel connection terminal sch of the i-th multiplexer and a positive input terminal pi of the i-th differential sensing circuit, and a second preamplifier PAMP_REF electrically connected between a reference channel connection terminal rch of the i-th multiplexer and a negative input terminal ni of the i-th differential sensing circuit may be included.

FIG. 20 is a circuit structure in which an integrator configuration is omitted. When the integrator configuration is added, as illustrated in FIG. 12, a first integrator INTG_SEN may be connected between the positive input terminal pi of the i-th differential sensing circuit and the first preamplifier PAMP_SEN, and a second integrator INTG_REF may be connected between the negative input terminal ni of the i-th differential sensing circuit and the second preamplifier PAMP_REF.

Alternatively, when the integrator configuration is added, as illustrated in FIG. 13, one integrator INTG may be connected to an output terminal of the i-th differential sensing circuit.

In other words, the touch sensing circuit TDC may include: the k number of multiplexers MUX#1-MUX#5, in which k is the number of the touch electrodes TE (k=5) included in each of the g number of touch electrode groups TEG#A, TEG#B, and TEG#C (g=3); and the k number of differential sensing circuits DIFFSEN#1-DIFFSEN#5 corresponding to the k number of multiplexers MUX#1-MUX#5.

Each of the k number of multiplexers MUX#1-MUX#5 may select one sensing channel and one reference channel from among the g number of channels ch1-ch3.

Each of the k number of differential sensing circuits DIFFSEN#1-DIFFSEN#5 may have a positive input terminal pi and a negative input terminal ni.

The i-th multiplexer among the k number of multiplexers MUX#1-MUX#5 may be connected to the i-th differential sensing circuit among the k number of differential sensing circuits DIFFSEN#1-DIFFSEN#5. i may be one of numbers from 1 to k.

The i-th multiplexer may select one sensing channel and one reference channel from among the g number of channels ch1-ch3, and may connect the selected sensing channel and reference channel to a sensing channel connection terminal sch and a reference channel connection terminal rch, respectively.

The g number of channels ch1-ch3 of the i-th multiplexer may correspond to i-th touch electrodes in each of the g number of touch electrode groups TEG#A, TEG#B, and TEG#C, respectively.

The sensing channel connection terminal sch of the -th multiplexer may be electrically connected to the positive input terminal pi of the i-th differential sensing circuit.

The reference channel connection terminal sch of the i-th multiplexer may be connected to the negative input terminal ni of the i-th differential sensing circuit.

FIG. 21 is a diagram illustrating a procedure of, when the first touch electrode group TEG#A is a sensing touch electrode group and the second touch electrode group TEG#B is a reference touch electrode group, performing group differential sensing of the first touch electrode group TEG#A and the second touch electrode group TEG#B, so as to obtain sensing data for the first touch electrode group TEG#A.

The five touch electrodes A1-A5 included in the first touch electrode group TEG#A are sensing touch electrodes, and may correspond to sensing channels selected from five multiplexers MUX#1-MUX#5, respectively.

The five touch electrodes B1-B5 included in the second touch electrode group TEG#B are reference touch electrodes, and may correspond to reference channels selected from five multiplexers MUX#1-MUX#5, respectively.

The first multiplexer MUX#1 may select one sensing channel ch1 and one reference channel ch2 from among three channels ch1-ch3, and may connect the selected sensing channel ch1 and reference channel ch2 to the sensing channel connection terminal sch and the reference channel connection terminal rch, respectively. Here, three channels ch1-ch3 of the first multiplexer MUX#1 may correspond to first touch electrodes A1, B1, and C1 in three touch electrode groups TEG#A, TEG#B, and TEG#C, respectively.

The sensing channel connection terminal sch of the first multiplexer MUX#1 may be electrically connected to the positive input terminal pi of the first differential sensing circuit DIFFSEN#1. The reference channel connection terminal rch of the first multiplexer MUX#1 may be connected to the negative input terminal ni of the first differential sensing circuit DIFFSEN#1.

Therefore, the first differential sensing circuit DIFFSEN#1 may differentially sense a first touch electrode A1 in the first touch electrode group TEG#A corresponding to the sensing channel ch1 and a first touch electrode B1 in the second touch electrode group TEG#B corresponding to the reference channel ch2.

The second multiplexer MUX#2 may select one sensing channel ch1 and one reference channel ch2 from among three channels ch1-ch3, and may connect the selected sensing channel ch1 and reference channel ch2 to the sensing channel connection terminal sch and the reference channel connection terminal rch, respectively. Here, three channels ch1-ch3 of the second multiplexer MUX#2 may correspond to second touch electrodes A2, B2, and C2 in three touch electrode groups TEG#A, TEG#B, and TEG#C, respectively.

The sensing channel connection terminal sch of the second multiplexer MUX#2 may be electrically connected to the positive input terminal pi of the second differential sensing circuit DIFFSEN#2. The reference channel connection terminal rch of the second multiplexer MUX#2 may be connected to the negative input terminal ni of the second differential sensing circuit DIFFSEN#2.

Therefore, the second differential sensing circuit DIFFSEN#2 may differentially sense a second touch electrode A2 in the first touch electrode group TEG#A corresponding to the sensing channel ch1 and a second touch electrode B2 in the second touch electrode group TEG#B corresponding to the reference channel ch2.

The third multiplexer MUX#3 may select one sensing channel ch1 and one reference channel ch2 from among three channels ch1-ch3, and may connect the selected sensing channel ch1 and reference channel ch2 to the sensing channel connection terminal sch and the reference channel connection terminal rch, respectively. Here, three channels ch1-ch3 of the third multiplexer MUX#3 may correspond to third touch electrodes A3, B3, and C3 in three touch electrode groups TEG#A, TEG#B, and TEG#C, respectively.

The sensing channel connection terminal sch of the third multiplexer MUX#3 may be electrically connected to the positive input terminal pi of the third differential sensing circuit DIFFSEN#3. The reference channel connection terminal rch of the third multiplexer MUX#3 may be connected to the negative input terminal ni of the third differential sensing circuit DIFFSEN#3.

Therefore, the third differential sensing circuit DIFFSEN#3 may differentially sense a third touch electrode A3 in the first touch electrode group TEG#A corresponding to the sensing channel ch1 and a third touch electrode B3 in the second touch electrode group TEG#B corresponding to the reference channel ch2.

The fourth multiplexer MUX#4 may select one sensing channel ch1 and one reference channel ch2 from among three channels ch1-ch3, and may connect the selected sensing channel ch1 and reference channel ch2 to the sensing channel connection terminal sch and the reference channel connection terminal rch, respectively. Here, three channels ch1-ch3 of the fourth multiplexer MUX#4 may correspond to fourth touch electrodes A4, B4, and C4 in three touch electrode groups TEG#A, TEG#B, and TEG#C, respectively.

The sensing channel connection terminal sch of the fourth multiplexer MUX#4 may be electrically connected to the positive input terminal pi of the fourth differential sensing circuit DIFFSEN#4. The reference channel connection terminal rch of the fourth multiplexer MUX#4 may be connected to the negative input terminal ni of the fourth differential sensing circuit DIFFSEN#4.

Therefore, the fourth differential sensing circuit DIFFSEN#4 may differentially sense a fourth touch electrode A4 in the first touch electrode group TEG#A corresponding to the sensing channel ch1 and a fourth touch electrode B4 in the second touch electrode group TEG#B corresponding to the reference channel ch2.

The fifth multiplexer MUX#5 may select one sensing channel ch1 and one reference channel ch2 from among three channels ch1-ch3, and may connect the selected sensing channel ch1 and reference channel ch2 to the sensing channel connection terminal sch and the reference channel connection terminal rch, respectively. Here, three channels ch1-ch3 of the fifth multiplexer MUX#5 may correspond to fifth touch electrodes A5, B5, and C5 in three touch electrode groups TEG#A, TEG#B, and TEG#C, respectively.

The sensing channel connection terminal sch of the fifth multiplexer MUX#5 may be electrically connected to the positive input terminal pi of the fifth differential sensing circuit DIFFSEN#5. The reference channel connection terminal rch of the fifth multiplexer MUX#5 may be connected to the negative input terminal ni of the fifth differential sensing circuit DIFFSEN#5.

Therefore, the fifth differential sensing circuit DIFFSEN#5 may differentially sense a fifth touch electrode A5 in the first touch electrode group TEG#A corresponding to the sensing channel ch1 and a fifth touch electrode B5 in the second touch electrode group TEG#B corresponding to the reference channel ch2.

Connection operations of the respective five multiplexers MUX#1-MUX#5 are concurrently performed, and differential sensing operations of the respective five differential sensing circuits DIFFSEN#1-DIFFSEN#5 are concurrently performed.

Therefore, sensing data for the first touch electrode group TEG#A may be obtained in a short time by performing group differential sensing of the first touch electrode group TEG#A and the second touch electrode group TEG#B.

FIG. 22 is a diagram illustrating a procedure of obtaining, when the second touch electrode group TEG#B is a sensing touch electrode group and the third touch electrode group TEG#C is a reference touch electrode group, sensing data for the second touch electrode group TEG#B by performing group differential sensing of the second touch electrode group TEG#B and the third touch electrode group TEG#C.

The five touch electrodes B1-B5 included in the second touch electrode group TEG#B are sensing touch electrodes, and may correspond to sensing channels selected from five multiplexers MUX#1-MUX#5, respectively.

The five touch electrodes C1-C5 included in the third touch electrode group TEG#C are reference touch electrodes, and may correspond to reference channels selected from five multiplexers MUX#1-MUX#5, respectively.

The first multiplexer MUX#1 may select one sensing channel ch2 and one reference channel ch3 from among three channels ch1-ch3, and may connect the selected sensing channel ch2 and reference channel ch3 to the sensing channel connection terminal sch and the reference channel connection terminal rch, respectively.

The sensing channel connection terminal sch of the first multiplexer MUX#1 may be electrically connected to the positive input terminal pi of the first differential sensing circuit DIFFSEN#1. The reference channel connection terminal rch of the first multiplexer MUX#1 may be connected to the negative input terminal ni of the first differential sensing circuit DIFFSEN#1.

Therefore, the first differential sensing circuit DIFFSEN#1 may differentially sense a first touch electrode B1 in the second touch electrode group TEG#B corresponding to the sensing channel ch2 and a first touch electrode C1 in the third touch electrode group TEG#C corresponding to the reference channel ch3.

The second multiplexer MUX#2 may select one sensing channel ch2 and one reference channel ch3 from among three channels ch1-ch3, and may connect the selected sensing channel ch2 and reference channel ch3 to the sensing channel connection terminal sch and the reference channel connection terminal rch, respectively.

The sensing channel connection terminal sch of the second multiplexer MUX#2 may be electrically connected to the positive input terminal pi of the second differential sensing circuit DIFFSEN#2. The reference channel connection terminal rch of the second multiplexer MUX#2 may be connected to the negative input terminal ni of the second differential sensing circuit DIFFSEN#2.

Therefore, the second differential sensing circuit DIFFSEN#2 may differentially sense a second touch electrode B2 in the second touch electrode group TEG#B corresponding to the sensing channel ch2 and a second touch electrode C2 in the third touch electrode group TEG#C corresponding to the reference channel ch3.

The third multiplexer MUX#3 may select one sensing channel ch2 and one reference channel ch3 from among three channels ch1-ch3, and may connect the selected sensing channel ch2 and reference channel ch3 to the sensing channel connection terminal sch and the reference channel connection terminal rch, respectively.

The sensing channel connection terminal sch of the third multiplexer MUX#3 may be electrically connected to the positive input terminal pi of the third differential sensing circuit DIFFSEN#3. The reference channel connection terminal rch of the third multiplexer MUX#3 may be connected to the negative input terminal ni of the third differential sensing circuit DIFFSEN#3.

Therefore, the third differential sensing circuit DIFFSEN#3 may differentially sense a third touch electrode B3 in the second touch electrode group TEG#B corresponding to the sensing channel ch2 and a third touch electrode C3 in the third touch electrode group TEG#C corresponding to the reference channel ch3.

The fourth multiplexer MUX#4 may select one sensing channel ch2 and one reference channel ch3 from among three channels ch1-ch3, and may connect the selected sensing channel ch2 and reference channel ch3 to the sensing channel connection terminal sch and the reference channel connection terminal rch, respectively.

The sensing channel connection terminal sch of the fourth multiplexer MUX#4 may be electrically connected to the positive input terminal pi of the fourth differential sensing circuit DIFFSEN#4. The reference channel connection terminal rch of the fourth multiplexer MUX#4 may be connected to the negative input terminal ni of the fourth differential sensing circuit DIFFSEN#4.

Therefore, the fourth differential sensing circuit DIFFSEN#4 may differentially sense a fourth touch electrode B4 in the second touch electrode group TEG#B corresponding to the sensing channel ch2 and a fourth touch electrode C4 in the third touch electrode group TEG#C corresponding to the reference channel ch3.

The fifth multiplexer MUX#5 may select one sensing channel ch2 and one reference channel ch3 from among three channels ch1-ch3, and may connect the selected sensing channel ch2 and reference channel ch3 to the sensing channel connection terminal sch and the reference channel connection terminal rch, respectively.

The sensing channel connection terminal sch of the fifth multiplexer MUX#5 may be electrically connected to the positive input terminal pi of the fifth differential sensing circuit DIFFSEN#5. The reference channel connection terminal rch of the fifth multiplexer MUX#5 may be connected to the negative input terminal ni of the fifth differential sensing circuit DIFFSEN#5.

Therefore, the fifth differential sensing circuit DIFFSEN#5 may differentially sense a fifth touch electrode B5 in the second touch electrode group TEG#B corresponding to the sensing channel ch2 and a fifth touch electrode C5 in the third touch electrode group TEG#C corresponding to the reference channel ch3.

Connection operations of the respective five multiplexers MUX#1-MUX#5 are concurrently performed, and differential sensing operations of the respective five differential sensing circuits DIFFSEN#1-DIFFSEN#5 are concurrently performed.

Therefore, sensing data for the second touch electrode group TEG#B may be obtained in a short time by performing group differential sensing of the second touch electrode group TEG#B and the third touch electrode group TEG#C.

Referring to FIG. 21, the order of touch electrodes electrically connected to positive input terminals pi of five respective differential sensing circuits DIFFSEN#1-DIFFSEN#5 in five touch electrodes A1-A5 included in the first touch electrode group TEG#A, which are selected as sensing touch electrodes, and the order of the touch electrodes electrically connected to negative input terminals ni of five respective differential sensing circuits DIFFSEN#1-DIFFSEN#5 in five touch electrodes B1-B5 included in the second touch electrode group TEG#B, which are selected as reference touch electrodes, are the same.

For example, the order of a touch electrode A1 electrically connected to a positive input terminal pi of a first differential sensing circuits DIFFSEN#1 in five touch electrodes A1-A5 included in the first touch electrode group TEG#A, which are selected as sensing touch electrodes, and the order of a touch electrode B1 electrically connected to a negative input terminal ni of a first differential sensing circuit DIFFSEN#1 in five touch electrodes B1-B5 included in the second touch electrode group TEG#B, which are selected as reference touch electrodes, are first and the same.

As another example, the order of a touch electrode A2 electrically connected to a positive input terminal pi of a second differential sensing circuits DIFFSEN#2 in five touch electrodes A1-A5 included in the first touch electrode group TEG#A, which are selected as sensing touch electrodes, and the order of a touch electrode B2 electrically connected to a negative input terminal ni of a second differential sensing circuit DIFFSEN#2 in five touch electrodes B1-B5 included in the second touch electrode group TEG#B, which are selected as reference touch electrodes, are second and the same.

Referring to FIG. 21 and FIG. 22, in consideration of the differential sensing order of three touch electrode groups TEG#A, TEG#B, and TEG#C, if differential sensing is performed in a sequence of the first touch electrode group TEG#A, the second touch electrode group TEG#B, and the third touch electrode group TEG#C, since the third touch electrode group TEG#C is a sensing touch electrode group and differential sensing is not allowed to be performed therefor, so that sensing data for five touch electrodes C1-C5 included in the third touch electrode group TEG#C cannot be obtained.

That is, if differential sensing is performed in the sequence of the first touch electrode group TEG#A, the second touch electrode group TEG#B, and the third touch electrode group TEG#C, sensing data for the touch electrodes C1-C5 corresponding to the last channels ch3 of five respective multiplexers MUX#1-MUX#5 cannot be obtained. Thereby, accuracy of touch sensing may be degraded. This phenomenon is referred to as an edge characteristic.

In order to reduce this edge characteristic, sensing data for the third touch electrode group TEG#C may be obtained by selecting the third touch electrode group TEG#C as a sensing touch electrode group, selecting the second touch electrode group TEG#B positioned directly thereabove as a reference touch electrode group, and performing differential sensing of the third touch electrode group TEG#C and the second touch electrode group TEG#B.

Alternatively, sensing data for the third touch electrode group TEG#C may be obtained by selecting the third touch electrode group TEG#C as a sensing touch electrode group, selecting the first touch electrode group TEG#A positioned at first as a reference touch electrode group, and performing differential sensing of the third touch electrode group TEG#C and the first touch electrode group TEG#A.

Another way to reduce the edge characteristic is to alternate a driving direction for group differential sensing.

For example, the touch display device may regularly alternate group differential sensing directions every frame, and may regularly alternate group differential sensing directions every two or more frames.

As another example, the touch display device may irregularly change group differential sensing directions. For example, the touch display device may perform group differential sensing in the same driving direction (e.g., the forward direction from an upper touch electrode group to a lower touch electrode group) during one or more frames, and then perform group differential sensing in another driving direction (e.g., a reverse direction from a lower touch electrode group to an upper touch electrode group).

As still another example, the touch display device may constantly maintain a group differential sensing direction during one frame, but may change the group differential sensing direction as necessary once, twice, or more within one frame.

As described above, in order to compensate for occurrence of an area without sensing data, the touch display device according to embodiments of the present disclosure may perform compensation by reversing the group differential sensing direction every one or more frames, but the touch display device may also perform compensation by reversing the group differential sensing direction in one frame when necessary.

In other words, the touch display device according to embodiments of the present disclosure may perform compensation one or more times in the group differential sensing direction configured to be the forward direction of the display panel during one frame, and then may perform compensation one or more times by reversing the group differential sensing direction. Upon necessity, the touch display device may perform group differential sensing in the forward direction (or the reverse direction) during one or more frames, and then may perform group differential sensing in the reverse direction (or the forward direction) during one or more frames.

Hereinafter, for convenience of explanation, it is assumed that the touch display device according to embodiments of the present disclosure performs compensation by reversing the group differential sensing direction in one frame unit in order to compensate for occurrence of an area without sensing data. However, this is for convenience of explanation, and is not limited thereto.

Figure 23:
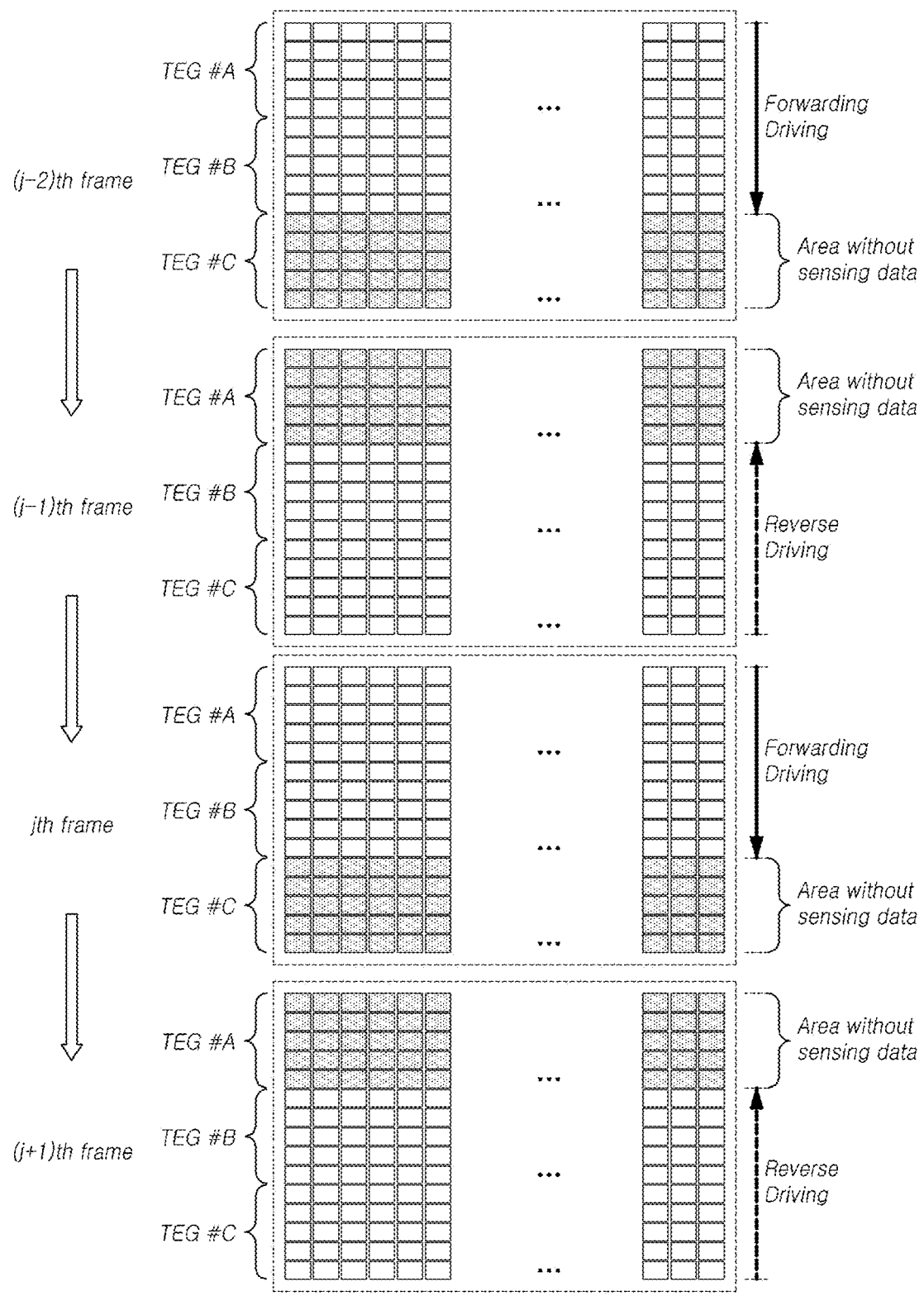
FIG. 23 is a diagram illustrating a scheme of alternating group differential sensing directions between frames in consideration of an edge characteristic that may occur at group differential sensing of the touch display device according to embodiments of the present disclosure.
Figure 24:
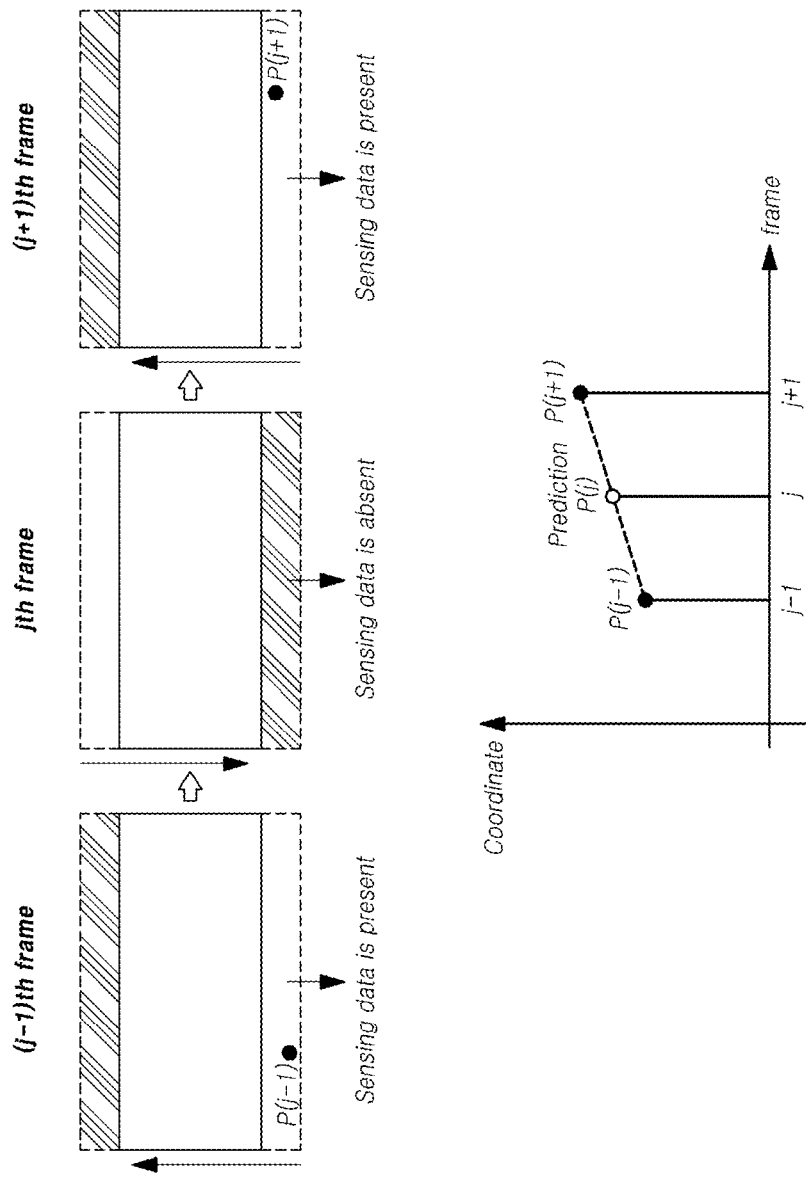
FIG. 24 is a diagram illustrating a coordinate compensation algorithm processing scheme according to the group differential sensing scheme of the touch display device according to embodiments of the present disclosure.

FIG. 23 is a diagram illustrating a scheme of alternating group differential sensing directions between frames in consideration of an edge characteristic that may occur at group differential sensing of the touch display device according to embodiments of the present disclosure, and FIG. 24 is a diagram illustrating a coordinate compensation algorithm processing scheme according to the group differential sensing scheme of the touch display device according to embodiments of the present disclosure.

Referring to FIG. 23, in order to reduce an edge characteristic, a group differential sensing direction may be changed in each frame.

Referring to FIG. 23, in (j−2)th frame, group differential sensing may be performed in a forward direction (from top to bottom) of the first touch electrode group TEG#A, the second touch electrode group TEG#B, and the third touch electrode group TEG#C. In this case, an area corresponding to the third touch electrode group TEG#C is an area for which no sensing data is obtained.

In (j−1)th frame, group differential sensing may be performed in a reverse direction (from bottom to top) of the third touch electrode group TEG#C, the second touch electrode group TEG#B, and the first touch electrode group TEG#A. Here, an area corresponding to the first touch electrode group TEG#A is an area for which no sensing data is obtained.

In j-th frame, group differential sensing may be performed in the forward direction (from top to bottom) of the first touch electrode group TEG#A, the second touch electrode group TEG#B, and the third touch electrode group TEG#C. In this case, an area corresponding to the third touch electrode group TEG#C is an area for which no sensing data is obtained.

In (j+1)th frame, group differential sensing may be performed in a reverse direction (from bottom to top) of the third touch electrode group TEG#C, the second touch electrode group TEG#B, and the first touch electrode group TEG#A. Here, an area corresponding to the first touch electrode group TEG#A is an area for which no sensing data is obtained.

Referring to FIG. 24, a case of the j-th frame represents a case in which the last third touch electrode group TEG#C has no sensing data. In this case, the touch controller TCTR of the touch display device may perform an algorithm to restore sensing data in the j-th frame by using sensing data in a (j−1)th frame and sensing data in a (j+1)th frame, so as to improve touch sensing performance.

For example, when a touch occurs in an area of the third touch electrode group TEG#C during the (j−1)th frame, the j-th frame, and the (j+1)th frame, and when the group differential sensing directions between frames are alternated, the touch controller TCTR of the touch display device may obtain sensing data for the third touch electrode group TEG#C in the (j−1)th frame and may obtain sensing data for the third touch electrode group TEG#C in the (j+1)th frame, but may not obtain sensing data for the third touch electrode group TEG#C in the j-th frame.

The touch controller TCTR of the touch display device may predict touch coordinates P(j) in the j-th frame by using touch coordinates P(j−1) obtained from sensing data for the third touch electrode group TEG#C in the (j−1)th frame and touch coordinates P(j+1) obtained from sensing data for the third touch electrode group TEG#C in (j−1)th frame.

Figure 25:
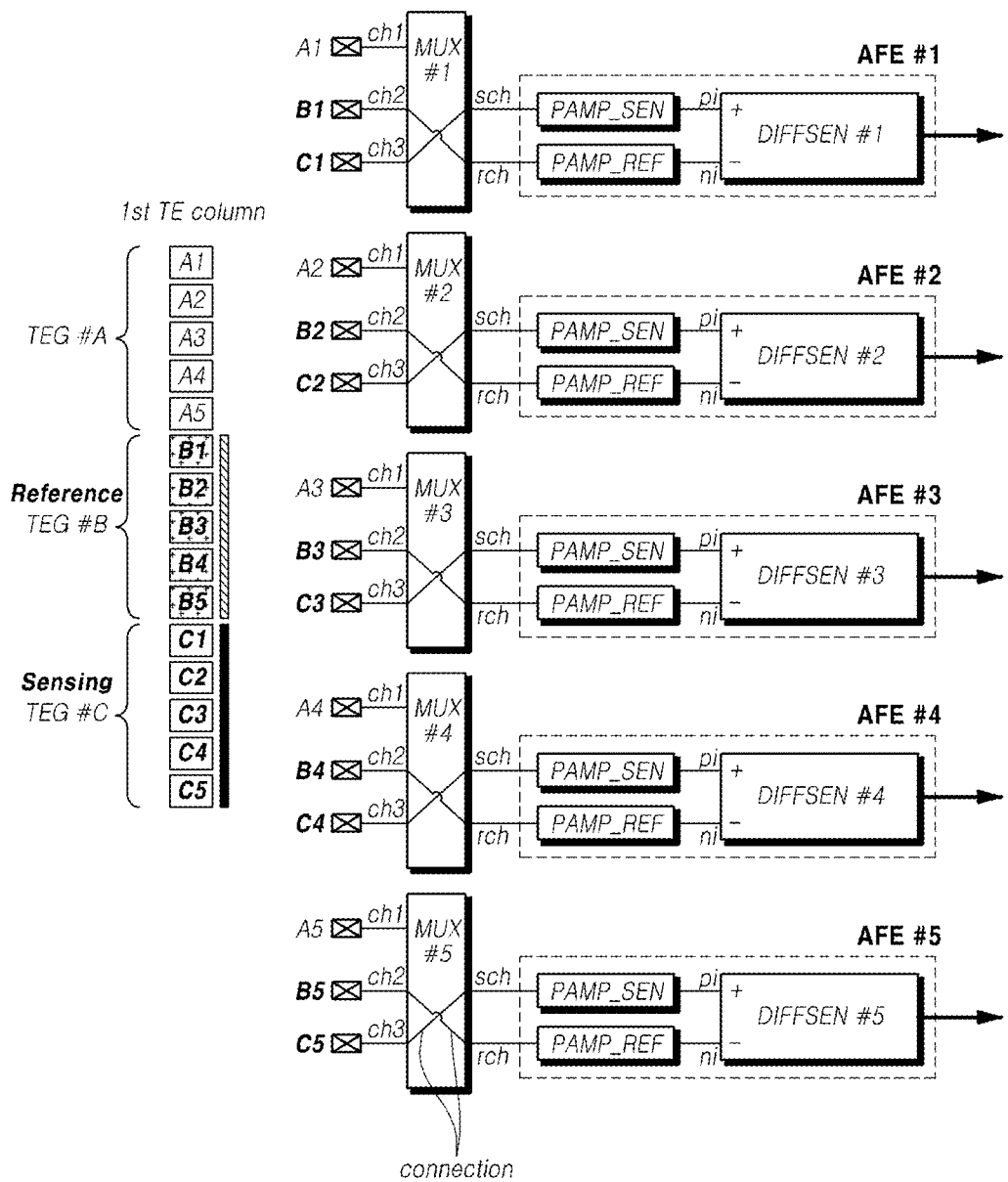
FIG. 25 and FIG. 26 are diagrams illustrating the group differential sensing procedure of the touch display device with respect to each touch electrode column during a (j+1)th frame according to embodiments of the present disclosure.
Figure 26:
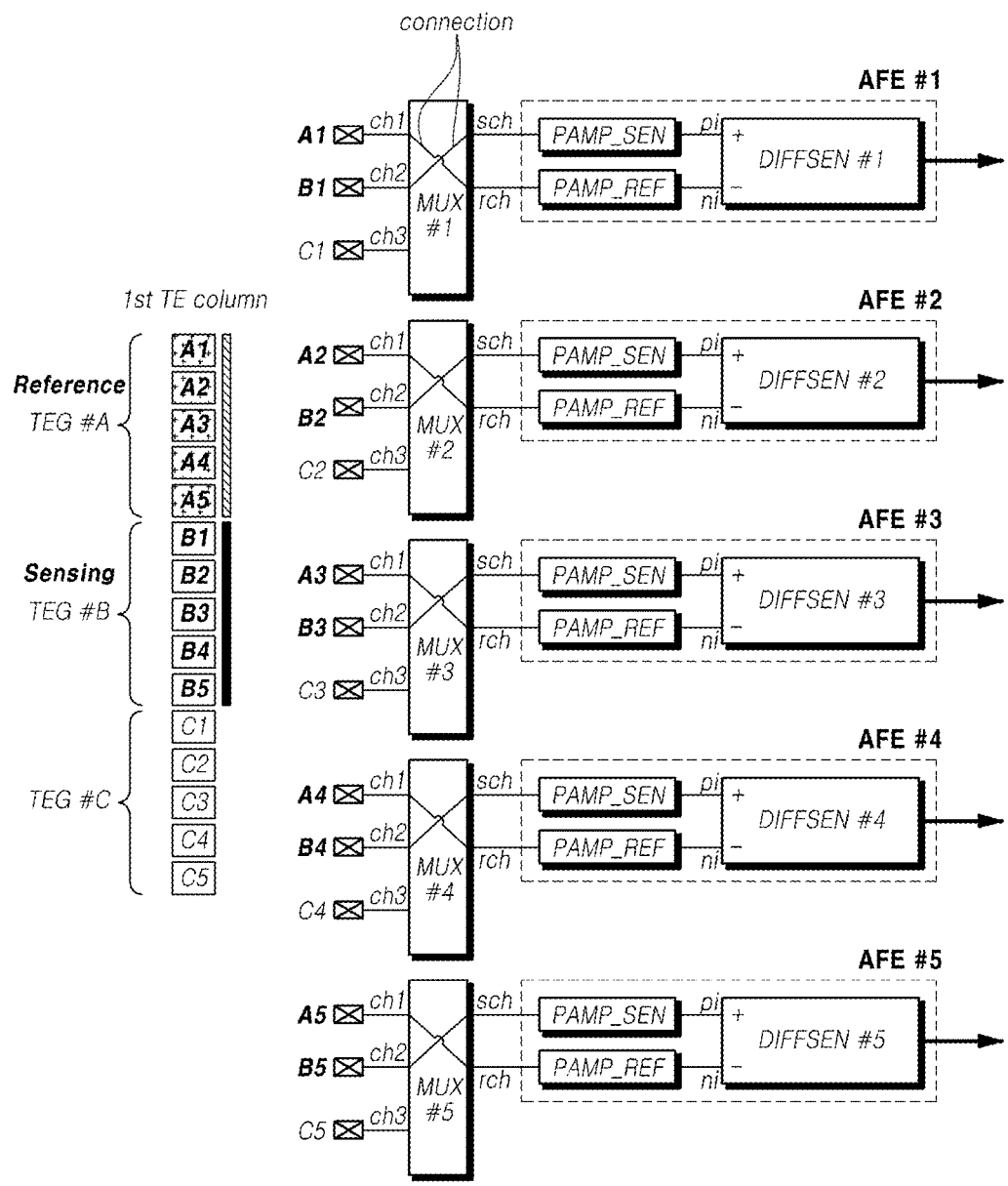

FIG. 25 and FIG. 26 are diagrams illustrating a group differential sensing procedure for each touch electrode column (TE column) during the (j+1)th frame on the basis of a scheme of alternating group differential sensing directions between frames according to embodiments of the present disclosure.

FIG. 25 and FIG. 26 are diagrams illustrating that group differential sensing is performed in the forward direction (from top to bottom) during the j-th frame, as shown in FIG. 21 and FIG. 23, and then group differential sensing is performed in the reverse direction (from bottom to top) during the (j+1)th frame.

Referring to FIG. 25, during the (j+1)th frame, the touch sensing circuit TDC may select, as sensing touch electrodes, five touch electrodes C1-C5 included in the third touch electrode group TEG#C from among three touch electrode groups TEG#A, TEG#B, and TEG#C, may select, as reference touch electrodes, five touch electrodes B1-B5 included in the second touch electrode group TEG#B from among three touch electrode groups TEG#A, TEG#B, and TEG#C, and may match the five touch electrodes C1-C5 included in the third touch electrode group TEG#C that is a sensing touch electrode group and the five touch electrodes B1-B5 included in the second touch electrode group TEG#B that is a reference touch electrode group, so as to perform differential sensing.

That is, during the (j+1)th frame, five multiplexers MUX#1-MUX#5 select, as sensing touch electrodes, five touch electrodes C1-C5 included in the third touch electrode group TEG#C from among three touch electrode groups TEG#A, TEG#B, and TEG#C, and select, as reference touch electrodes, five touch electrodes B1-B5 included in the second touch electrode group TEG#B from among three touch electrode groups TEG#A, TEG#B, and TEG#C.

By considering only this point, on the basis of the same scheme as that of the group differential sensing scheme described with reference to FIG. 21 and FIG. 22, specific connection operations of five multiplexers MUX#1-MUX#5 and specific differential sensing operations of five differential sensing circuits DIFFSEN#1-DIFFSEN#5 may be performed.

Thereafter, referring to FIG. 26, during the (j+1)th frame, the touch sensing circuit TDC may select, as sensing touch electrodes, five touch electrodes B1-B5 included in the second touch electrode group TEG#B from among three touch electrode groups TEG#A, TEG#B, and TEG#C, and may select, as reference touch electrodes, five touch electrodes A1-A5 included in the first touch electrode group TEG#A from among three touch electrode groups TEG#A, TEG#B, and TEG#C.

Then the touch sensing circuit TDC may match the five touch electrodes B1-B5 included in the second touch electrode group TEG#B that is a sensing touch electrode group and the five touch electrodes A1-A5 included in the first touch electrode group TEG#A that is a reference touch electrode group, so as to perform differential sensing.

That is, during the (j+1)th frame, five multiplexers MUX#1-MUX#5 select, as sensing touch electrodes, five touch electrodes B1-B5 included in the second touch electrode group TEG#B from among three touch electrode groups TEG#A, TEG#B, and TEG#C, and select, as reference touch electrodes, five touch electrodes A1-A5 included in the first touch electrode group TEG#A from among three touch electrode groups TEG#A, TEG#B, and TEG#C.

Five differential sensing circuits DIFFSEN#1-DIFFSEN#5 may match the five touch electrodes B1-B5 included in the second touch electrode group TEG#B and the five touch electrodes A1-A5 included in the first touch electrode group TEG#A, so as to perform differential sensing.

By considering only this point, on the basis of the same scheme as that of the group differential sensing scheme described with reference to FIG. 21 and FIG. 22, specific connection operations of five multiplexers MUX#1-MUX#5 and specific differential sensing operations of five differential sensing circuits DIFFSEN#1-DIFFSEN#5 may be performed.

Referring to FIG. 19 to FIG. 26, when the number (M=15) of the touch electrodes A1-A5, B1-B5 and C1-C5 disposed in each touch electrode column (TE column) is a multiple of k that is the number of touch electrodes in one touch electrode group in each touch electrode column (k=5), the five touch electrodes A1-A5 included in the first touch electrode group TEG#A, which are selected as sensing touch electrodes during the j-th frame, and the five touch electrodes A1-A5 included in the first touch electrode group TEG#A, which are selected as reference touch electrodes during the (j+1)th frame, may be the same touch electrodes. Further, the five touch electrodes B1-B5 included in the second touch electrode group TEG#B, which are selected as reference touch electrodes during the j-th frame, and the five touch electrodes B1-B5 included in the second touch electrode group TEG#B, which are selected as sensing touch electrodes during the (j+1)th frame, may be the same touch electrodes.

Figure 28:
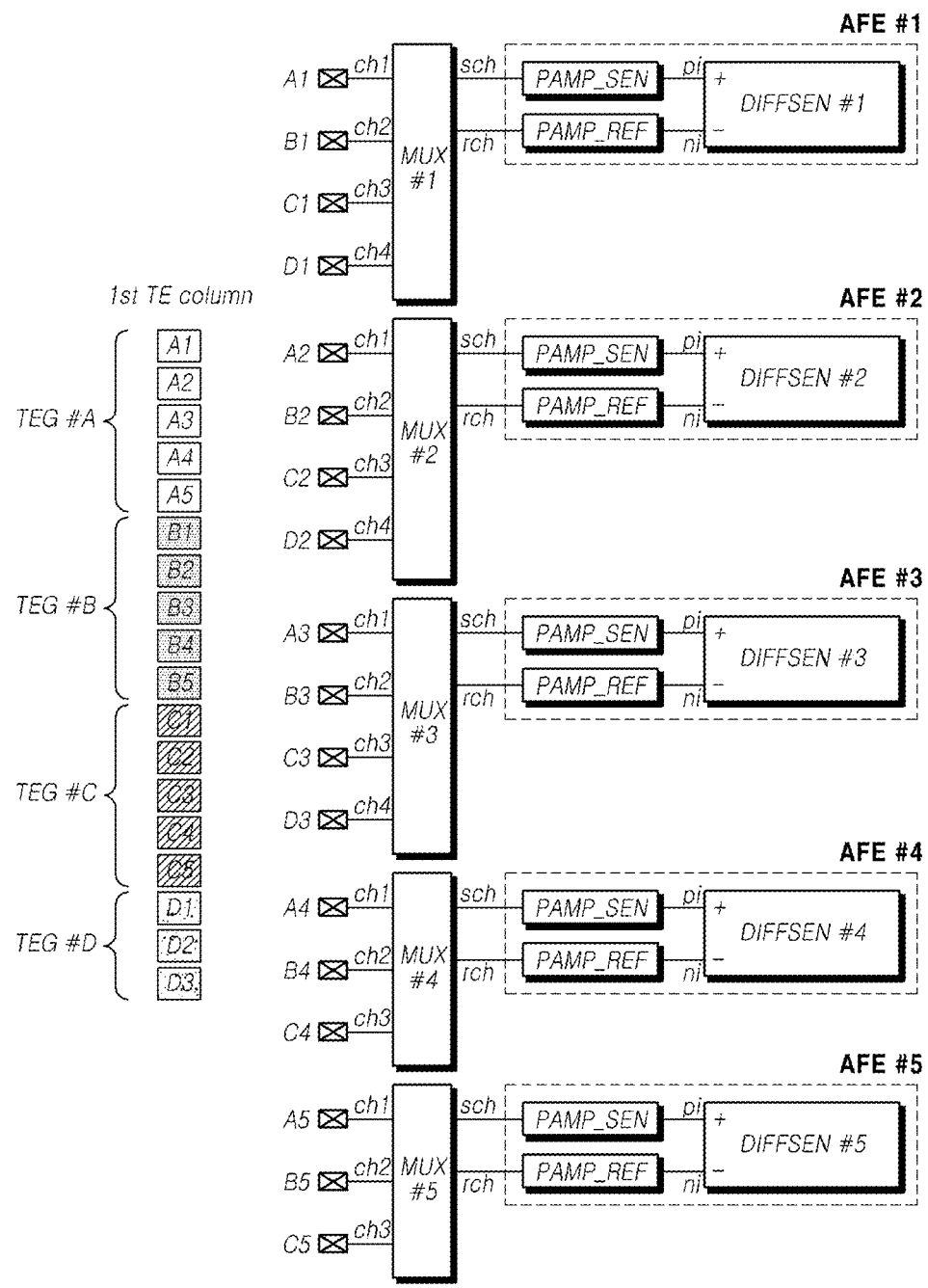
FIG. 28 is a diagram simply illustrating, in order to describe the exemplary group differential sensing scheme of the touch display device, structures of analog front-ends and multiplexers for group differential sensing with respect to each touch electrode column in the touch electrode arrangement structure in FIG. 19 according to embodiments of the present disclosure.

FIG. 27 is another exemplary diagram of touch electrode arrangement for describing an exemplary group differential sensing scheme of the touch display device according to embodiments of the present disclosure, and FIG. 28 is a diagram simply illustrating, in order to describe the exemplary group differential sensing scheme of the touch display device, structures of analog front-ends AFE and multiplexers for group differential sensing with respect to each touch electrode column (TE column) in FIG. 27 according to embodiments of the present disclosure.

In the touch panel TSP illustrated in FIG. 26, 360 touch electrodes TE are arranged in a matrix of 18 rows and 20 columns (M=18, N=20).

Eighteen (M=18) touch electrodes A1-A5, B1-B5, C1-C5, and D1-D3 disposed in each touch electrode column (TE column) include the g number of touch electrode groups TEG#A, TEG#B, and TEG#C (g=3), each of which includes k number of touch electrodes (k=5), and one additional touch electrode group TEG#D including the d number of touch electrodes D1, D2, and D3 (d=3). Here, d is a natural number equal to or larger than 1 and smaller than k.

Four touch electrode groups TEG#A, TEG#B, TEG#C, and TEG#D are present in the display panel DISP, and each of three touch electrode groups TEG#A, TEG#B, and TEG#C among the four touch electrode groups includes five touch electrodes. However, the remaining one touch electrode group TEG#D includes three touch electrodes D1-D3.

Referring to FIG. 28, during the j-th frame, in the case of sensing the first touch electrode group TEG#A, the touch sensing circuit TDC may select, as sensing touch electrodes, five touch electrodes A1-A5 included in the first touch electrode group TEG#A from among four touch electrode groups TEG#A, TEG#B, TEG#C, and TEG#D, may select, as reference touch electrodes, five touch electrodes B1-B5 included in the second touch electrode group TEG#B from among four touch electrode groups TEG#A, TEG#B, TEG#C, and TEG#D, and then may match the five touch electrodes A1-A5 included in the first touch electrode group TEG#A that is a sensing touch electrode group and the five touch electrodes B1-B5 included in the second touch electrode group TEG#B that is a reference touch electrode group, so as to perform differential sensing.

That is, the touch sensing circuit TDC may concurrently perform differential sensing for the touch electrode A1 (sensing touch electrode) and the touch electrode B1 (reference touch electrode), differential sensing for the touch electrode A2 (sensing touch electrode) and the touch electrode B2 (reference touch electrode), differential sensing for the touch electrode A3 (sensing touch electrode) and the touch electrode B3 (reference touch electrode), differential sensing for the touch electrode A4 (sensing touch electrode) and the touch electrode B4 (reference touch electrode), and differential sensing for the touch electrode A5 (sensing touch electrode) and the touch electrode B5 (reference touch electrode).

Referring to FIG. 28, for the group differential sensing scheme described above, the touch sensing circuit TDC according to embodiments of the present disclosure may include five analog front-ends AFE#1-AFE#5.

Each of five analog front-ends AFE#1-AFE#5 may include one multiplexer, one differential sensing circuit, and the like (see FIG. 12 and FIG. 13).

Therefore, the touch sensing circuit TDC according to embodiments of the present disclosure may include five multiplexers MUX#1 to MUX#5, five differential sensing circuits DIFFSEN#1-DIFFSEN#5, and the like.

The number of multiplexers MUX#1 to MUX#5 within the touch sensing circuit TDC may be a maximum number of the number (five in the case of TEG#A, TEG#B, and TEG#C, and three in the case of TEG#D) of touch electrodes included in each of all touch electrode groups TEG#A, TEG#B, TEG#C, and TEG#D.

The number of differential sensing circuits DIFFSEN#1-DIFFSEN#5 within the touch sensing circuit TDC may be a maximum number of the number (five in the case of TEG#A, TEG#B, and TEG#C, and three in the case of TEG#D) of touch electrodes included in each of all touch electrode groups TEG#A, TEG#B, TEG#C, and TEG#D.

Referring to FIG. 28, the first to third multiplexers MUX#1-MUX#3 among five multiplexers MUX#1-MUX#5 may select one sensing channel and one reference channel from among four channels ch1-ch4. The fourth and fifth multiplexers MUX#4-MUX#5 may select one sensing channel and one reference channel from among three channels ch1-ch3.

Each of the five differential sensing circuits DIFFSEN#1-DIFFSEN#5 may have a positive input terminal pi and a negative input terminal ni.

The positive input terminal pi and the negative input terminal ni of each of the five differential sensing circuits DIFFSEN#1-DIFFSEN#5 may be electrically connected to a sensing channel connection terminal sch and a reference channel connection terminal rch of each of the five multiplexers MUX#1-MUX#5.

Figure 29:
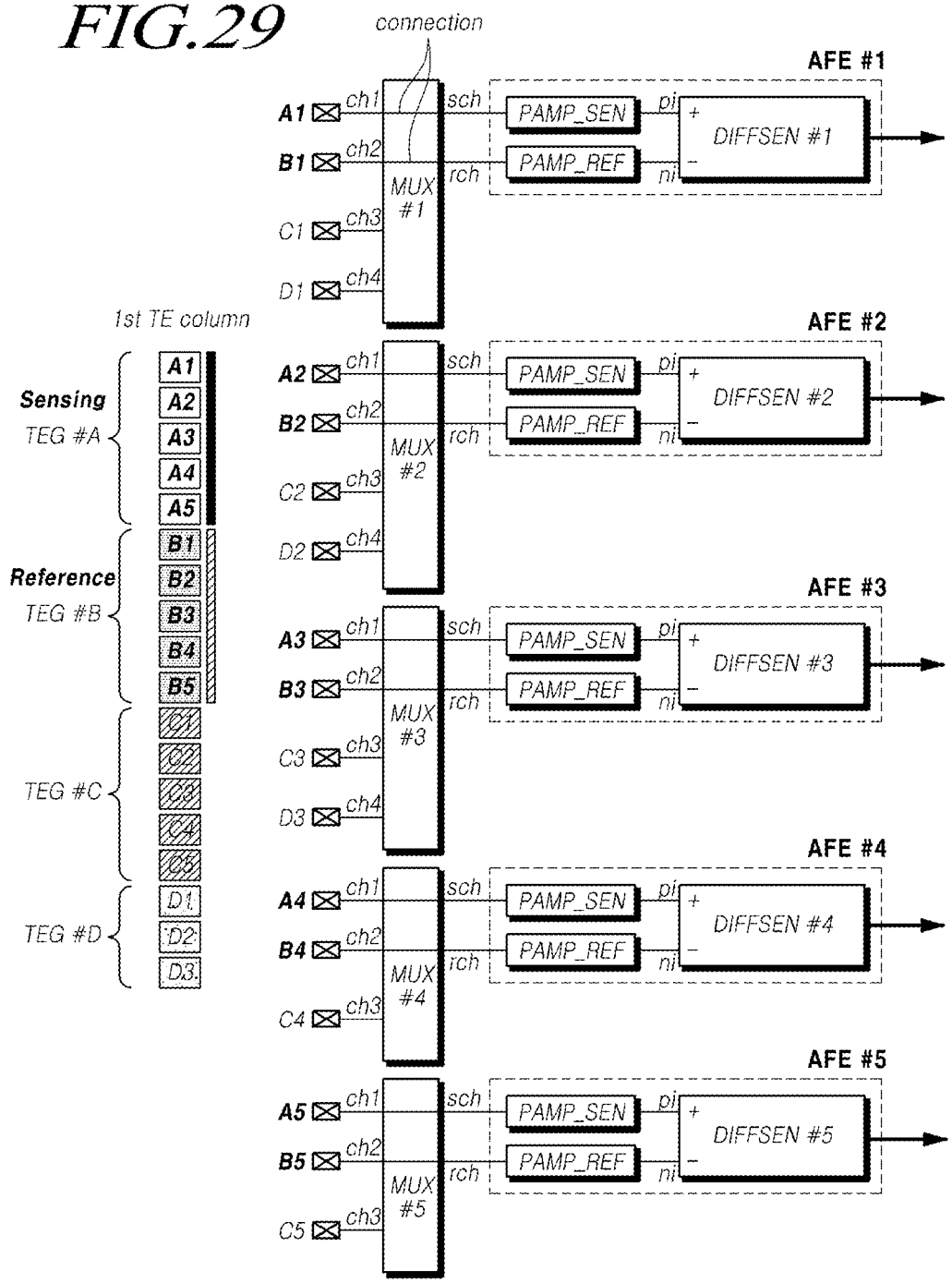
FIG. 29 to FIG. 31 are diagrams illustrating a group differential sensing procedure of the touch display device with respect to each touch electrode column during a j-th frame according to embodiments of the present disclosure.
Figure 30:
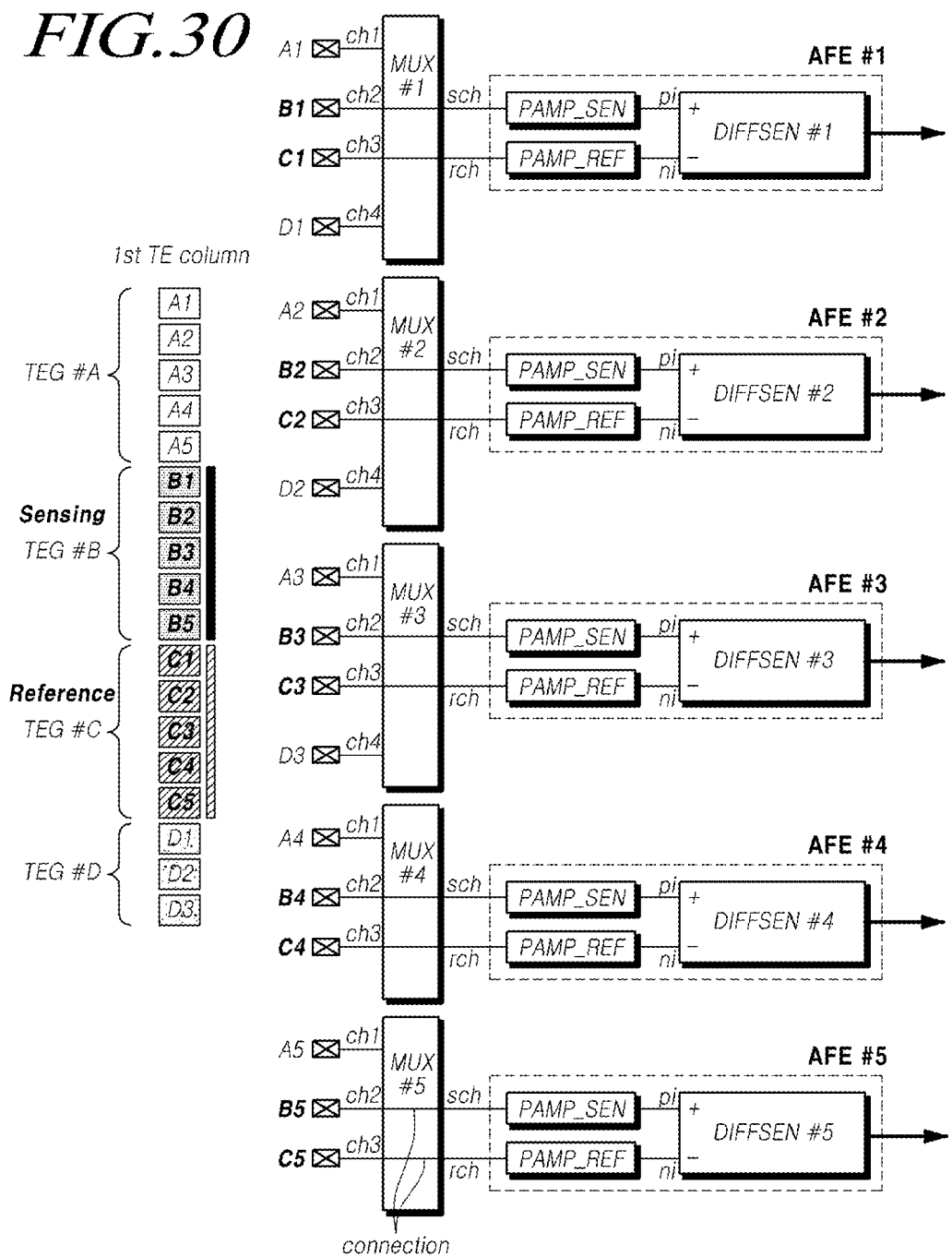
Figure 31:
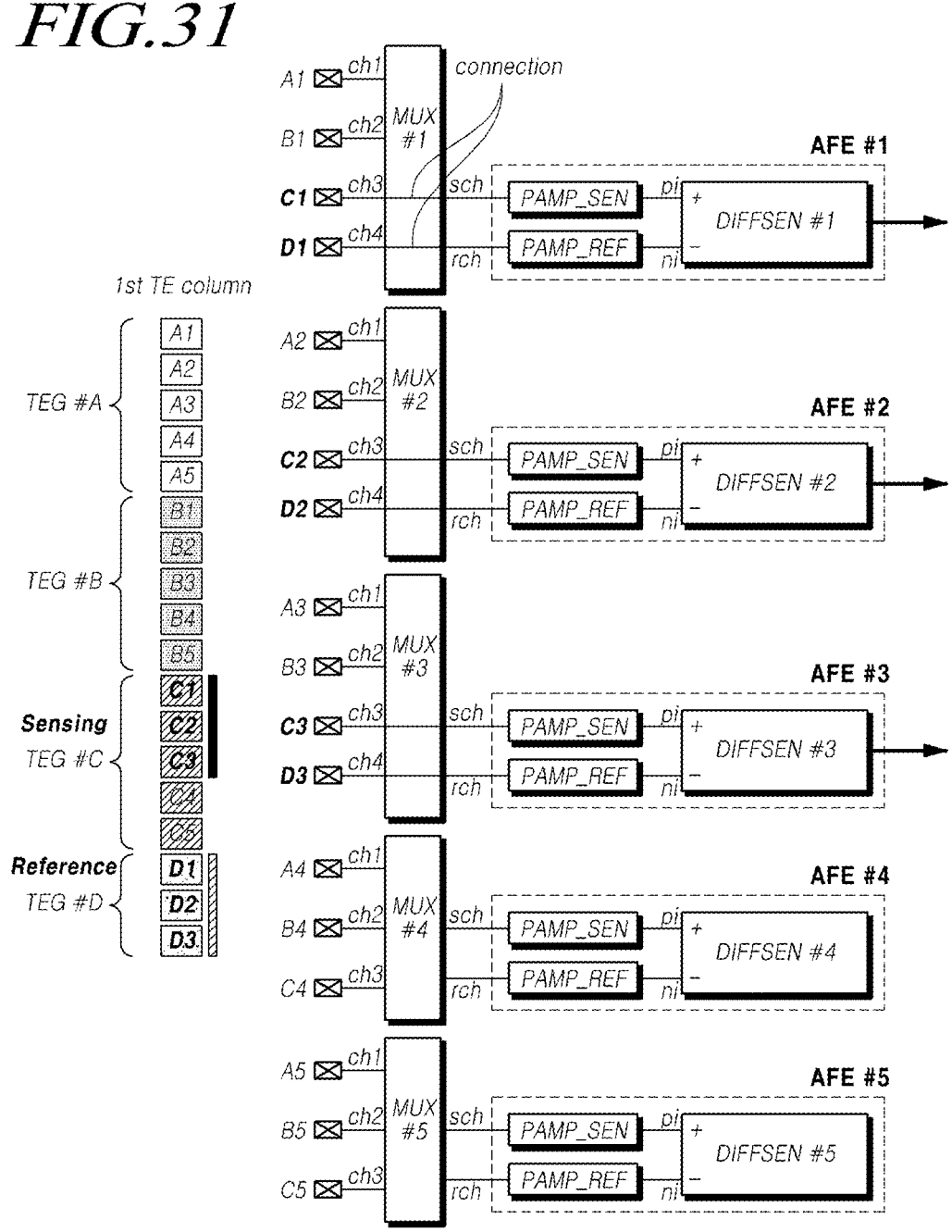

FIG. 29 to FIG. 31 are diagrams illustrating a group differential sensing procedure for each touch electrode column (TE column) during the j-th frame in the touch electrode arrangement structure in FIG. 27, and FIG. 32 to FIG. 34 are diagrams illustrating a group differential sensing procedure for each touch electrode column (TE column) during the (j+1)th frame in the touch electrode arrangement structure in FIG. 27.

The group differential sensing scheme in the touch electrode arrangement structure (a case in which the number of touch electrodes in one touch electrode group among all touch electrode groups is different from the numbers of touch electrodes in the remaining touch electrode groups) of FIG. 27 is basically the same as the group differential sensing scheme in the touch electrode arrangement structure (a case in which the numbers of touch electrodes in all touch electrode groups are the same) in FIG. 19.

As illustrated in FIG. 29, group differential sensing for a case in which the first touch electrode group TEG#A is a sensing touch electrode group and the second touch electrode group TEG#B is a reference touch electrode group is the same as the group differential sensing in FIG. 21. As illustrated in FIG. 30, group differential sensing for a case in which the second touch electrode group TEG#B is a sensing touch electrode group and the third touch electrode group TEG#C is a reference touch electrode group is the same as the group differential sensing in FIG. 22. However, a procedure shown in FIG. 31 is unique.

Referring to FIG. 31, the third touch electrode group TEG#C includes five touch electrodes C1-C5, but the fourth touch electrode group TEG#D includes only three touch electrodes D1-D3.

Therefore, when group differential sensing of the third touch electrode group TEG#C that is a sensing touch electrode group and the fourth touch electrode group TEG#D that is a reference touch electrode group is performed, the first to third multiplexers MUX#1-MUX#3 select, as sensing touch electrodes, three touch electrodes C1-C3 from among five touch electrodes C1-C5 included in the third touch electrode group TEG#C, and select, as reference touch electrodes, three touch electrodes D1-D3 included in the fourth touch electrode group TEG#D.

The first to third differential sensing circuits DIFFSEN#1-DIFFSEN#3 may differentially sense three touch electrodes C1-C3 selected as sensing touch electrodes from among five touch electrodes C1-C5 included in the third touch electrode group TEG#C and three touch electrodes D1-D3 included in the fourth touch electrode group TEG#D selected as reference touch electrodes.

As illustrated in FIG. 31, unlike the first to third touch electrode groups TEG#A, TEG#B, and TEG#C, since the last fourth touch electrode group TEG#D includes only three touch electrodes D1-D3, which are less than five touch electrodes, two touch electrodes C4 and D4 included in the third touch electrode group TEG#C immediately before the last fourth touch electrode group TEG#D cannot be sensed during the j-th frame.

As described above, in order to reduce an edge characteristic, group differential sensing has been performed in the forward direction (from top to bottom) in the j-th frame, but group differential sensing may be performed in a reverse direction (from bottom to top) in the (j+1)th frame.

Figure 32:
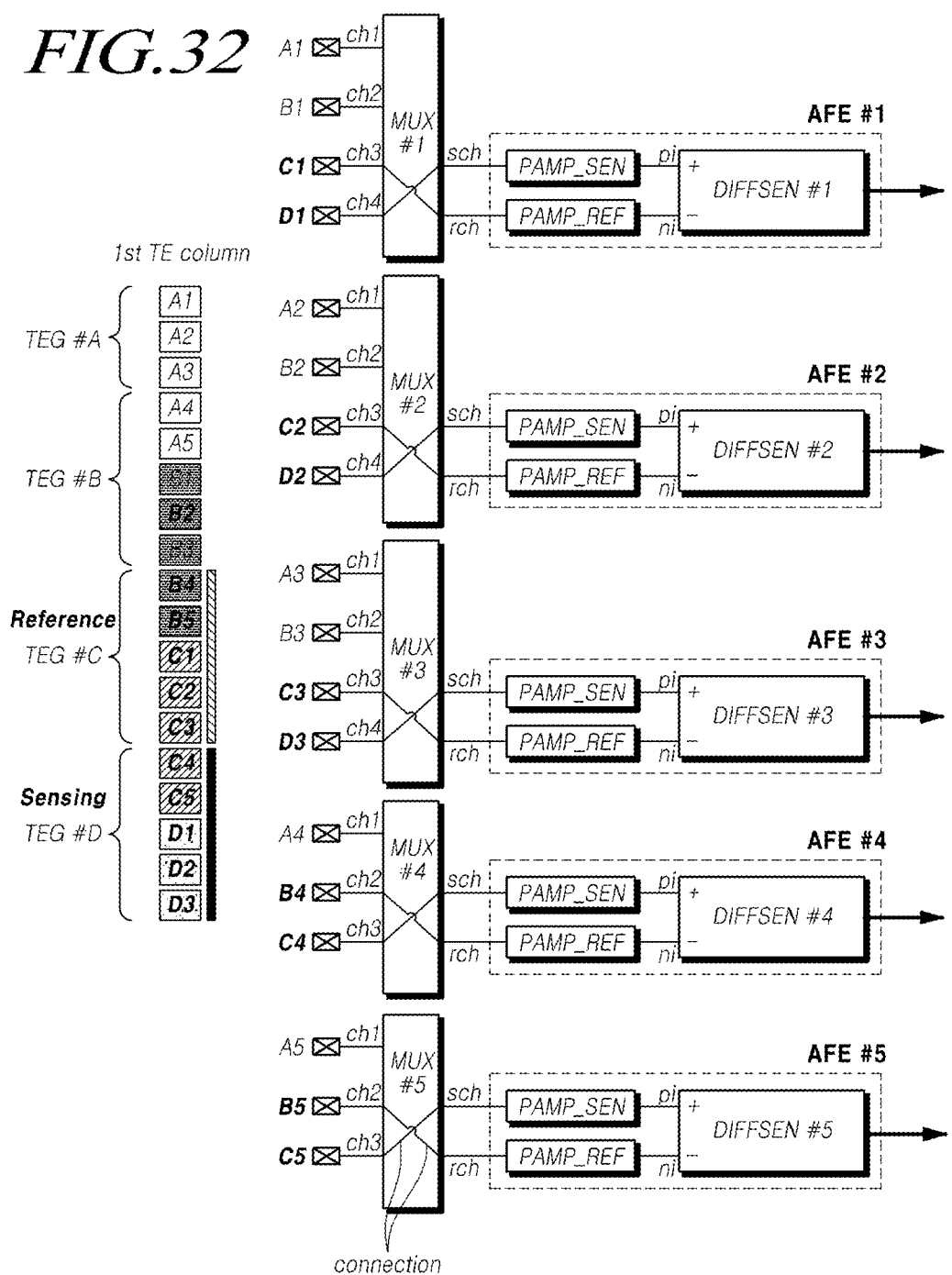
FIG. 32 to FIG. 34 are diagrams illustrating the group differential sensing procedure of the touch display device with respect to each touch electrode column during a (j+1)th frame according to embodiments of the present disclosure.
Figure 33:
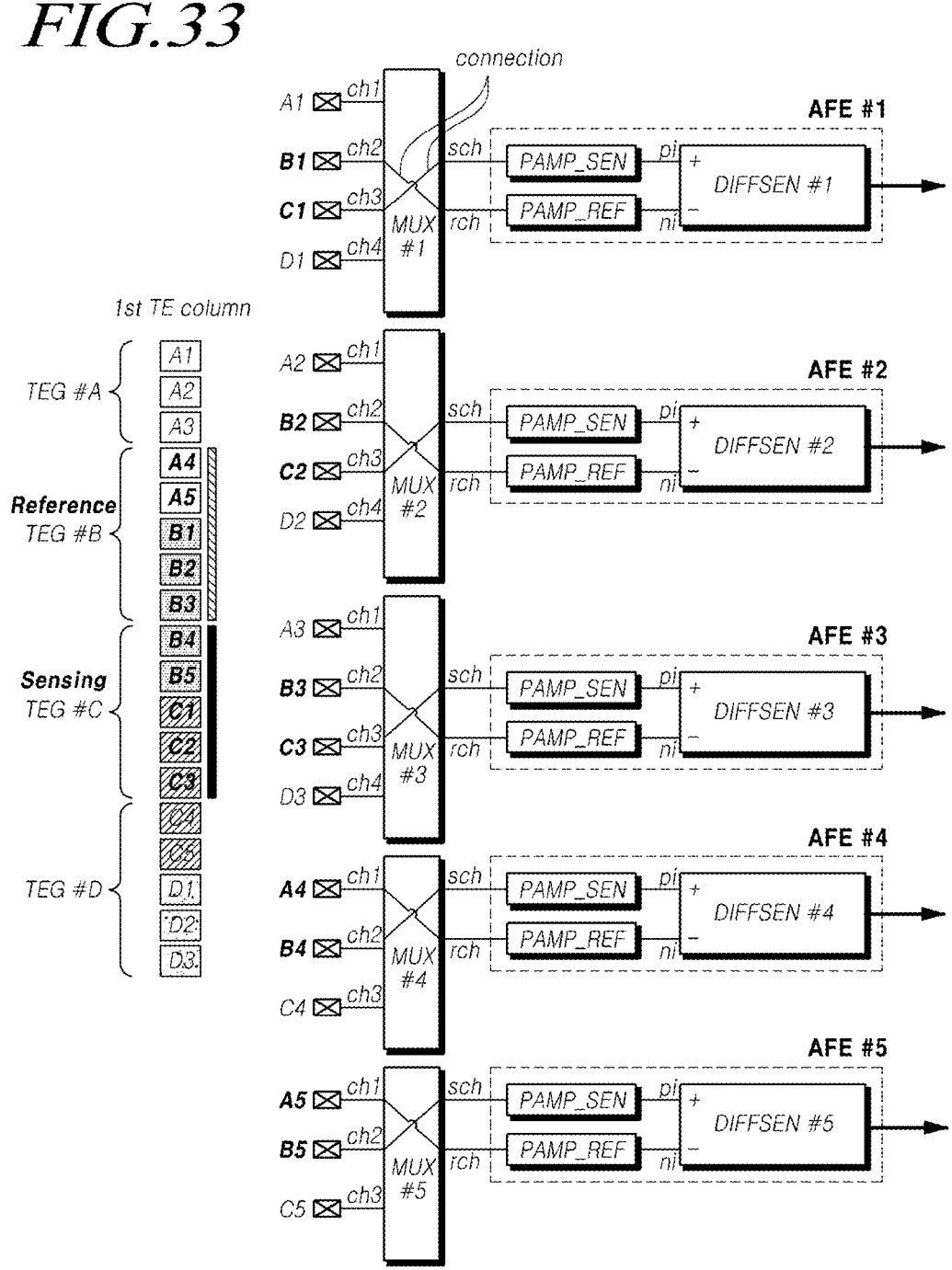
Figure 34:
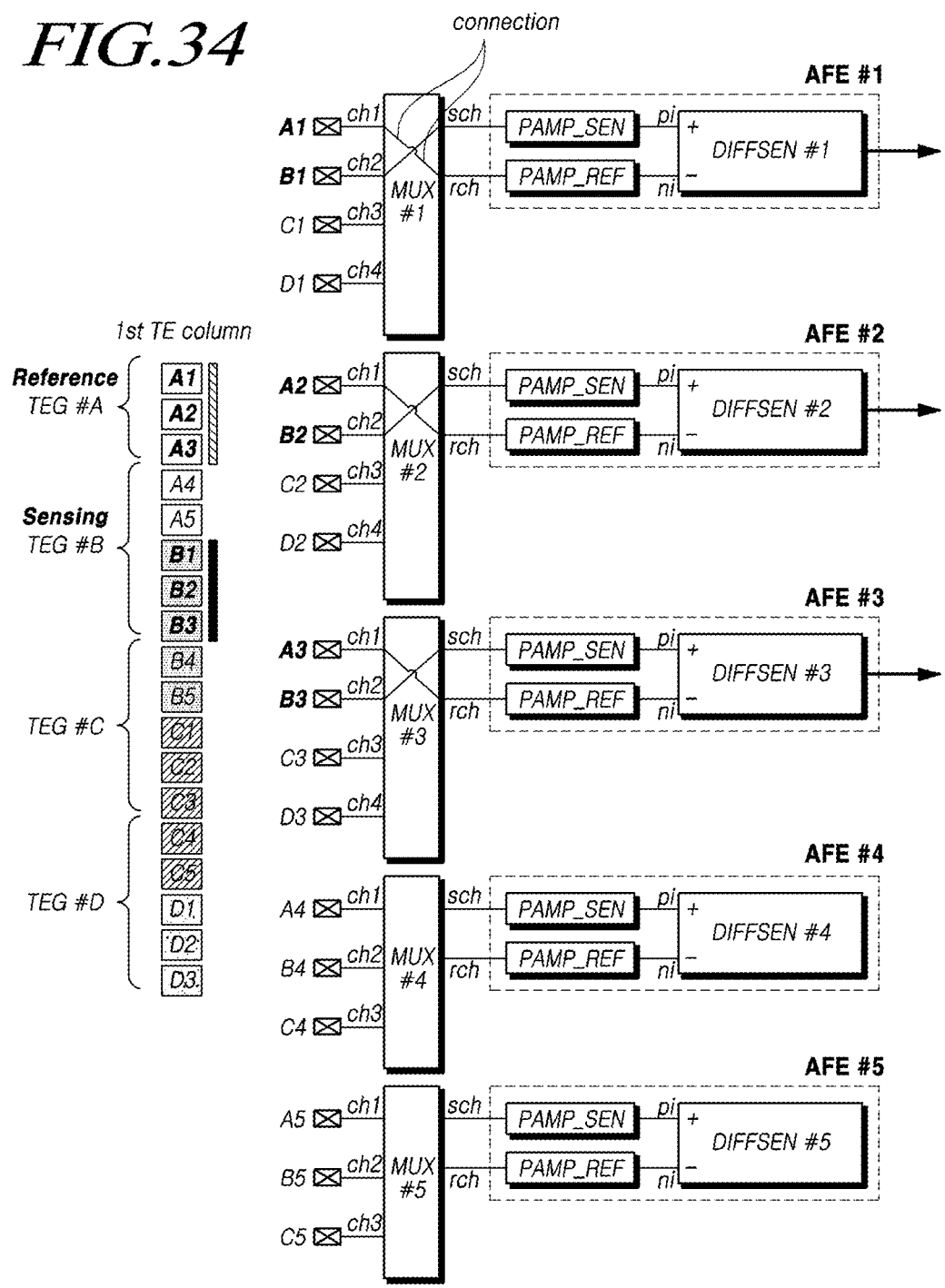

Group differential sensing in the reverse direction (from bottom to top) in the (j+1)th frame, which is illustrated in FIG. 32 to FIG. 34, may be slighted different from group differential sensing in the reverse direction (from bottom to top) in the (j+1)th frame, which is illustrated in FIG. 25 and FIG. 26, due to the touch electrode arrangement structure.

More specifically, three touch electrode groups TEG#A, TEG#B, and TEG#C for group differential sensing in the reverse direction in FIG. 25 and FIG. 26 are the same as three touch electrode groups TEG#A, TEG#B, and TEG#C for group differential sensing in the forward direction in FIG. 21 and FIG. 22. That is, touch electrodes included in each of three touch electrodes groups TEG#A, TEG#B, and TEG#C for group differential sensing in the reverse direction are the same as touch electrodes included in each of three touch electrode groups TEG#A, TEG#B, and TEG#C for group differential sensing in the forward direction.

However, four touch electrode groups TEG#A, TEG#B, TEG#C, and TEG#D for group differential sensing in the reverse direction in FIG. 32 to FIG. 34 are different from four touch electrode groups TEG#A, TEG#B, TEG#C, and TEG#D for group differential sensing in the forward direction in FIG. 29 and FIG. 31. That is, touch electrodes included in each of four touch electrodes groups TEG#A, TEG#B, TEG#C, and TEG#D for group differential sensing in the reverse direction are different from touch electrodes included in each of four touch electrode groups TEG#A, TEG#B, TEG#C, and TEG#D for group differential sensing in the forward direction.

Referring to FIG. 29 to FIG. 31, when group differential sensing in the forward direction is performed, the group differential sensing is performed in the order of the first touch electrode group TEG#A, the second touch electrode group TEG#B, and the third touch electrode group TEG#C.

Here, the first touch electrode group TEG#A includes five touch electrodes A1-A5, the second touch electrode group TEG#B includes five touch electrodes B1-B5, the third touch electrode group TEG#C includes five touch electrodes C1-C5, and the fourth touch electrode group TEG#D includes three touch electrodes D1-D3.

Referring to FIG. 32 to FIG. 34, when group differential sensing in the reverse direction is performed, the group differential sensing is performed in the order of the fourth touch electrode group TEG#D, the third touch electrode group TEG#C, and the second touch electrode group TEG#B.

Here, the fourth touch electrode group TEG#D includes five touch electrodes D1-D3 and C4-C5. The third touch electrode group TEG#C includes five touch electrodes C1-C3 and B4-B5. The second touch electrode group TEG#B includes five touch electrodes B1-B3 and A4-A5. The first touch electrode group TEG#A includes three touch electrodes A1-A3.

In other words, touch electrodes disposed in each touch electrode column may further include the g number of touch electrode groups (g=3), each of which includes the k number of touch electrodes (k=5), and one touch electrode group (TEG#D in the case of group differential sensing in the forward direction) including the d number of touch electrodes (d=3) which is less than the k number of touch electrodes. Here, d is a natural number equal to or larger than 1 and smaller than k.

Referring to FIG. 32, during the (j+1)th frame, the k number of multiplexers MUX#1-MUX#5 in the touch sensing circuit TDC select, as sensing touch electrodes, the k number of touch electrodes D1-D3 and C4-C5 included in the fourth touch electrode groups TEG#D that is newly configured in the reverse direction, and select, as reference touch electrodes, the k number of touch electrodes C1-C3 and B4-B5 included in the third touch electrode groups TEG#C that is newly configured in the reverse direction.

The k number of multiplexers MUX#1-MUX#5 select, as sensing touch electrodes, the k number of touch electrodes D1-D3 and C4-C5 including the d number of touch electrodes D1-D3 and the (k−d) number of touch electrodes C4-C5 disposed above the d number of touch electrodes D1-D3, and select, as reference touch electrodes, the k number of touch electrodes C1-C3 and B4-B5 disposed above the (k−d) number of touch electrodes C4-C5.

Therefore, the k number of differential sensing circuits DIFFSEN#1-DIFFSEN#5 may differentially sense the k number of touch electrodes D1-D3 and C4-C5, which are selected as sensing touch electrodes and included in the fourth touch electrode groups TEG#D that is newly configured in the reverse direction, and the k number of touch electrodes C1-C3 and B4-B5 which are selected as reference touch electrodes and included in the third touch electrode groups TEG#C that is newly configured in the reverse direction.

Referring to FIG. 33, during the (j+1)th frame, the k number of multiplexers MUX#1-MUX#5 in the touch sensing circuit TDC select, as sensing touch electrodes, the k number of touch electrodes C1-C3 and B4-B5 included in the third touch electrode groups TEG#C that is newly configured in the reverse direction, and select, as reference touch electrodes, the k number of touch electrodes B1-B3 and A4-A5 included in the second touch electrode groups TEG#B that is newly configured in the reverse direction.

Therefore, the k number of differential sensing circuits DIFFSEN#1-DIFFSEN#5 may differentially sense the k number of touch electrodes C1-C3 and B4-B5, which are selected as sensing touch electrodes and included in the third touch electrode groups TEG#C that is newly configured in the reverse direction, and the k number of touch electrodes B1-B3 and A4-A5 which are selected as reference touch electrodes and included in the second touch electrode groups TEG#B that is newly configured in the reverse direction.

Referring to FIG. 34, during the (j+1)th frame, the k number of multiplexers MUX#1-MUX#5 in the touch sensing circuit TDC select, as sensing touch electrodes, three touch electrodes B1-B3 (d=3) from among the k number of touch electrodes B1-B3 and A4-A5 included the second touch electrode groups TEG#B that is newly configured in the reverse direction, and select, as reference touch electrodes, three touch electrodes A1-A3 (d=3) included in the first touch electrode groups TEG#A that is newly configured in the reverse direction.

Therefore, the k number of differential sensing circuits DIFFSEN#1-DIFFSEN#5 may differentially sense the d number of touch electrodes B1-B3 which are selected as sensing touch electrodes and included in the second touch electrode groups TEG#B that is newly configured in the reverse direction, and the d number of touch electrodes A1-A3 which are selected as reference touch electrodes and included in the first touch electrode groups TEG#A that is newly configured in the reverse direction.

As described above, even in the case in which grouping cannot be performed into groups of the same number of touch electrodes, group differential sensing may be normally performed and group differential sensing directions may also be alternated between frames.

As described above, multiple touch electrodes TE may be embedded in the display panel DISP in which multiple data lines DL and multiple gate lines GL are disposed.

As described with reference to FIG. 7 and FIG. 9, when time-free driving is performed as in case 1 while group differential sensing is being performed, and when a first touch electrode driving signal TDS1 of a pulse modulation signal type, in which voltage swings, is applied to five touch electrodes A1-A5 included in the first touch electrode groups TEG#A and five touch electrodes B1-B5 included in the second touch electrode groups TEG#B during the j-th frame, a data signal Vdata for image display may be applied to the data line DL.

The data signal Vdata for image display may be swung in synchronization with the first touch electrode driving signal TDS1.

Further, when time-free driving is performed as in case 1 while group differential sensing is being performed, and when the first touch electrode driving signal TDS1 of a pulse modulation signal type, in which voltage swings, is applied to five touch electrodes A1-A5 included in the first touch electrode groups TEG#A and five touch electrodes B1-B5 included in the second touch electrode groups TEG#B during the j-th frame, a low level gate voltage VGL that swings in synchronization with the first touch electrode driving signal TDS1 may be applied to the gate line GL.

The first touch electrode driving signal TDS1 and the low level gate voltage VGL may correspond to a frequency and a phase, and may correspond to an amplitude in some cases.

Further, when time-free driving is performed as in case 1 while group differential sensing is being performed, and when the first touch electrode driving signal TDS1 of a pulse modulation signal type, in which voltage swings, is applied to five touch electrodes A1-A5 included in the first touch electrode groups TEG#A and five touch electrodes B1-B5 included in the second touch electrode groups TEG#B during the j-th frame, a pulse signal that swings in synchronization with the first touch electrode driving signal TDS1 may be applied to a touch electrode group TEG other than the first touch electrode groups TEG#A and the second touch electrode groups TEG#B.

As described with reference to FIG. 7 and FIG. 9, when time-free driving is performed as in case 3 while group differential sensing is being performed, and when the third touch electrode driving signal TDS3 of a pulse modulation signal type, in which voltage swings, is applied to five touch electrodes A1-A5 included in the first touch electrode groups TEG#A and five touch electrodes B1-B5 included in the second touch electrode groups TEG#B during the j-th frame, a data voltage that swings in synchronization with the third touch electrode driving signal TDS3 may be applied to all or some of multiple data lines DL, a low level gate voltage that swings in synchronization with the third touch electrode driving signal TDS3 may be applied to all or some of multiple gate lines GL, or a pulse signal that swings in synchronization with the third touch electrode driving signal TDS3 may be applied to a touch electrode group TEG other than the first touch electrode groups TEG#A and the second touch electrode groups TEG#B.

Figure 35:
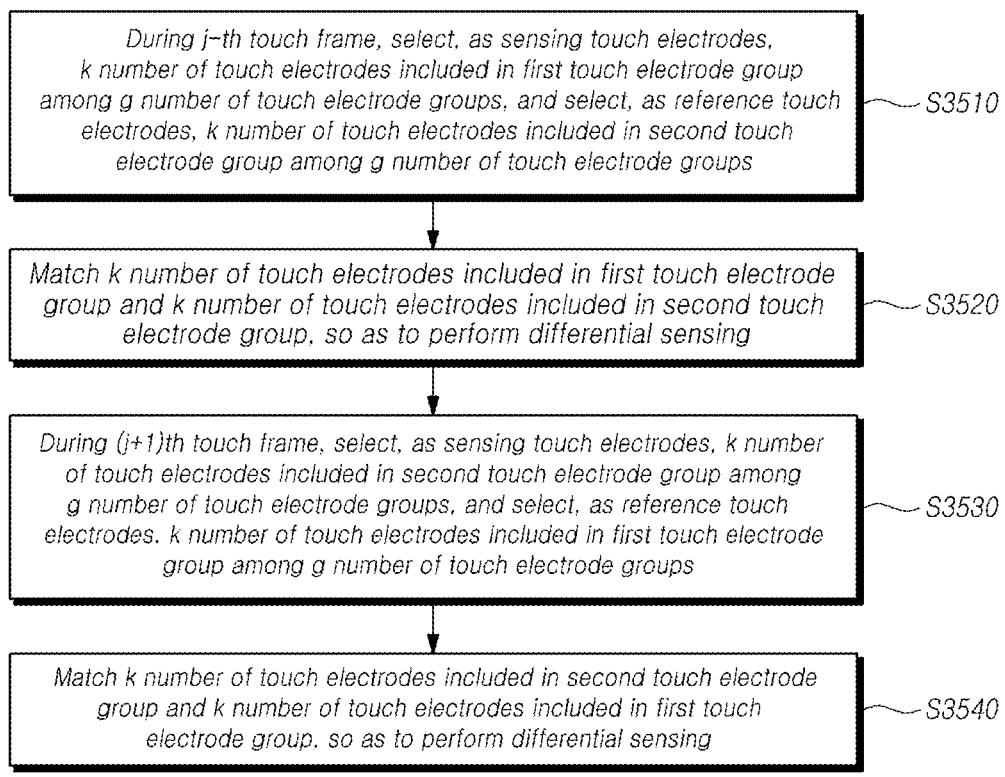
FIG. 35 is a flowchart for a method of driving a touch display device according to embodiments of the present disclosure.

FIG. 35 is a flowchart for a method of driving a touch display device according to embodiments of the present disclosure.

Referring to FIG. 35, a method of driving a touch display device according to embodiments of the present disclosure may include: during a j-th frame, selecting, as sensing touch electrodes, the k number of touch electrodes (k≥2) included in a first touch electrode group TEG#A among the g number of touch electrode groups TEG#A, TEG#B, and TEG#C (g≥2) in which multiple touch electrodes TE are grouped, and selecting, as reference touch electrodes, five touch electrodes B1-B5 included in a second touch electrode group TEG#B among the g number of touch electrode groups TEG#A, TEG#B, and TEG#C (S3510); and matching five touch electrodes A1-A5 included in the first touch electrode group TEG#A that is a sensing touch electrode group, and five touch electrodes B1-B5 included in the second touch electrode group TEG#B that is a reference touch electrode group, so as to perform differential sensing (S3520).

In step S3510 and S3520, the touch display device differentially senses, during an j-th frame, two touch electrode groups TEG#A and TEG#B arranged in a direction (forward direction) facing from the first touch electrode group TEG#A to the second touch electrode group TEG#B.

After S3520, during another frame other than the j-th frame, the touch display device may differentially sense two touch electrode groups (one touch electrode group corresponding to a sensing touch electrode group and another touch electrode group disposed above a sensing touch electrode) arranged in a direction (reverse direction) facing from the second touch electrode groups TEG#B to the first touch electrode groups TEG#A.

Alternatively After S3520, during the j-th frame, the touch display device may differentially sense two touch electrode groups (one touch electrode group corresponding to a sensing touch electrode group and another touch electrode group disposed above a sensing touch electrode) arranged in a direction (reverse direction) facing from the second touch electrode groups TEG#B to the first touch electrode groups TEG#A.

For example, referring to FIG. 35, the driving method may further include: during a (j+1)th frame, selecting, as sensing touch electrodes, five touch electrodes B1-B5 included in the second touch electrode group TEG#B from among the g number of touch electrode groups TEG#A, TEG#B, and TEG#C, and selecting, as reference touch electrodes, five touch electrodes A1-A5 included in the first touch electrode group TEG#A from among the g number of touch electrode groups TEG#A, TEG#B, and TEG#C (S3530); and matching the five touch electrodes B1-B5 included in the second touch electrode group TEG#B that is a sensing touch electrode group and the five touch electrodes A1-A5 included in the first touch electrode group TEG#A that is a reference touch electrode group, so as to perform differential sensing.

Multiple touch electrodes TE are embedded in the display panel DISP in which multiple data lines DL and multiple gate lines GL are disposed, and when a touch electrode driving signal TDS is applied to five touch electrodes A1-A5 included in the first touch electrode groups TEG#A and five touch electrodes B1-B5 included in the second touch electrode groups TEG#B during the j-th frame and the (j+1)th frame, an image data signal Vdata may be applied to a pixel electrode through the data lines DL disposed in the display panel DISP, in which the image data signal Vdata swings in synchronization with the touch electrode driving signal TDS, as in case 1 or case 3 in FIG. 9.

Embodiments of the present disclosure described above may provide a touch display device, a touch sensing circuit, and a driving method, by which a touch sensing time can be significantly reduced.

Embodiments of the present disclosure may provide a touch display device, a touch sensing circuit TDC, and a driving method, by which excellent touch sensitivity and a fast touch sensing speed are allowed.

Embodiments of the present disclosure may provide the touch display device, the touch sensing circuit TDC, and the driving method, by which influence between display driving and touch driving may be reduced.

Embodiments of the present disclosure may provide the touch display device, the touch sensing circuit TDC, and the driving method, by which, even though display and touch sensing are concurrently performed, touch sensing is prevented from being influenced by display driving, so that touch sensitivity can be improved.

Embodiments of the present disclosure may provide the touch display device, the touch sensing circuit TDC, and the driving method, by which, when display and touch sensing are concurrently performed, undesired voltage fluctuation in touch electrodes due to voltage fluctuation of a display driving electrode, such as a data line, is prevented from occurring, so that touch sensitivity may be improved.

It will be apparent to those skilled in the art that various modifications and variations can be made in the touch display device, the touch sensing circuit, and the driving method of the present disclosure without departing from the technical idea or scope of the disclosure. Thus, it is intended that the present disclosure cover the modifications and variations of this disclosure provided they come within the scope of the appended claims and their equivalents.

What is claimed is:

1. A touch display device, comprising:
   multiple touch electrodes; and
   a touch sensing circuit configured to:
      supply a touch electrode driving signal to all or some of the multiple touch electrodes;
      sense one or more touch electrodes to which the touch electrode driving signal has been supplied; and
      output sensing data,
   wherein the multiple touch electrodes are arranged in a matrix type,
   wherein touch electrodes disposed in each touch electrode column comprise a g number of touch electrode groups, each of which comprises a k number of touch electrodes, the k and the g being natural numbers of 2 or greater,
   wherein the touch sensing circuit is further configured to, during a j-th frame for display an image:
      differentially sense in a first direction,
         select, as sensing touch electrodes, the k number of touch electrodes included in a first touch electrode group, among the g number of touch electrode groups,
         select, as reference touch electrodes, the k number of touch electrodes included in a second touch electrode group other than the first touch electrode group, among the g number of touch electrode groups, and
         match the k number of touch electrodes included in the first touch electrode group and the k number of touch electrodes included in the second touch electrode group, to concurrently perform the differential sensing,
   wherein the touch sensing circuit is further configured to differentially sense in a second direction during a frame other than the j-th frame, and
   wherein the second direction is different from the first direction.

2. The touch display device of claim 1, wherein:
   the touch sensing circuit comprises as many differential sensing circuits as the number of touch electrodes included in each of the g number of touch electrode groups;
   the differential sensing circuits have positive input terminals and negative input terminals;
   the positive input terminals of the differential sensing circuits are electrically connected to one among the k number of touch electrodes included in the first touch electrode group, which are selected as the sensing touch electrodes;
   the negative input terminals of the differential sensing circuits are electrically connected to one among the k number of touch electrodes included in the second touch electrode group, which are selected as the reference touch electrodes; and
   the differential sensing circuits are configured to output or store a voltage difference between voltages applied to the positive input terminals and voltages applied to the negative input terminals.

3. The touch display device of claim 1, wherein:
   the touch sensing circuit comprises:
      k number of multiplexers configured to select a sensing channel and a reference channel from among g number of channels; and
      k number of differential sensing circuits comprising positive input terminals, negative input terminals, and output terminals;
   an i-th multiplexer among the k number of multiplexers is connected to an i-th differential sensing circuit, among the k number of differential sensing circuits, in which i is one of numbers from 1 to k;
   the i-th multiplexer is configured to:
      select a sensing channel and a reference channel from among the g number of channels corresponding to an i-th touch electrode in each of the g number of touch electrode groups; and
      connect the sensing channel and the reference channel to a sensing channel connection terminal and a reference channel connection terminal, respectively;
   the sensing channel connection terminal is electrically connected to a positive input terminal of the i-th differential sensing circuit; and
   the reference channel connection terminal is connected to a negative input terminal of the i-th differential sensing circuit.

4. The touch display device of claim 3, further comprising:
   a first preamplifier electrically connected between the sensing channel connection terminal of the i-th multiplexer and the positive input terminal of the i-th differential sensing circuit; and
   a second preamplifier electrically connected between the reference channel connection terminal of the i-th multiplexer and the negative input terminal of the i-th differential sensing circuit.

5. The touch display device of claim 4, wherein:
   a first integrator is connected between the positive input terminal of the i-th differential sensing circuit and the first preamplifier; and
   a second integrator is connected between the negative input terminal of the i-th differential sensing circuit and the second preamplifier.

6. The touch display device of claim 3, wherein an integrator is connected to an output terminal of the i-th differential sensing circuit.

7. The touch display device of claim 3, wherein:
   the k number of touch electrodes included in the first touch electrode group are sensing touch electrodes, and correspond to sensing channels selected by the k number of multiplexers, respectively; and
   the k number of touch electrodes included in the second touch electrode group are reference touch electrodes, and correspond to reference channels selected by the k number of multiplexers, respectively.

8. The touch display device of claim 1, wherein the first touch electrode group is positioned closer to the touch sensing circuit, compared to the second touch electrode group.

9. The touch display device of claim 1, wherein the second touch electrode group is positioned closer to the touch sensing circuit, compared to the first touch electrode group.

10. The touch display device of claim 1, wherein, during another frame other than the j-th frame, the touch sensing circuit is further configured to:
   selects, as sensing touch electrodes, the k number of touch electrodes included in the second touch electrode group, among the g number of touch electrode groups;
   selects, as reference touch electrodes, the k number of touch electrodes included in the first touch electrode group, among the g number of touch electrode groups; and
   matches the k number of touch electrodes included in the second touch electrode group and the k number of touch electrodes included in the first touch electrode group, to concurrently perform differential sensing.

11. The touch display device of claim 1, wherein:
   touch electrodes disposed in the each touch electrode column further comprise one additional touch electrode group including a d number of touch electrodes, in addition to the g number of touch electrode groups, each of which comprising the k number of touch electrodes, d being a natural number equal to or greater than 1 and smaller than k; and
   the touch sensing circuit is further configured to:
      select, as sensing touch electrodes, the k number of touch electrodes including the d number of touch electrodes and a (k−d) number of touch electrodes disposed above the d number of touch electrodes; and
      select, as reference touch electrodes, the k number of touch electrodes disposed above the (k−d) number of touch electrodes, to differentially sense the k number of touch electrodes selected as sensing touch electrodes and the k number of touch electrodes selected as reference touch electrodes.

12. The touch display device of claim 1, further comprising:
   a display panel in which multiple data lines and multiple gate lines are disposed,
   wherein the multiple touch electrodes are embedded in the display panel, and
   wherein, when a touch electrode driving signal in a pulse modulation signal type, in which voltage swings, is applied to the k number of touch electrodes included in the first touch electrode group and the k number of touch electrodes included in the second touch electrode group, a data signal for image display is applied to the data lines.

13. The touch display device of claim 12, wherein the each touch electrode column is overlappingly disposed with the data lines.

14. A touch sensing circuit, comprising:
   a k number of multiplexers configured to, during a j-th frame for display an image:
   select, as sensing touch electrodes, the k number of touch electrodes (k≥2) included in a first touch electrode group, among a g number of touch electrode groups, where g≥2, in which multiple touch electrodes are grouped; and
   select, as reference touch electrodes, the k number of touch electrodes included in a second touch electrode group other than the first touch electrode group, among the g number of touch electrode groups; and
   a k number of differential sensing circuits configured to match the k number of touch electrodes included in the first touch electrode group and the k number of touch electrodes included in the second touch electrode group, to perform differential sensing,
   wherein the k number of differential sensing circuits are further configured to differentially sense in a first direction during the j-th frame for display an image,
   wherein the k number of differential sensing circuits are further configured to differentially sense in a second direction during a frame other than the j-th frame, and
   wherein the second direction is different from the first direction.

15. The touch sensing circuit of claim 14, wherein:
   the k number of touch electrodes included in the first touch electrode group are divided and connected to k number of multiplexers;
   the k number of multiplexers are further configured to:
      select, as sensing touch electrodes, all the k number of touch electrodes included in the first touch electrode group; and
      connect the selected touch electrodes to positive input terminals of the k number of differential sensing circuits;
   the k number of touch electrodes included in the second touch electrode group are divided and connected to the k number of multiplexers; and
   the k number of multiplexers are further configured to:
      select, as reference touch electrodes, all the k number of touch electrodes included in the second touch electrode group; and
      connect the selected touch electrodes to negative input terminals of the k number of differential sensing circuits.

16. The touch sensing circuit of claim 14, wherein:
   during another frame other than the j-th frame, the k number of multiplexers are further configured to:
      select, as sensing touch electrodes, the k number of touch electrodes included in the second touch electrode group, among the g number of touch electrode groups; and
      select, as reference touch electrodes, the k number of touch electrodes included in the first touch electrode group, among the g number of touch electrode groups; and
   the k number of differential sensing circuits match the k number of touch electrodes included in the second touch electrode group and the k number of touch electrodes included in the first touch electrode group, to perform differential sensing.

17. The touch sensing circuit of claim 14, wherein each of the k number of differential sensing circuits is a sample-and-hold circuit or a differential amplifier.

18. A method of driving a touch display device comprising multiple touch electrodes and a touch sensing circuit configured to supply a touch electrode driving signal to all or some of the multiple touch electrodes, sense one or more touch electrodes to which the touch electrode driving signal has been supplied, and output sensing data, the method comprising:

during a j-th frame for display an image:
- differentially sensing in a first direction;
  - selecting, as sensing touch electrodes, a k number of touch electrodes (k≥2) included in a first touch electrode group, among a g number of touch electrode groups, where g≥2, in which the multiple touch electrodes are grouped, and
  - selecting, as reference touch electrodes, the k number of touch electrodes included in a second touch electrode group other than the first touch electrode group, among the g number of touch electrode groups;
- matching the k number of touch electrodes included in the first touch electrode group that is a sensing touch electrode group and the k number of touch electrodes included in the second touch electrode group that is a reference touch electrode group, to perform differential sensing; and
- differentially sensing in a second direction, during a frame other than the j-th frame,
- wherein the second direction is different from the first direction.

19. The method of claim 18, further comprising:
- after performing of the differential sensing, during another frame other than the j-th frame, differentially sensing two touch electrode groups arranged in a direction from the second touch electrode group toward the first touch electrode group; or
- within the i-th frame, differentially sensing two touch electrode groups arranged in a direction from the second touch electrode group toward the first touch electrode group.

20. The method of claim 18, wherein:
- the multiple touch electrodes are embedded in a display paned in which multiple data lines and multiple gate lines are disposed; and
- when a touch electrode driving signal is applied to the k number of touch electrodes included in the first touch electrode group and the k number of touch electrodes included in the second touch electrode group, a data signal for image display is applied to the data lines.

* * * * *